(12) United States Patent
Park et al.

(10) Patent No.: US 10,025,496 B2
(45) Date of Patent: Jul. 17, 2018

(54) MOBILE TERMINAL AND CONTROL METHOD THEREOF

(71) Applicant: LG ELECTRONICS INC., Seoul (KR)

(72) Inventors: Mihyun Park, Seoul (KR); Gukchan Lim, Seoul (KR); Hongjo Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 14/754,244

(22) Filed: Jun. 29, 2015

(65) Prior Publication Data

US 2016/0299679 A1    Oct. 13, 2016

(30) Foreign Application Priority Data

Apr. 7, 2015    (KR) .......................... 10-2015-0049192

(51) Int. Cl.

| | |
|---|---|
| *G06F 3/0484* | (2013.01) |
| *G06F 3/0488* | (2013.01) |
| *G06F 1/16* | (2006.01) |
| *G06F 3/041* | (2006.01) |
| *G04G 21/00* | (2010.01) |
| *G06F 3/0482* | (2013.01) |
| *G06F 3/0362* | (2013.01) |

(52) U.S. Cl.
CPC ......... *G06F 3/04883* (2013.01); *G04G 21/00* (2013.01); *G06F 1/163* (2013.01); *G06F 1/169* (2013.01); *G06F 3/0362* (2013.01); *G06F 3/041* (2013.01); *G06F 3/0482* (2013.01); *G06F 3/04842* (2013.01); *G06F 3/04845* (2013.01); *G06F 3/04847* (2013.01); *G06F 2203/0339* (2013.01); *G06F 2203/04803* (2013.01)

(58) Field of Classification Search
CPC ...... G06F 1/1626; G06F 1/163; G06F 3/0488; G06F 2203/04808; G06F 3/0482
See application file for complete search history.

(56) References Cited

U.S. PATENT DOCUMENTS

| | | | |
|---|---|---|---|
| 9,552,572 B2 * | 1/2017 | Shin ........................ | G04G 9/06 |
| 2011/0157046 A1 | 6/2011 | Lee et al. | |
| 2012/0130547 A1 | 5/2012 | Fadell et al. | |

FOREIGN PATENT DOCUMENTS

| | | |
|---|---|---|
| EP | 2306273 | 4/2011 |
| EP | 2838008 | 2/2015 |

OTHER PUBLICATIONS

European Patent Office Application Serial No. 15181046.2 Search Report dated Aug. 8, 2016, 11 pages.

* cited by examiner

*Primary Examiner* — Namitha Pillai
(74) *Attorney, Agent, or Firm* — Lee, Hong Degerman, Kang & Waimey PC

(57) ABSTRACT

The present invention relates to a mobile terminal wearable on a wrist and a control method thereof. The mobile terminal includes a main body, a band coupled to the main body and configured to be secured to a wrist of a user, a touch screen disposed on a front side of the main body and configured to sense a touch and a controller configured to cause the touch screen to display: a plurality of time markers; an hour hand and a minute hand moving according to a lapse of time; and a first graphic object associated with an application at a location of at least one time marker of the plurality of time markers in response to an event at the mobile terminal.

19 Claims, 51 Drawing Sheets

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2015-0049192, filed on Apr. 7, 2015, the contents of which is incorporated by reference herein in its entirety.

BACKGROUND OF THE DISCLOSURE

1. Field of the Disclosure

This specification relates to a mobile terminal wearable on a wrist and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software improvements, as well as changes and improvements in the structural components.

In view of the improvements, mobile terminals are evolving into various design shapes, and watch type mobile terminals which can be worn on a user's body are under development.

A watch type mobile terminal is provided with a touch screen, and thus requirements for outputting information relating to a current time on the touch screen are present. Accordingly, similar to a typical wristwatch, the hour hand and the minute hand which move according to a lapse of time may be output on the touch screen. When the hour hand and the minute hand are output, a plurality of indexes indicating time may also be displayed. The user may recognize a current time based on the indexes indicated by the hour hand and the minute hand.

However, the watch type mobile terminal is worn on the user's body, and thus has limitations, such as a relatively small size of the touch screen for outputting visual information and limited types and amount of visual information output on the touch screen. When information relating to time is displayed, there is a difficulty in ensuring a space for outputting additional information.

SUMMARY OF THE DISCLOSURE

Therefore, an aspect of the detailed description is to solve those drawbacks of the related art.

Another aspect of the detailed description is to provide a mobile terminal, capable of facilitating an access/execution with respect to an application while performing a function of a watch for informing time, and a control method thereof.

Another aspect of the detailed description is to provide a new user interface, capable of searching for and executing an application that a user wants to execute among a plurality of applications in a fast simple manner.

In order to accomplish the task, a mobile terminal according to an aspect of the present disclosure may include a main body, a band coupled to the main body and configured to be secured to a wrist of a user, a touch screen disposed on a front side of the main body and configured to sense a touch and a controller configured to cause the touch screen to display a plurality of time markers; an hour hand and a minute hand moving according to a lapse of time; and a first graphic object associated with an application at a location of at least one time marker of the plurality of time markers in response to an event at the mobile terminal.

According to an embodiment, a first display group comprises the plurality of time markers, the hour hand, and the minute hand and a second display group comprises a plurality of graphic objects including the first graphic object and the second display group is displayed to at least partially overlap the first display group.

According to an embodiment, the first graphic object corresponds to a type of the event.

According to an embodiment, the event is a touch input received via the touch screen.

According to an embodiment, the touch input comprises a drag from a first time marker of the plurality of time markers to a particular point displayed on the touch screen and the second display group is associated with the first time marker.

According to an embodiment, the controller is further configured to cause the touch screen to display a third display group and terminate display of the second display group in response to another touch input comprising a drag.

According to an embodiment, the controller is further configured to cause the touch screen to display the plurality of graphic objects to rotate in a first direction in response to another touch input in the first direction.

According to an embodiment, the event is a touch input received via the touch screen comprising a drag from a first time marker of the plurality of time markers to a particular point displayed on the touch screen and the controller is further configured to cause the touch screen to display a plurality of graphic objects in response to the touch input wherein the plurality of graphics objects are associated with the first time marker and are displayed at corresponding locations of the plurality of time markers.

According to an embodiment, the plurality of graphic objects vary based on a location of the first time marker.

According to an embodiment, the plurality of graphic objects are displayed at the corresponding locations of the plurality of time markers based on a preset order of each of the plurality of graphic objects.

According to an embodiment, the plurality of graphic objects are displayed in the preset order along a perimeter of the touch screen in a clockwise or counterclockwise direction from a location of the first time marker.

According to an embodiment, the controller is further configured to cause the touch screen to: display the plurality of graphic objects to rotate in a first direction according to another touch input in the first direction and terminate displaying a first ordered graphic object of the displayed plurality of graphic objects and display a new graphic object as a last ordered graphic object of the displayed plurality of graphic objects when the plurality of graphic objects are rotated.

According to an embodiment, the controller is further configured to cause the touch screen to: change a shape of the first ordered graphic object or the last ordered graphic object to indicate that no new graphic objects are available for display in response to the another touch input and display the first ordered graphic object or the last ordered graphic object in an original shape when the another touch input is released.

According to an embodiment, the displayed plurality of graphic objects is a subset of an ordered number of graphic objects associated with the first time marker and a number of the ordered number of graphic objects is larger than a number of the plurality of time markers.

According to an embodiment, the controller is further configured to cause the touch screen to display at least one indicator indicating one or more of the ordered number of graphic objects that are not displayed on the touch screen.

According to an embodiment, the controller is further configured to cause the touch screen to display a first execution screen of the application in response to a touch input to the displayed first graphic object.

According to an embodiment, the touch input comprises a drag from a location of the displayed first graphic object to a particular point displayed on the touch screen.

According to an embodiment, the controller is further configured to: cause the touch screen to display a plurality of regions in response to a touch input comprising a drag from the first graphic object to a particular point displayed on the touch screen, wherein each of the plurality of regions is associated with a corresponding function of the application and execute a corresponding function in response to a selection touch input to one of the plurality of regions.

According to an embodiment, wherein a size of a display area of each of the plurality of regions is based on an execution frequency of the associated corresponding function.

Furthermore, a mobile terminal according to an embodiment of the present disclosure includes a main body, a band coupled to the main body and configured to be secured to a wrist of a user, a touch screen disposed on a front side of the main body and configured to sense a touch and a controller configured to cause the touch screen to display a plurality of time markers; an hour hand and a minute hand moving according to a lapse of time; a first graphic object at a location of at least one time marker of the plurality of time markers in response to a touch input received via the touch screen.

A mobile terminal and a control method thereof according to the present invention have several effects as follows.

In accordance with at least one of exemplary embodiments disclosed herein, a mobile terminal having a touch screen in a circular shape can provide a new user interface specialized for the circular touch screen. The new interface may allow at least one of indexes indicating time to be converted into a graphic object while an hour hand and a minute hand are output. This may facilitate for an access to an application with maintaining a main function of a watch that outputs time information.

In case where the indexes are numbers from 1 to 12, a wearable display can output maximum 12 different graphic objects on positions of one screen where the plurality of indexes were output. Accordingly, many types of graphic objects can be arranged on one screen in good order, along with the hour hand and the minute hand. In addition, a novel type of home screen which is specialized for the circular touch screen can be provided and a new type of scroll function can also be provided. These may result in enhancement of user convenience.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE DISCLOSURE

Figure 1A:
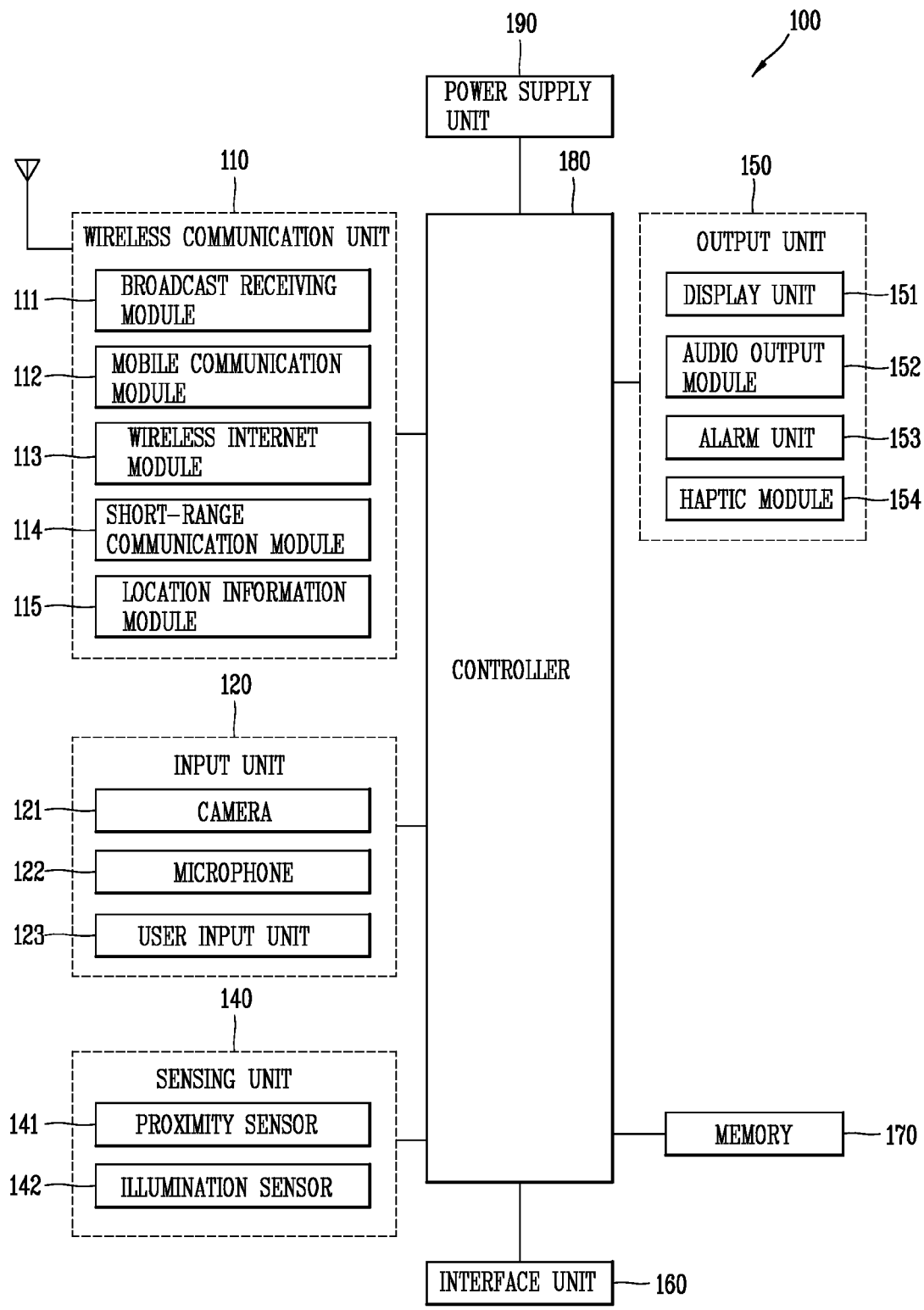
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
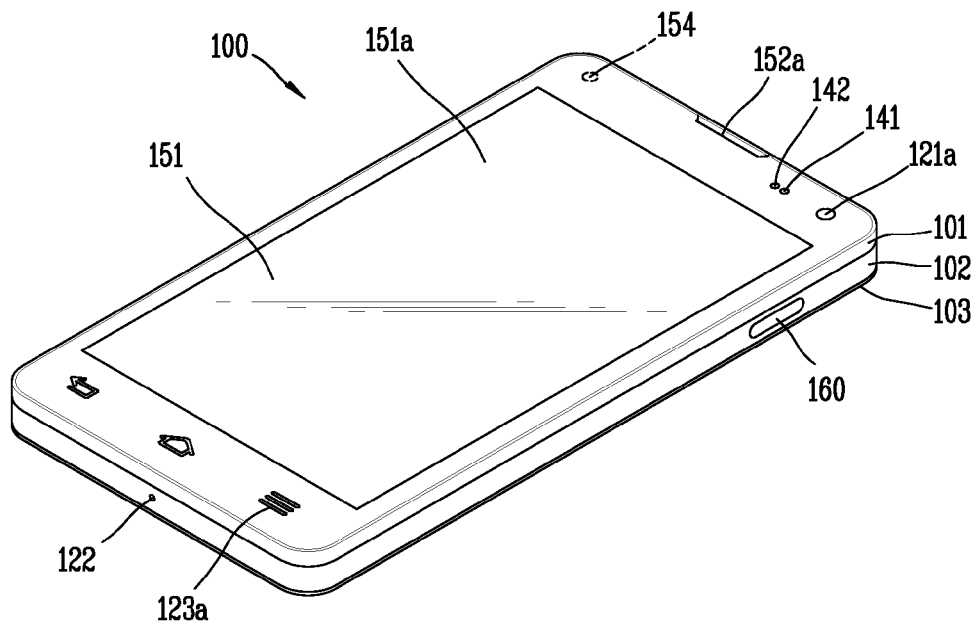
FIGS. 1B and 1C are conceptual views illustrating one example of the mobile terminal, viewed from different directions.
Figure 1C:
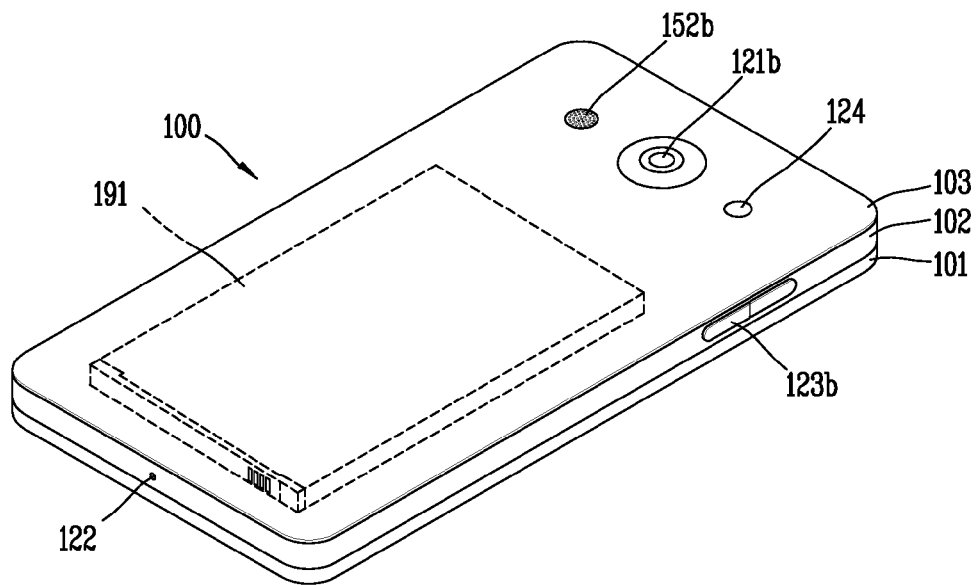

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 may typically include one or more modules which permit wireless communications between the mobile terminal 100 and a wireless communication system or between the mobile terminal 100 and a network within which the mobile terminal 100 is located.

For example, the wireless communication unit 110 may include at least one of a broadcast receiving module 111, a mobile communication module 112, a wireless Internet module 113, a short-range communication module 114, a location information module 115 and the like.

The input unit 120 includes a camera 121 or an image input device for obtaining images or video, a microphone 122 or an audio input device for inputting an audio signal, and a user input unit 123 (for example, a touch key, a push key (a mechanical key), and the like) for allowing a user to input information. Data (for example, audio, video, image, and the like) is obtained by the input unit 120 and may be analyzed and processed by controller 180 according to user control commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element or a mechanical key (for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 has a longer lifespan and a more enhanced utility than a contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

As aforementioned, the controller 180 controls the operations associated with the application programs and typically controls the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch type, clip-type, glasses-type, or as a folder-type, flip-type, slide-type, swing-type, and swivel-type in which two and more bodies are combined with each other in a relatively movable manner, and combinations thereof.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the present invention may display information processed therein using a flexible display. Hereinafter, it will be described in more detail with reference to the accompanying drawing.

Figure 2:
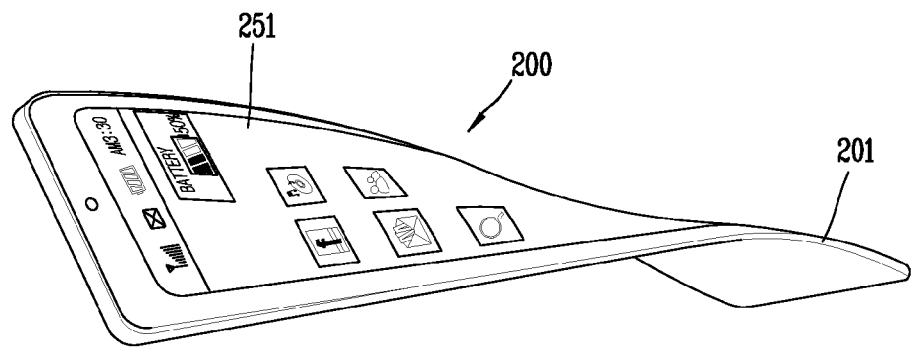
FIG. 2 is a conceptual view illustrating a variation of a mobile terminal in accordance with the present invention.

FIG. 2 is a conceptual view of a deformable mobile terminal 200 according to an alternative embodiment of the present invention.

In this figure, the mobile terminal 200 is shown having a display unit 251, which is a type of display that is deformable by an external force. This deformation, which includes the display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof.

The flexible display unit of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit.

Also, the controller 180 or other component can change information displayed on the flexible display unit 251, or generate a control signal for controlling a function of the mobile terminal 200, based on the information related to the deforming of the flexible display unit 251.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

In accordance with still further embodiments, a mobile terminal may be configured as a device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 3:
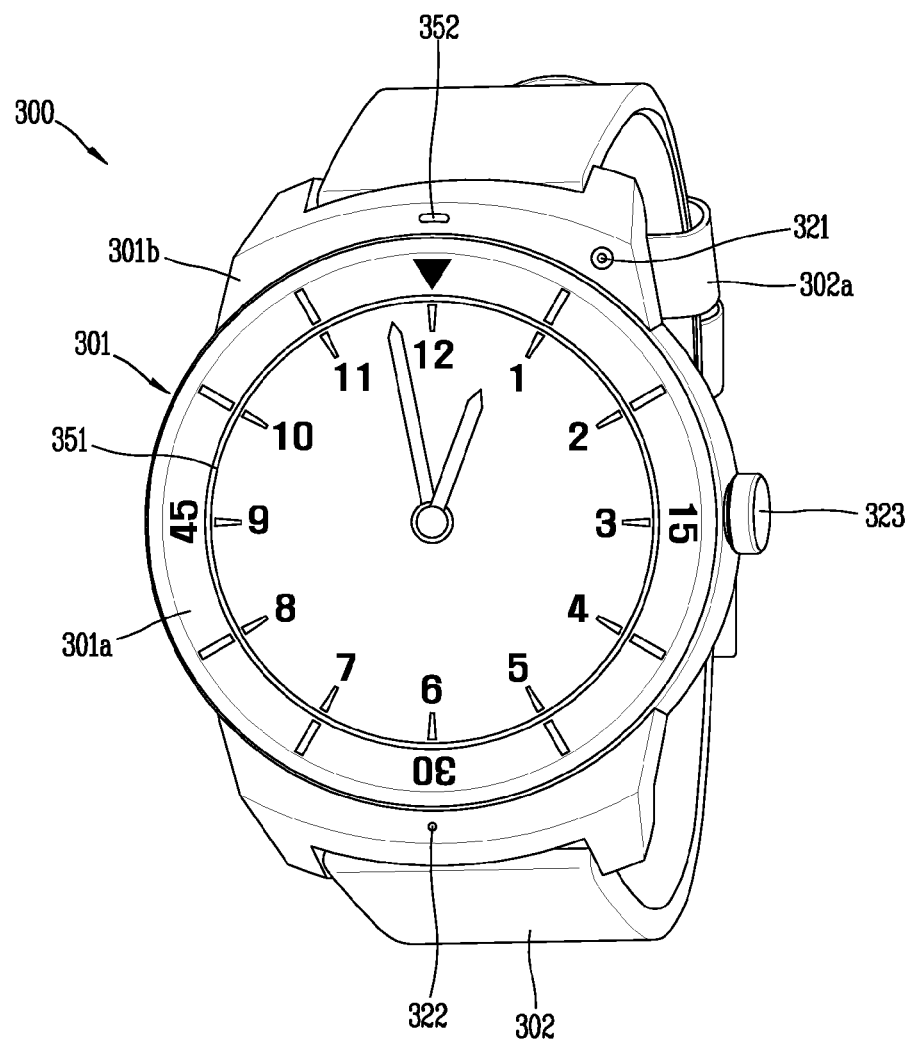
FIG. 3 is a perspective view illustrating an example of a wearable device as a watch type terminal in accordance with another exemplary embodiment of the present invention.

FIG. 3 is a perspective view illustrating an example of a watch type terminal 300 in accordance with another exemplary embodiment of the present invention As illustrated in FIG. 3, the watch-type mobile terminal 300 includes a main body 301 with a display unit 351 and a band 302 connected to the main body 301 to be wearable on a wrist.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351a of the display unit 351 is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, description will be given in more detail of a mobile terminal, which is capable of easily accessing and executing an application while performing a function of a watch that informs of time, and a control method thereof, with reference to the accompanying drawings.

Figure 4:
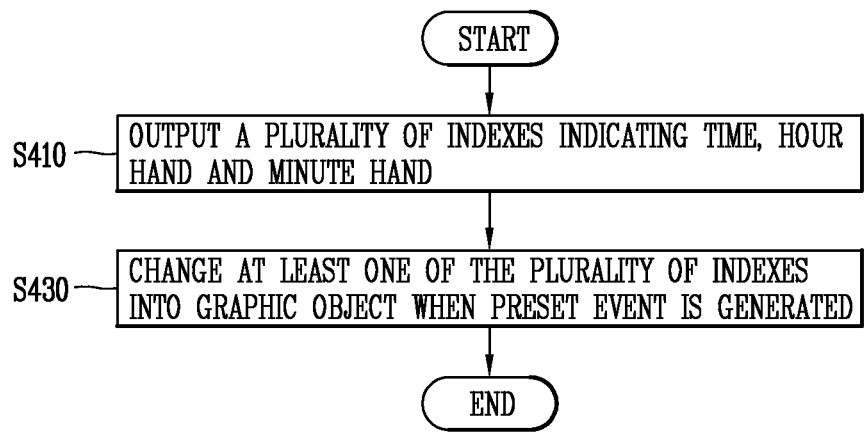
FIG. 4 is a flowchart representatively illustrating a control method for a mobile terminal in accordance with the present invention.

FIG. 4 is a flowchart representatively illustrating a control method for a mobile terminal according to the present invention. Hereinafter, operations of the mobile terminal 100 (see FIG. 1) described herein are executed by the controller 180 (see FIG. 1) provided in the mobile terminal.

First, the controller 180 outputs a plurality of indexes indicating time and an indication hand, which moves according to a lapse of time, on the touch screen 151 (see FIG. 1) (S410).

The touch screen 151 may be converted from one of an inactive state that a light source for illuminating the touch screen 151 is turned off and an active state that the light source is turned on into the other. Here, "the inactive state of the touch screen 151" refers to a state that the light source provided in the touch screen 151 to illuminate the touch screen 151 is turned off, namely, a state that any information is not output on the touch screen 151.

Meanwhile, the touch screen 151 may display time information in the active state.

The time information includes a plurality of indexes composed of numbers and the like indicating time, and an indication hand moving according to a lapse of time. The indication hand includes at least one of an hour hand, a minute hand and a second hand. The hour hand moves to point to an index corresponding to an hour of a current time according to the lapse of time. The minute hand moves to point to an index corresponding to a minute of the current time, and the second hand moves to point to an index corresponding to a second of the current time.

The controller 180 controls the touch screen 151 to automatically change time indicated by the time information according to the lapse of time. Accordingly, the user may identify the current time by use of the index indicated by at least one of the hour hand, the minute hand and the second hand.

The time information further includes a control point at which end portions of the hour hand and the minute hand are connected to each other. The hour hand and the minute hand rotate clockwise centering on the control point. The control point may operate as an input region for receiving a user input associated with a control of the terminal. The operation associated with the control point will be described in detail later with reference to other drawings.

Meanwhile, at least one of the plurality of indexes, the hour hand, the minute hand and the second hand may change into various shapes or forms based on a user's setting. For example, the plurality of indexes may be implemented by numbers such as Arabic numerals or roman numerals, figures such as bars or dots, or a combination of the numerals and figures.

Afterwards, when a preset event is generated during the output of the time information, the controller 180 changes at least one of the plurality of indexes into a graphic object associated with an application (S430).

The event generation may include, for example, a missed call, an application to be updated, a message reception, a notification generated from an application, charging, a presence of a payment terminal supporting a mobile payment within a predetermined distance, an alarm, a missed notification, and the like.

The application is a concept including a widget or a home launcher, and refers to every type of program operable in a terminal. Therefore, the applications may be programs which perform functions, such as a web browser, a video reproduction, a message transmission and reception, a schedule management, an update of an application.

As another example of the event generation, when specific information is received through the wireless communication unit of the terminal, it indicates that an event has been generated in an application related to the specific information, and the controller senses the event generation. Or, in case where a user-input item is present on a schedule management, when a date corresponding to the item comes, it corresponds to a generation of an event from the schedule management application.

As another example, the event generation may also correspond to a preset user input applied to the touch screen 151. For example, when a touch input of tapping a predetermined region of the touch screen 151 within a reference time at least two times is applied or when a touch input of being applied to one of the plurality of indexes and continuously moving up to the control point connecting the end portions of the hour hand and the minute hand is applied, the controller may determine that a preset event has been generated.

In response to the generation of the preset event, the controller 180 changes at least one of the plurality of indexes currently output on the touch screen 151 into a graphic object associated with an application. For example, when the plurality of indexes are formed by 12 numbers, the controller 180 may control the touch screen 151 to output a graphic object associated with a different application on a position where at least one of the 12 numbers is output.

When one graphic object is output, the controller 180 may restrict an output of one of the plurality of indexes, and replace the one index with the graphic object. Or, the controller 180 may control the touch screen 151 to output the graphic object on the one index in an overlapping manner such that at least part of the one index can be obscured by the graphic object.

In this manner, the touch screen 151 may output graphic objects of applications, which have been selected based on preset references, in replacement of each number corresponding to the indexes. For instance, when the numbers 1 and 2 are changed into graphic objects of different applications, a first graphic object associated with a first application may be output, in replacement of the number 1, on a region where the number 1 was output, and a second graphic object associated with a second application may be output, in replacement of the number 2, on a region where the number 2 was output.

The graphic object may be an image or an icon in a rectangular or circular shape, and also be a different image according to a type of an application. As another example, the graphic object may be a different image according to a type of an event. Here, the different image refers to an image with a different shape, length, color or the like, for example.

According to the present invention, a graphic object is output on a position where an index was displayed, in response to a generation of a preset event, but the user may identify a current time. For example, when a first graphic object is output on a position where the number 1 was output and the hour hand points to the first graphic object, the user can identify that an hour corresponding to a current time is one o'clock. Therefore, even though the index is replaced with the graphic object for output, a time informing function as a unique function of a watch can be effectively provided.

Meanwhile, when a touch input is applied to a graphic object, the controller 180 ends (terminates) the output of the time information, executes an application associated with the graphic object, and outputs an execution screen of the application on the touch screen 151. Accordingly, the user can easily execute a specific application while visually checking time information.

In this instance, a different control may be carried out according to a type of the touch input. For example, when a short touch input is applied to the graphic object, the application may be executed. On the other hand, when a long touch input is applied to the graphic object, the graphic object may be deleted. Also, when a drag input is applied to the graphic object, preset screen information (or screen image) associated with the application may be output along a direction of the drag input or an output position of the graphic object may move from one of the plurality of indexes to another.

The aforementioned control method according to the present invention will be embodied into the accompanying drawings and various forms, hereinafter. In the detailed embodiments to be explained hereinafter, the same/like reference numerals will be provided to the same/like components of the foregoing embodiments, and description thereof will not be repeated.

Hereinafter, description will be given of exemplary embodiments of a mobile terminal according to the present invention, using the wearable device 300 illustrated in FIG. 3. This is for the sake of explanation, and thus it will be easily understood by those skilled in that art that the configurations according to the embodiments disclosed herein can be varied into other types of mobile terminals, such as smart phones, smart glasses, head mounted display (HMDs), and the like.

The wearable device 300, in view of the product characteristic of having to be worn on a user, includes a relatively small touch screen 351, as compared with a mobile terminal such as a smart phone. Due to the spatial limitation of the wearable device 300, it is difficult to display information as much as desired by the user. For example, when a home screen is output on a smart phone, several tens of objects may be included in one screen. However, the wearable device 300 can merely include three or four objects on one screen, and even cannot display the hour hand and the minute hand due to the spatial limitation.

However, the wearable device 300 according to the present invention can change indexes into preset graphic objects while the hour hand and the minute hand are output. This may allow the user to execute an application desiring to use in a simple easy manner as well as identifying a current time using the hour hand and the minute hand. Specifically, when the plurality of indexes are configured by the numbers from 1 to 12, the wearable device 300 may display, on one screen, maximum 12 different graphic objects on positions where the plurality of indexes were output. Accordingly, many types of graphic objects can be arranged on one screen in a good order, along with the hour hand and the minute hand.

Embodiments for a case where a preset event is generated from at least one application will be described in detail.

Figure 5A:
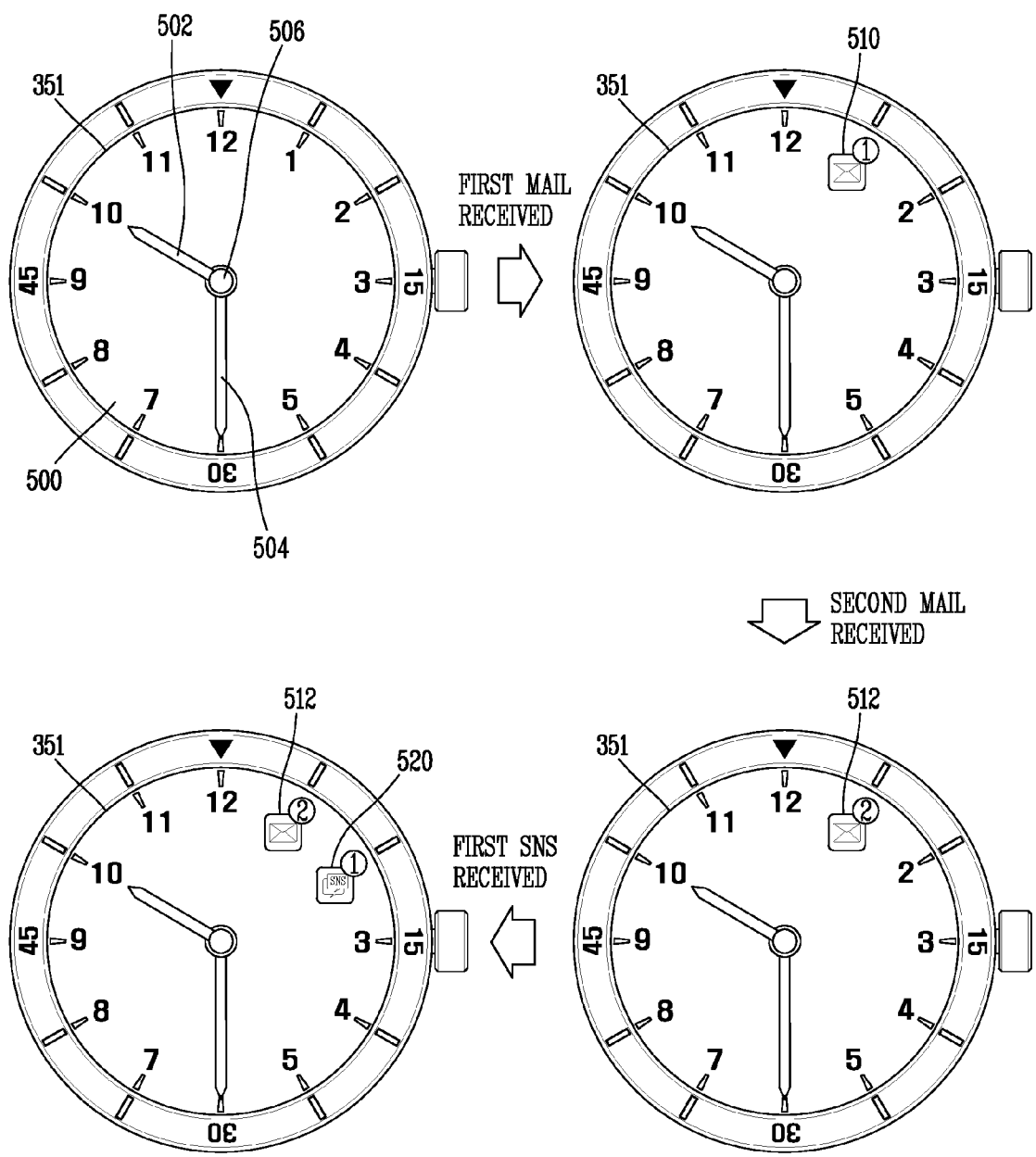
FIG. 5A is a conceptual view illustrating the control method of FIG. 4 in accordance with one exemplary embodiment.
Figure 5B:
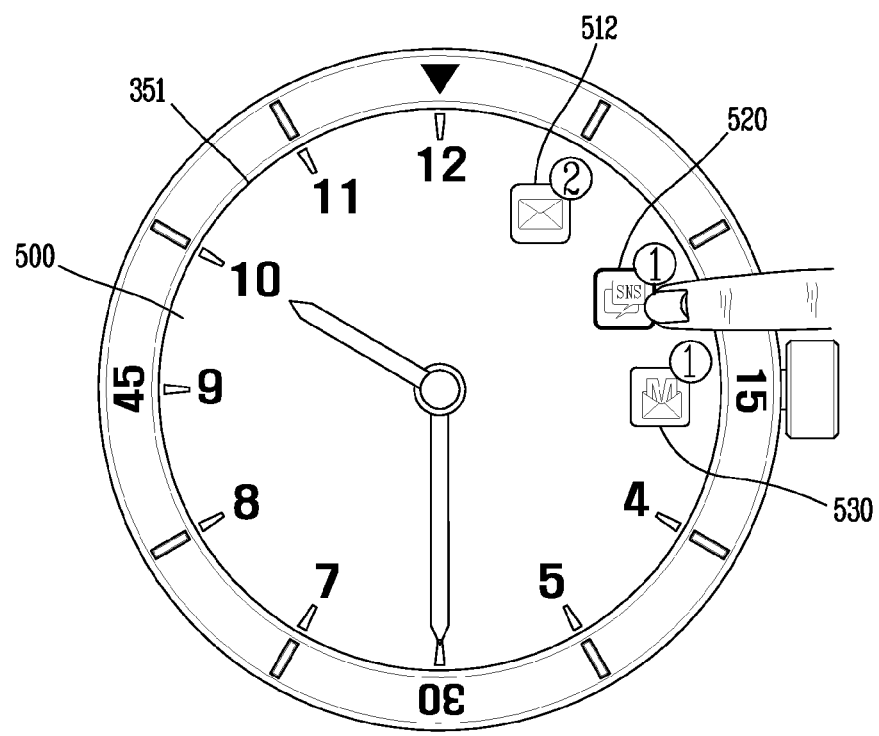
FIGS. 5B and 5C are views each illustrating an operation of a mobile terminal associated with a graphic object which is output instead of an index.
Figure 5B:
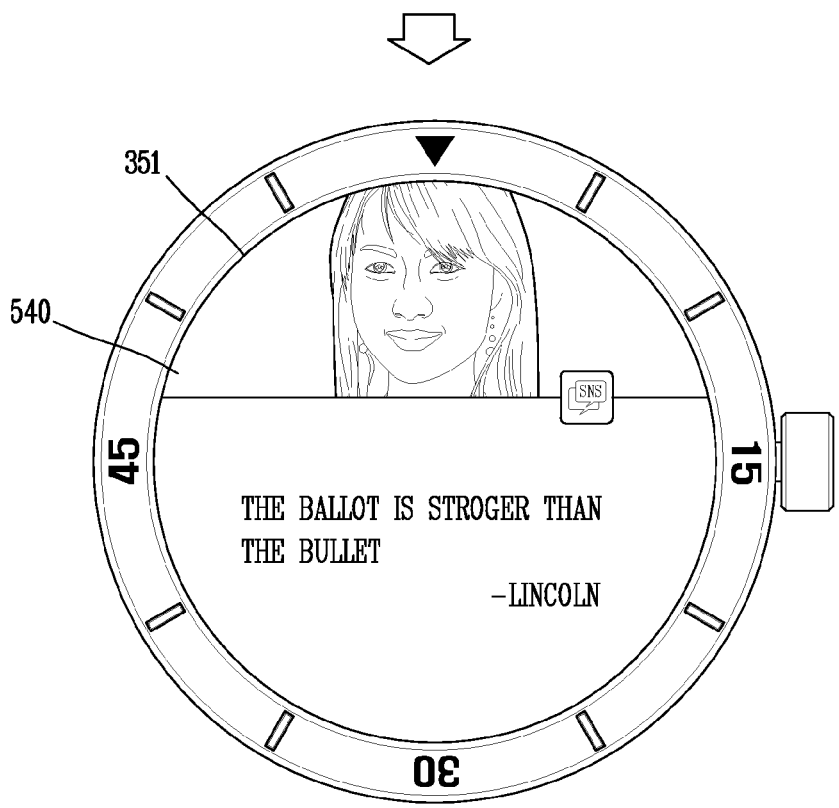
Figure 5C:
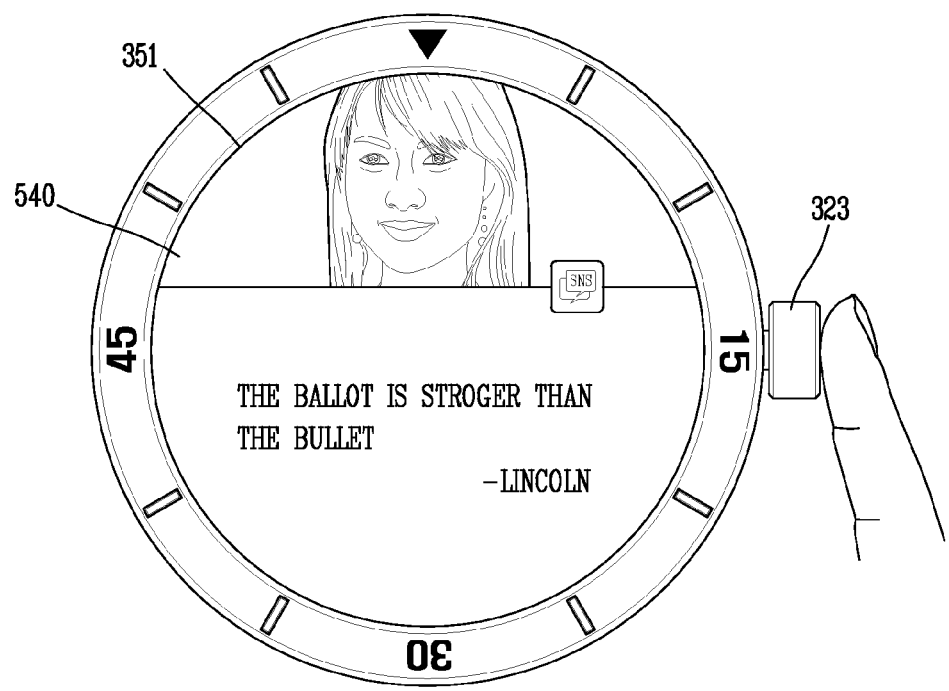
Figure 5C:
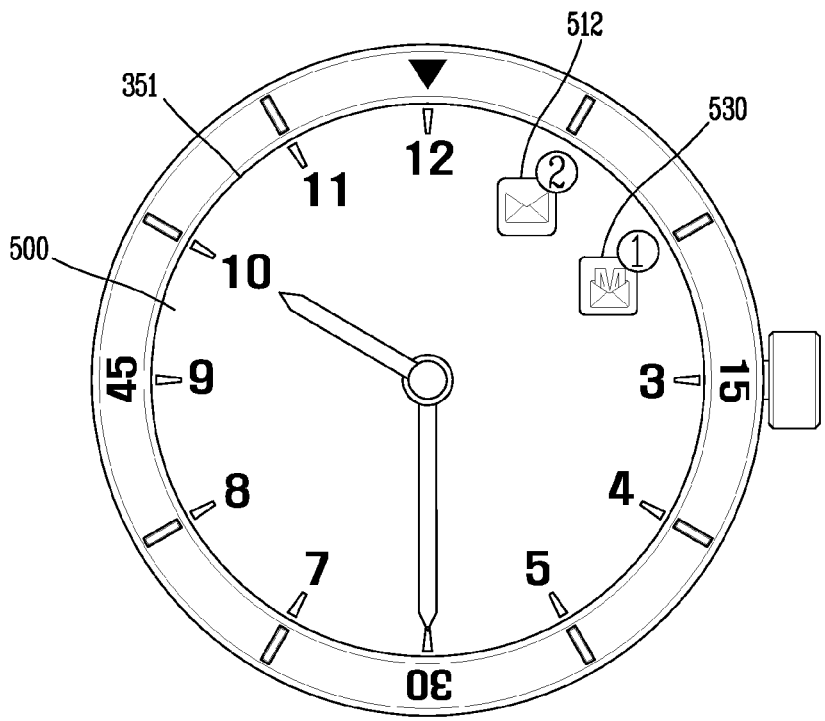

FIG. 5A is a conceptual view illustrating the control method of FIG. 4 in accordance with one exemplary embodiment, and FIGS. 5B and 5C are views each illustrating an operation of a mobile terminal associated with a graphic object, which is output by taking the place of an index.

As illustrated in FIG. 5A, the wearable device 300 according to the present invention includes a touch screen 351 to output time information 500. The time information 500 includes a plurality of indexes, an hour hand 502, a minute hand 504, and a control point 506 to connect the hour hand and the minute hand to each other. The plurality of indexes may be varied into various shapes. Here, for the sake of explanation, description will be given of, but not limited to, an example where the plurality of indexes are formed by 12 numbers from 1 to 12 and the respective numbers from 1 to 12 correspond to hour marks indicating hours from one o'clock to 12 o'clock. That is, the indexes may be changed into various forms, such as the aforementioned numbers or figures, and may be formed by less than 12 numbers.

Meanwhile, when an event is generated from at least one application, the controller 180 converts at least one of the plurality of indexes into a graphic object associated with the application. When a plurality of events are generated from different applications, different graphic objects sequentially replace the plurality of indexes output on predefined positions thereof in the order of generation of the events.

In response to the generation of the different events from the different applications, different graphic objects may be newly generated sequentially from the number 1 to the number 12. For example, as illustrated in FIG. 5A, when a first event is generated from a first application, one of the plurality of indexes is converted into a first graphic object 510 associated with the first application. Afterwards, when a second event is generated from a second application, another index different from the one index of the plurality of indexes is converted into a second graphic object 520 associated with the second application. The another index is an index adjacent to the one index, namely, corresponds to an index which is located at the right based on the one index.

In this manner, the user can intuitively recognize the order of the event generation, and check notifications generated from different applications at once by virtue of the arrangement of the notifications by each application. In addition, the graphic object performs the function of an index indicating time.

Meanwhile, the graphic object may include number information related to the number of events generated. For example, the first graphic object 510 may include number information (for example, the number '1') which indicates the generation of one event from the first application. When a second event is additionally generated from the first application while the first graphic object 510 is output, the number information included in the first graphic object 510 may be updated. For example, the controller 180 may update the number information (for example, the number '1') into another number information (for example, the number '2') which indicates the generation of two events from the first application (510→512).

Referring to FIGS. 5B and 5C, graphic objects may be generated in the order of event generation and output in a manner of replacing indexes. The graphic object may disappear when the user's check is completed.

In more detail, FIG. 5B illustrates an example that first to third graphic objects 512, 520 and 530 are output together with time information 500. When the user touches the second graphic object 520, the time information 500 and the first to third graphic objects 512, 520 and 530 disappear. In this instance, the controller 180 executes an application associated with the second graphic object 520 and controls the touch screen 351 to output an execution screen 540 of the application.

The output of the execution screen 540 is terminated or stopped when a stem 323 (or the user input unit) located on a side surface of the wearable device 300 is pressed or a preset user input is applied. When the output of the execution screen 540 is ended after the user checks information related to an event corresponding to the second graphic object 520, the time information 500 is output back on the touch screen 351. Here, the second graphic object 520 disappears. That is, the output related to the second graphic object 520 is terminated.

Also, the output positions of the other graphic objects 512 and 530 are rearranged in the order of event generation. For example, as the output related to the second graphic object 520 is terminated, the first graphic object 512 is output on the position of the number 1 and the third graphic object 530 is output on the position of the number 3.

Hereinafter, screen information inducing an indication hand which moves according to the lapse of time is defined as 'home screen.' In a state where an event has not been generated, the home screen includes a plurality of indexes, an hour hand and a minute hand. However, when an event is generated, at least one of the plurality of indexes disappears and a graphic object associated with an application is included in the home screen, in replacement of the one index. This may allow for providing a new type of home screen specialized for the wearable device 300.

Figure 5D:
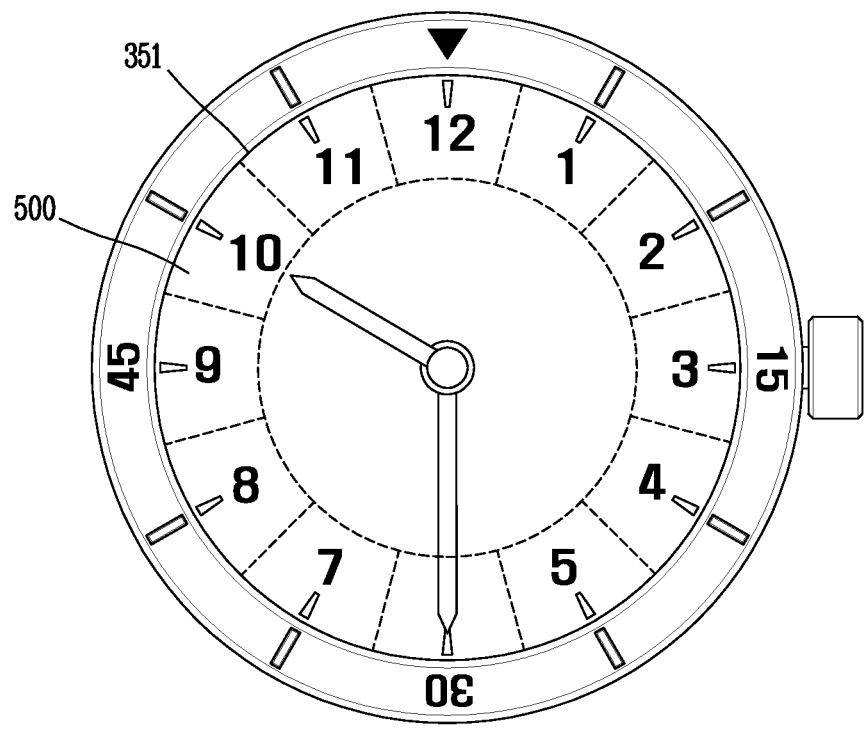
FIG. 5D is a conceptual view illustrating a region in which a plurality of indexes and/or graphic objects are output in a mobile terminal in accordance with the present invention.

FIG. 5D is a conceptual view illustrating a region in which a plurality of indexes and/or graphic objects are output in a mobile terminal in accordance with the present invention.

For a smart phone having a rectangular display unit, graphic objects are arranged in rows and columns without overlapping. However, the wearable device 300 according to the present invention is provided with a circular touch screen 351, and thus requires for a new type of interface.

Referring to FIG. 5D, the controller 180 may divide an edge region of the touch screen 351 into 12 virtual regions. In more detail, the virtual regions include 12 virtual regions from a first virtual region on which the number 1 is output to a 12$^{th}$ virtual region on which the number 12 is output. Virtual lines for partitioning the virtual regions are not output on the touch screen 351, but the controller 180 outputs indexes and/or graphic objects using the virtual regions.

In general, since the number 1 is the first number among natural numbers, when events are generated from a plurality of applications, a graphic object of an application from which an event has been generated first is output on the first virtual region. Afterwards, a graphic object of an application from which a second event has been generated is output on the second virtual region. In this manner, the user can intuitively recognize applications with events generated therefrom and the order of generation of the events.

FIGS. 6A to 6I are views illustrating a method of outputting graphic objects together with an hour hand and a minute hand in a mobile terminal in accordance with the present invention. Hereinafter, operations of the mobile terminal associated with the home screen will be described in more detail with reference to FIGS. 6A to 6I.

Figure 6A:
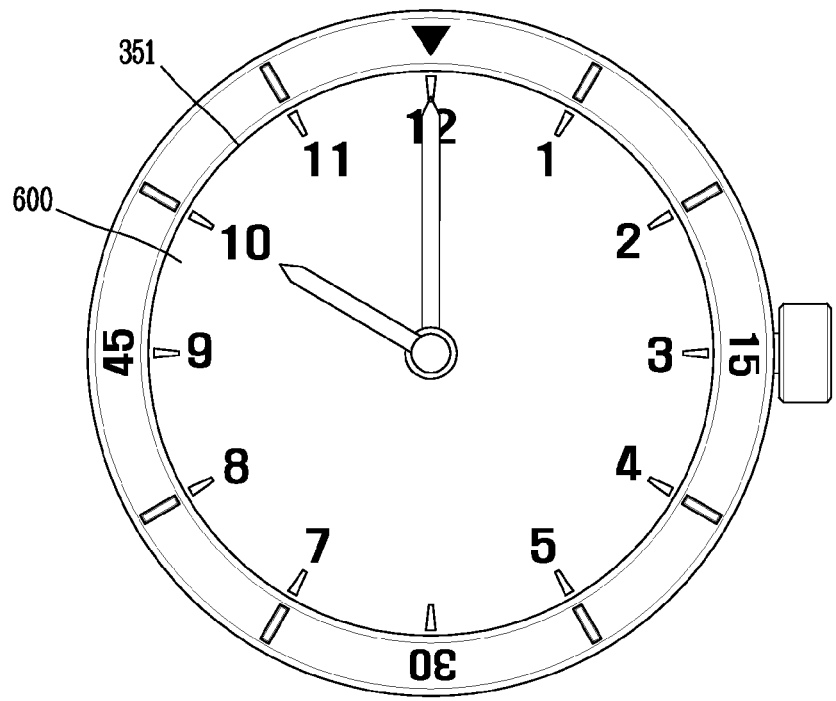
FIGS. 6A, 6B, 6C, 6D, 6E, 6F, 6G, 6H and 6I are views illustrating a method of outputting graphic objects together with the hour hand and the minute hand in a mobile terminal in accordance with the present invention.
Figure 6A:
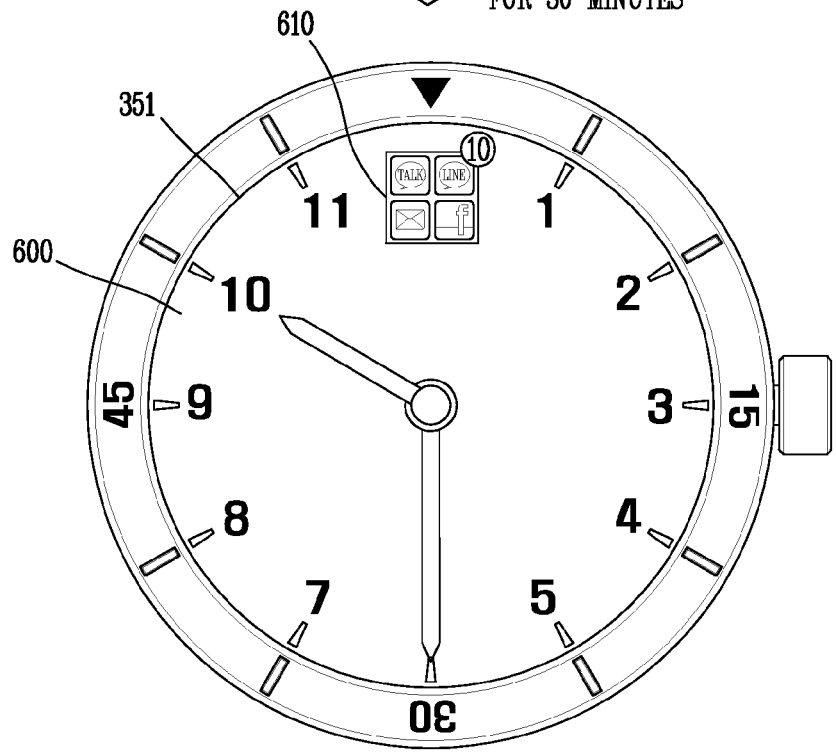

As illustrated in FIG. 6A, without an event generated, a plurality of indexes, an hour hand and a minute hand are included in a home screen 600.

Meanwhile, when an event is generated from at least one application, a notification icon 610 notifying the event generation is output on a region where one of the plurality of indexes is output. For example, the notification icon 610 may be output on a region with the number 12 output thereon, instead of the number 12, or output on the number 12 to obscure at least a part of the number 12.

When events are generated from a plurality of applications, the notification icon 610 is output in the form of a folder. That is, the notification icon 610 includes graphic objects respectively associated with the plurality of applications with the events generated therefrom. Also, number information which guides how many notifications are left unchecked may be output together with the notification icon 610, or included in the notification icon 610. For example, as illustrated in FIG. 6A, when there are totally 10 notifications unchecked, the number '10' may be output on a region adjacent to the notification icon 610.

Meanwhile, the controller 180 senses a touch input applied to the notification icon 610 while the notification icon 610 is output on the home screen 600.

Figure 6B:
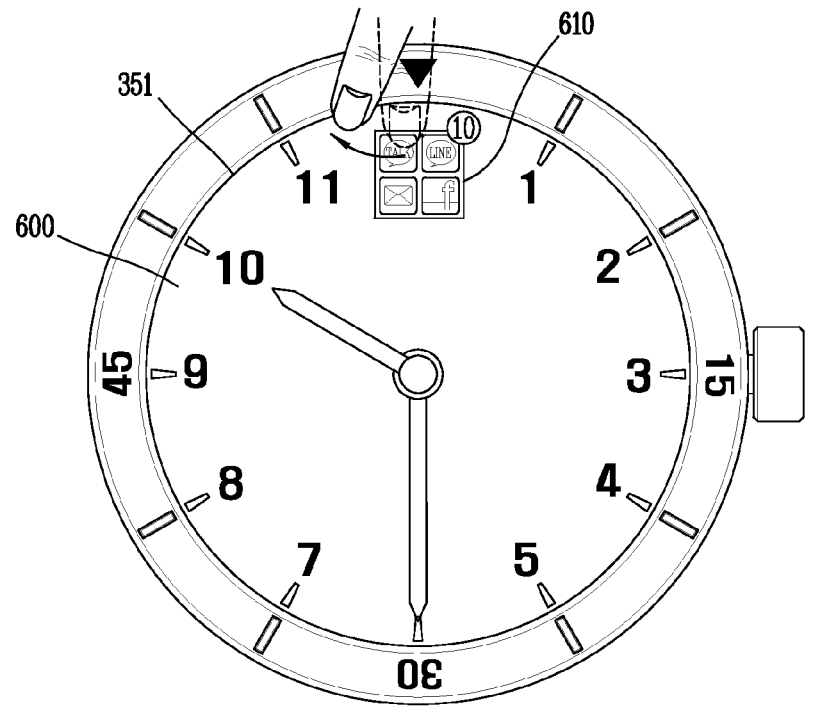
Figure 6B:
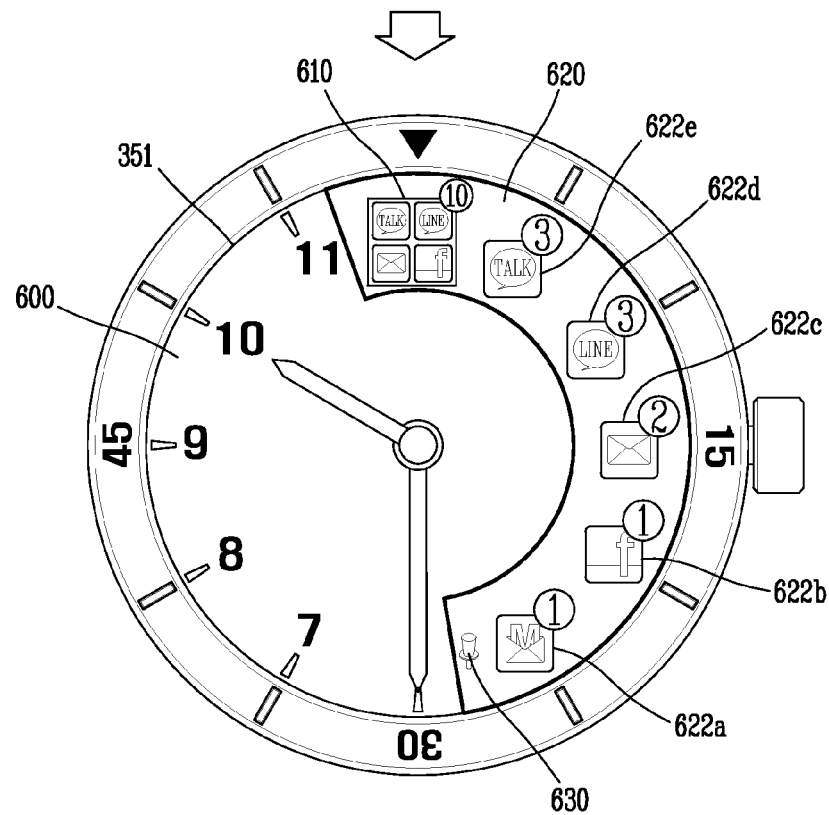

In this instance, a different control operation may be carried out according to a type of the touch input. For example, when a long touch is applied to the notification icon 610, the notification icon 610 may be deleted from the home screen 600. On the other hand, as illustrated in FIG. 6B, when a short touch is applied to the notification icon 610, the controller 180 outputs graphic objects included in the notification icon 610 on the home screen 600. For example, FIG. 6B illustrates an example that 10 events have been generated from five different applications.

Here, five graphic objects 622a to 622e corresponding to the five different applications may be output on virtual regions, on which different indexes were output, on the home screen 600. That is, since there are the five graphic objects 622a to 622e to be output on the home screen 600, five different indexes (the numbers 1 to 5) which were output on the home screen 600 may be converted into the graphic objects 622a to 622e. Here, the graphic objects 622a to 622e are output in the order of the generation of the events in a clockwise direction based on a region where the notification icon 610 is output.

In more detail, the controller 180 may set a partial region of the entire region of the touch screen 351 to a notification region 620 for outputting the graphic objects, in response to a short touch applied to the notification icon 610, and output the graphic objects included in the notification icon 610 on the notification region 620.

The notification region 620 includes at least one of the virtual regions, and refers to a region for outputting the graphic objects other than the indexes.

In response to a short touch applied to the notification icon 610, the controller 180 generates an image which gradually changes in size along an outer circumference of the touch screen 351, and outputs the graphic objects within the image. That is, in response to the short touch, information is provided in a manner of unfolding the image, and the graphic objects are sequentially output. In a more detailed example, an effect of unrolling a rolled paper or the like in response to the short touch may be provided to the image. The image may be used to divide the notification region 620 from the other region except for the notification region 620 of the touch screen 351.

In this manner, there coexist on the home screen the indexes and the graphic objects output in replacement of the indexes. The wearable device 300 may notify the user of time and simultaneously an event generated from at least one application.

Meanwhile, the notification region 620 may be fixed on the home screen 351. More particularly, when it is needed to output the home screen on the touch screen 351, the controller 180 outputs the home screen along with the notification region 620. For example, when the touch screen 351 is turned off and then turned on, the home screen is output again along with the notification region 620. Since the notification region 620 is fixed on the home screen, the graphic objects included in the notification region 620 may be continuously output on the screen without disappearing.

The controller 180 may output an object 630 which guides that the notification region 620 is in a fixed state. The object 630, for example, may be an image having a shape like a pin or a clip. An effect that the pin or clip is stuck into an unrolled paper not to be rolled back may be provided to the object 630.

Figure 6C:
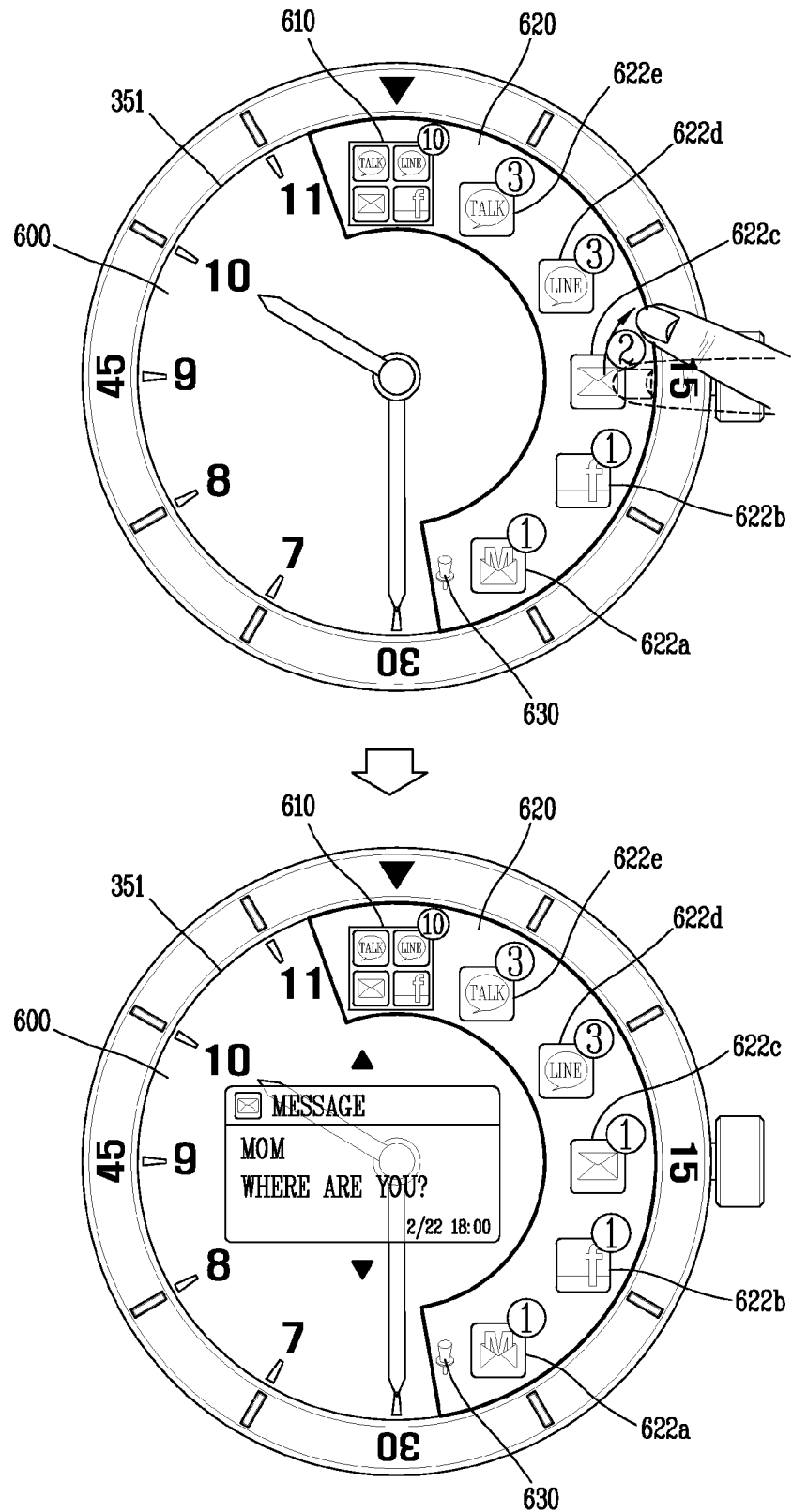

Referring to FIG. 6C, while the notification region 620 is fixed, when a touch input is applied to a graphic object included in the notification region 620, the controller 180 outputs information related to an event corresponding to the graphic object onto one region of the touch screen 151. For example, the event may be a message reception, and the information may be contents (details) of the message. As another example, the event may be an alarm of a schedule set on a schedule management, and the information may be details of the set schedule. As another example, the event may be a generation of an application to be updated, and the information may be details relating to the application to be updated.

A new control command may be executed in response to a touch input applied to the information related to the event while the notification region 620 and the information related to the event are output. For example, information which is output may change in response to a flicking input applied to the event-related information. Here, the output information may correspond to sequentially-generated events, respectively.

In this manner, the user can fast check the event-related information on the home screen.

Figure 6D:
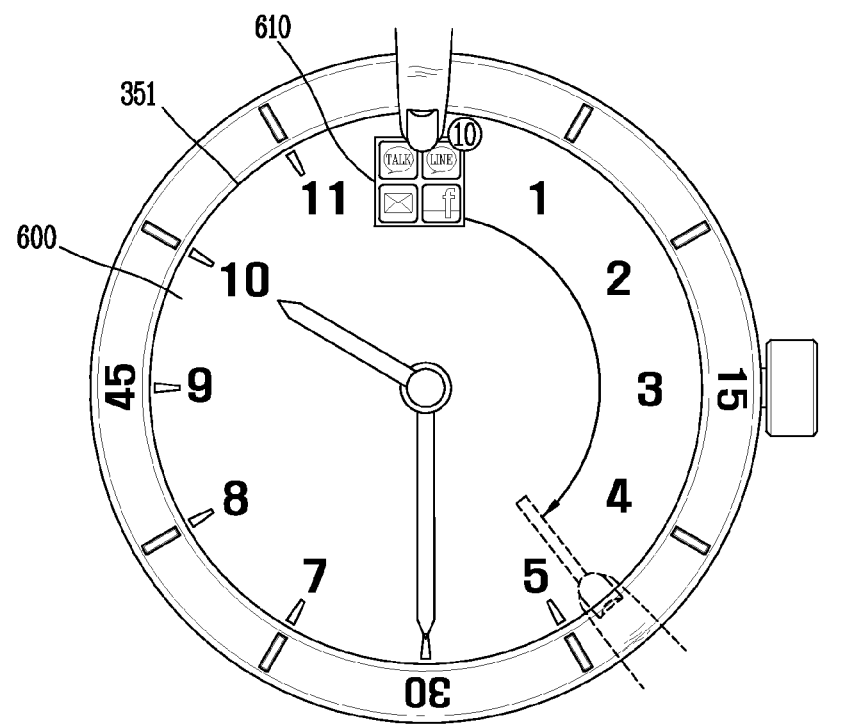
Figure 6D:
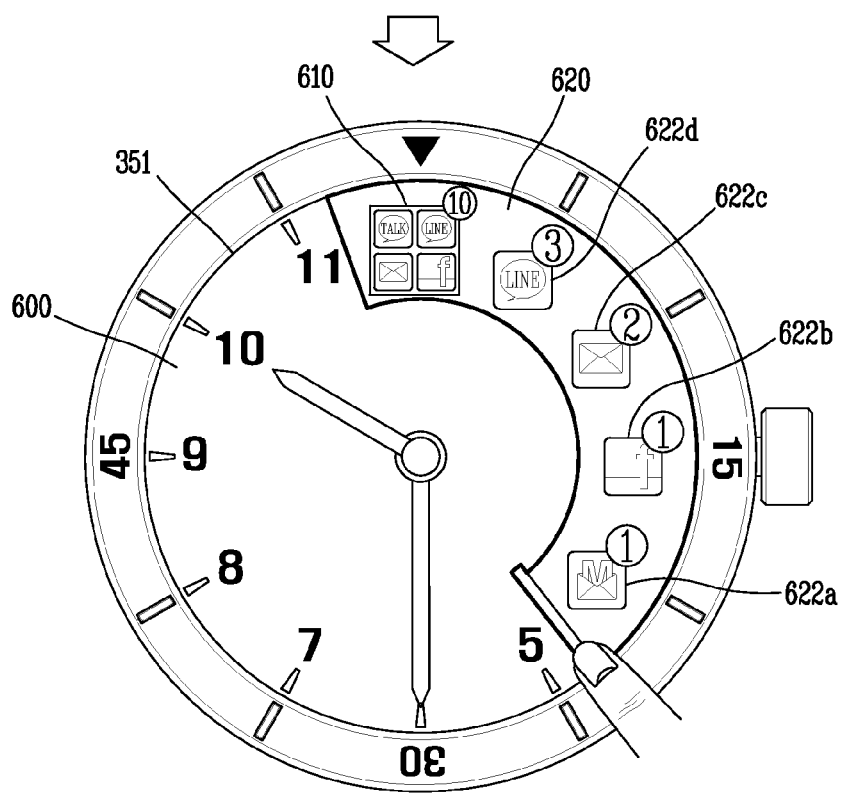
Figure 6E:
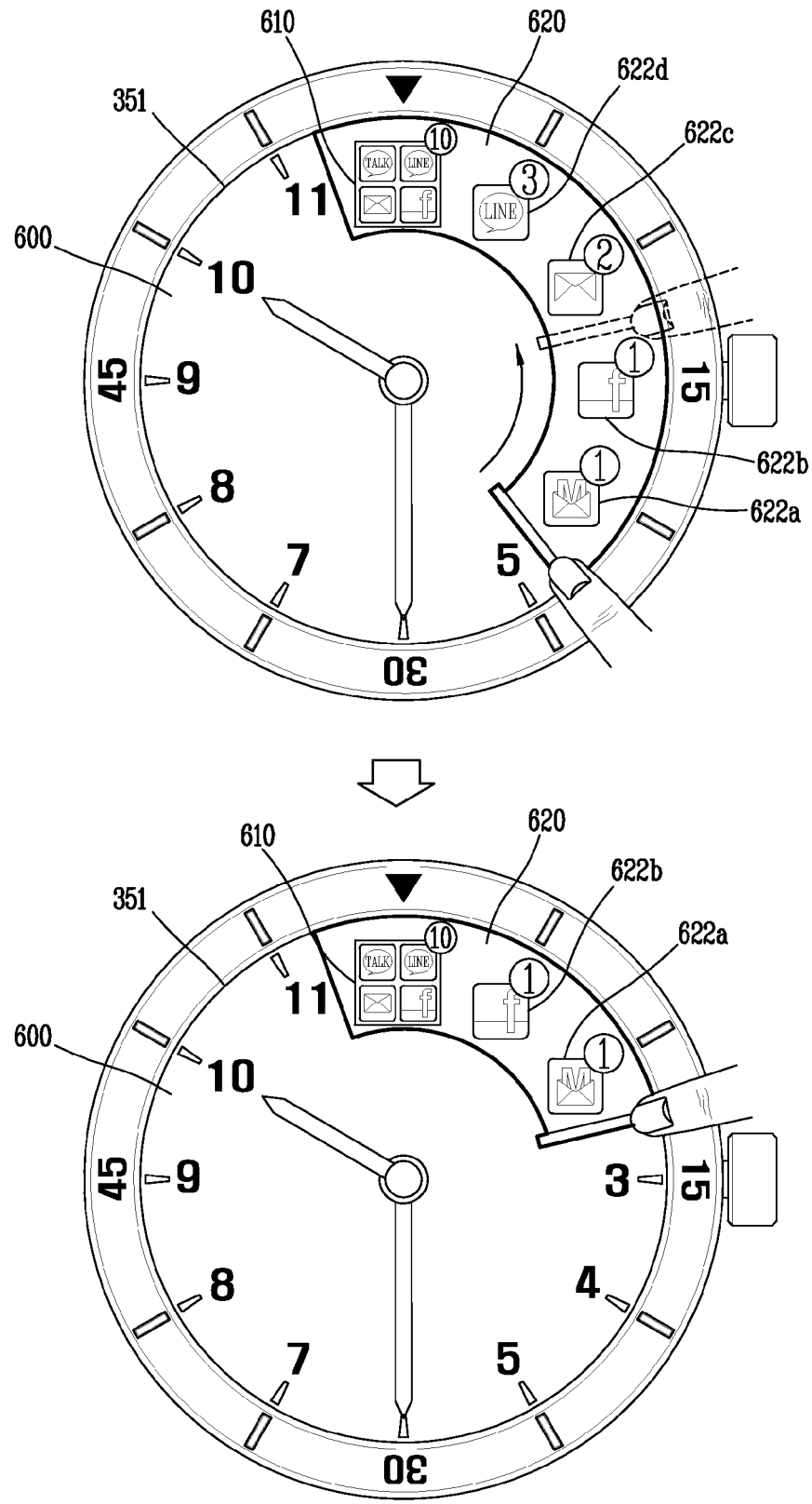

Meanwhile, as illustrated in FIGS. 6D to 6E, when a drag input is applied to the notification icon 610, the controller 180 generates an image which gradually changes in size along a moving path of the drag input, and outputs graphic objects associated with applications within the image. The number of graphic objects output in response to the drag input may change, and the graphic objects notifying the event generation are sequentially output in the order of the generation of the events. Additionally, as illustrated in FIG. 6E, when the drag input is moved in a reverse direction after the graphic objects are displayed, the graphic objects which were previously output (622b, 622a) may disappear as the drag input is moved over or past each graphic object, and the corresponding indexes (corresponding to the 3 and 4 o'clock indexes in FIG. 6E) may be re-displayed in their original positions according to the drag input in the reverse direction.

FIG. 6D illustrates an example of a drag input moving in a clockwise direction, but the present invention may not be limited to this. Although not illustrated, when a drag input which starts from the notification icon 610 and moves in a counterclockwise direction, the image may be formed in the counterclockwise direction based on the notification icon 610.

Meanwhile, the image may be processed in a different manner according to a user input applied after the drag input is applied.

Figure 6F:
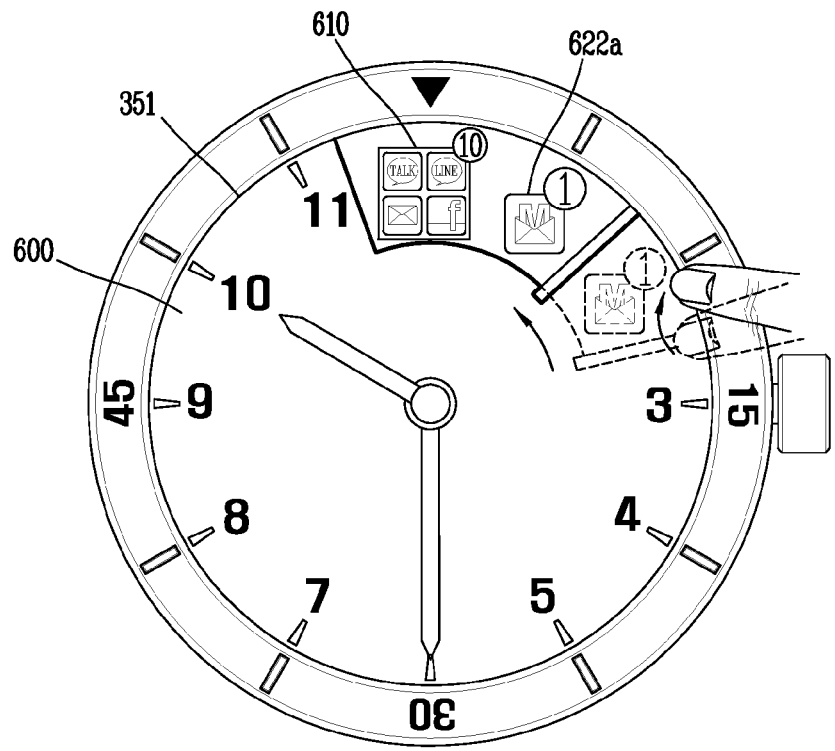
Figure 6F:
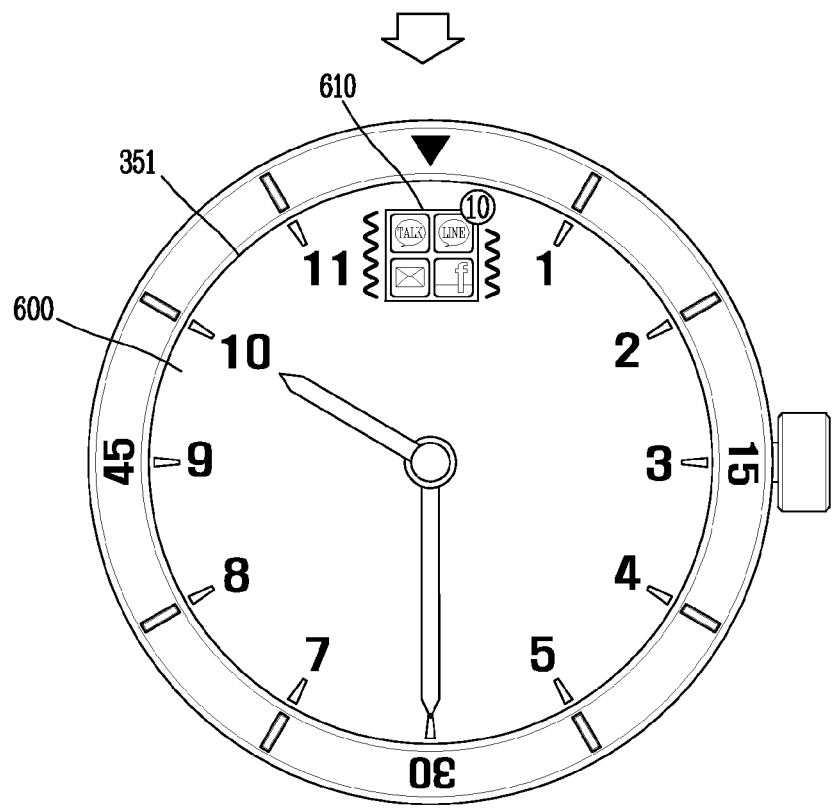

For example, as illustrated in FIG. 6F, when the drag input is released on a certain point, the image and the graphic objects disappear from the touch screen 351. When the user's finger applying the drag input is removed away from the touch screen 351, the image gradually disappears with moving back toward a region where the notification icon 610 is output. In a more detailed example, an effect that an image corresponding to the notification region is rolled into the notification icon 610 may be applied. According to this driving method, information can simply be open and then closed after checking only contents included therein, which may result in implementing a simple user interface.

Figure 6G:
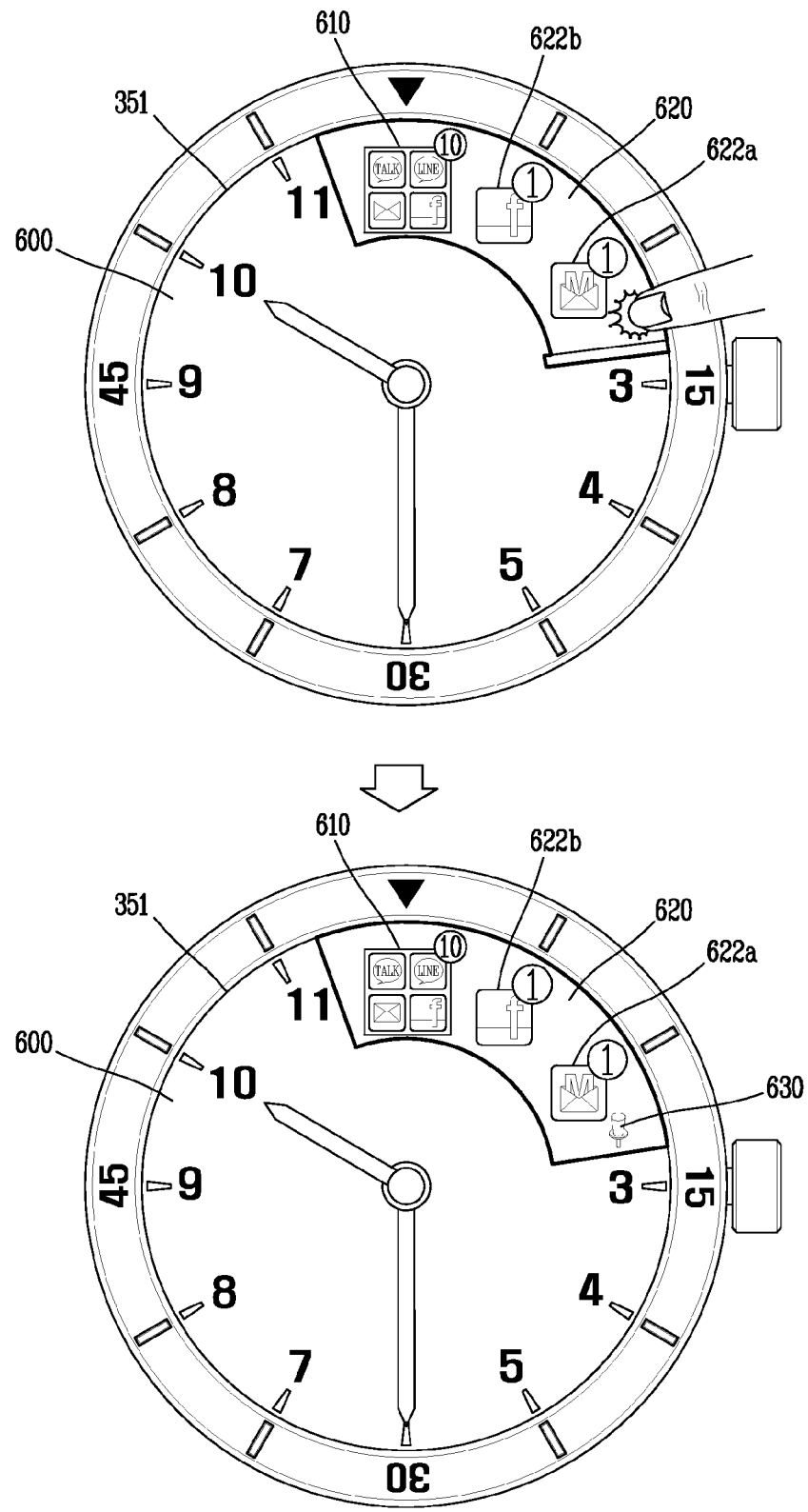

As another example, referring to FIG. 6G, when an object applying the drag input presses a certain point with force stronger than a reference value, the image is fixed to the certain point. As the image is fixed, an object 630 notifying that the image is fixed may be output. According to this driving method, the user can keep outputting the details of the open information or close the information, if necessary, which may result in increasing user convenience.

A touch applied with force stronger than the reference value may be referred to as a force-touch. The touch screen 351 may further include a force sensor to sense the force with which the touch is applied.

Figure 6H:
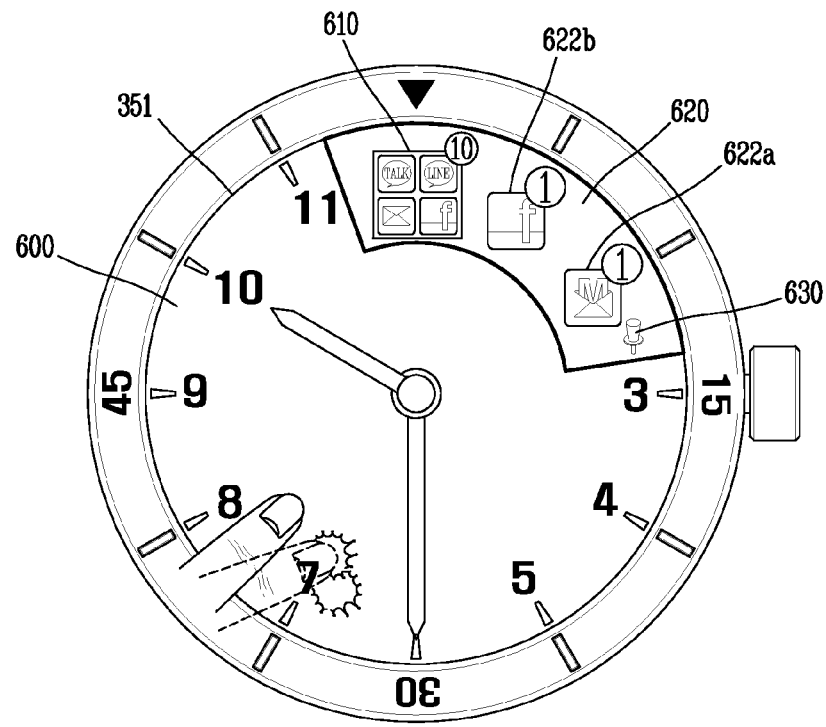
Figure 6H:
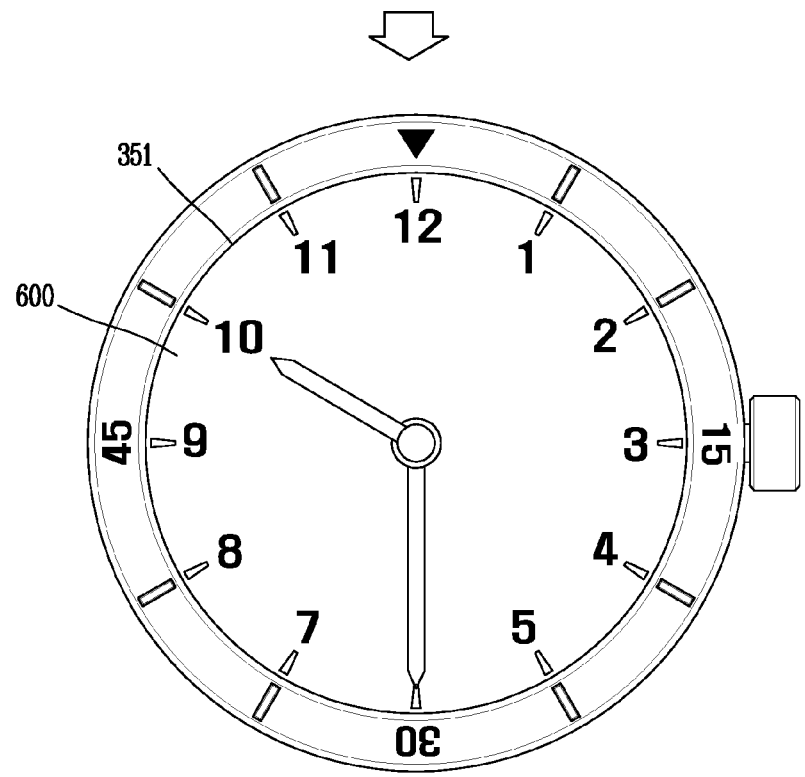

The release of the notification region, as illustrated in FIG. 6H, may be carried out by a touch input of tapping plural times an empty space, on which any graphic object is not output on the touch screen 351. For example, an effect that the image corresponding to the notification region is rolled back into the notification icon 610 may be applied. However, the present invention may not be limited to this. Alternatively, another type of touch input, for example, a drag input applied in a direction toward the notification icon 610, may be applied to release the notification region.

When the notification region is released, the output of the notification icon 610 may be ended as well. When the output of the notification icon 610 is ended, the plurality of indexes are output again.

Figure 6I:
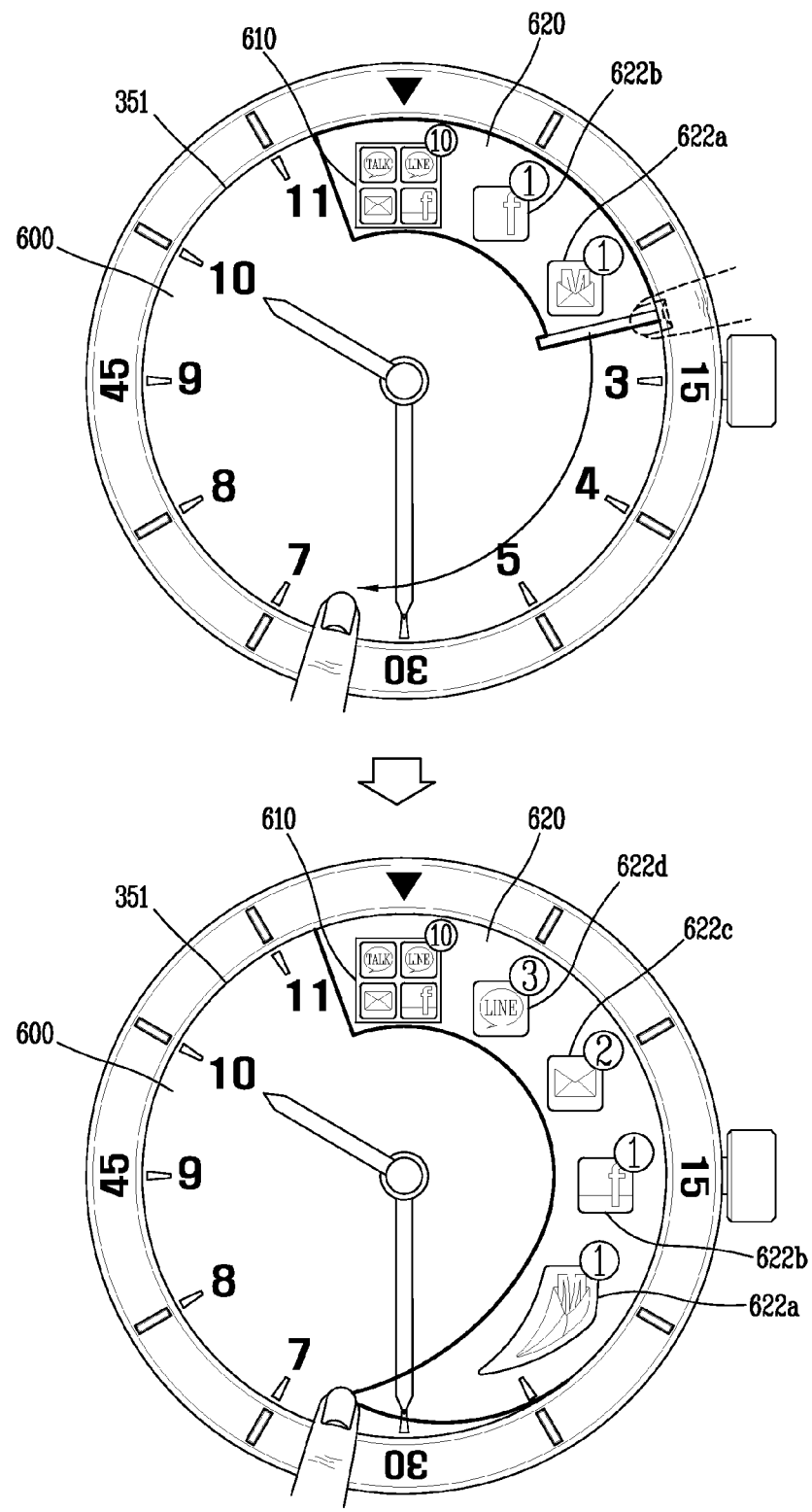

Meanwhile, all the graphic objects included in the notification icon 610 may be output in response to a drag input applied to the notification icon 610. As illustrated in FIG. 6I, when the drag input is continuously moving in the clockwise direction while all the graphic objects are output, the controller 180 may change a shape of at least one of the entire graphic objects. This is to inform of no more graphic object to be output by the drag input.

Meanwhile, at least one of the plurality of indexes which are currently output on the touch screen 351 may be converted into a graphic object associated with an application, in response to a preset user input. Hereinafter, the operation of the wearable device 300 according to the preset user input will be described in detail.

Figure 7A:
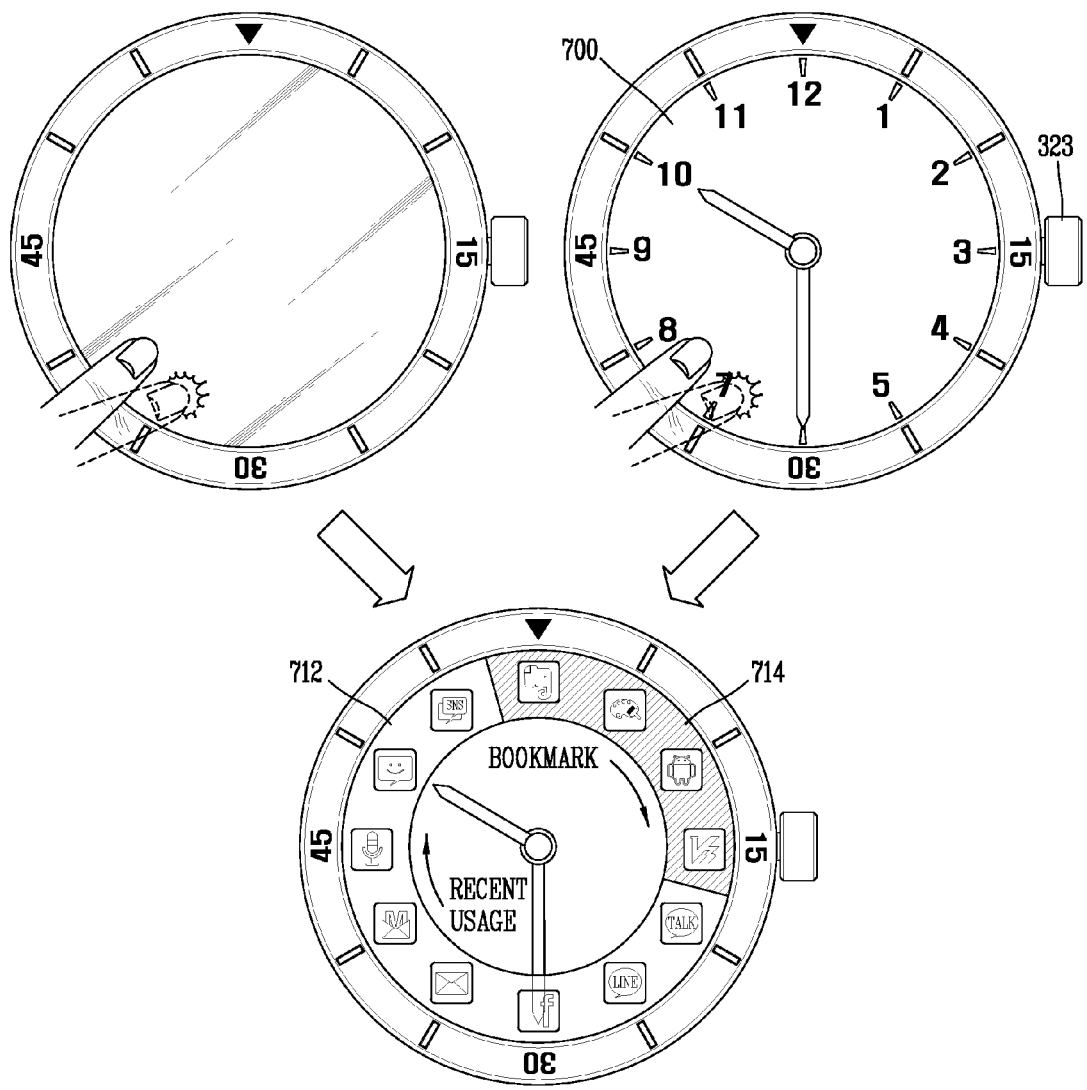
FIGS. 7A and 7B are views illustrating a method of outputting a list of recently-executed applications in a mobile terminal in accordance with the present invention.
Figure 7B:
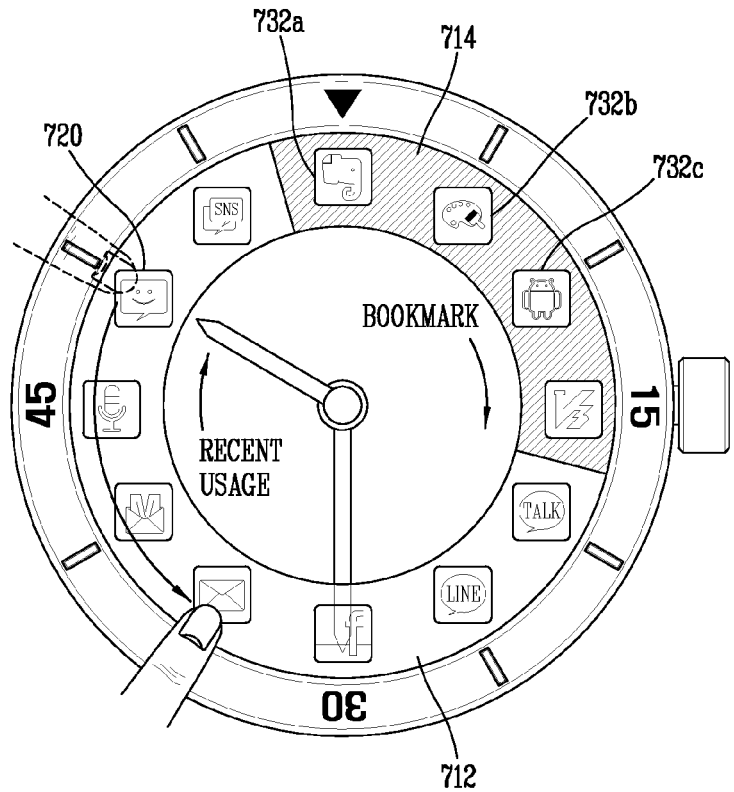
Figure 7B:
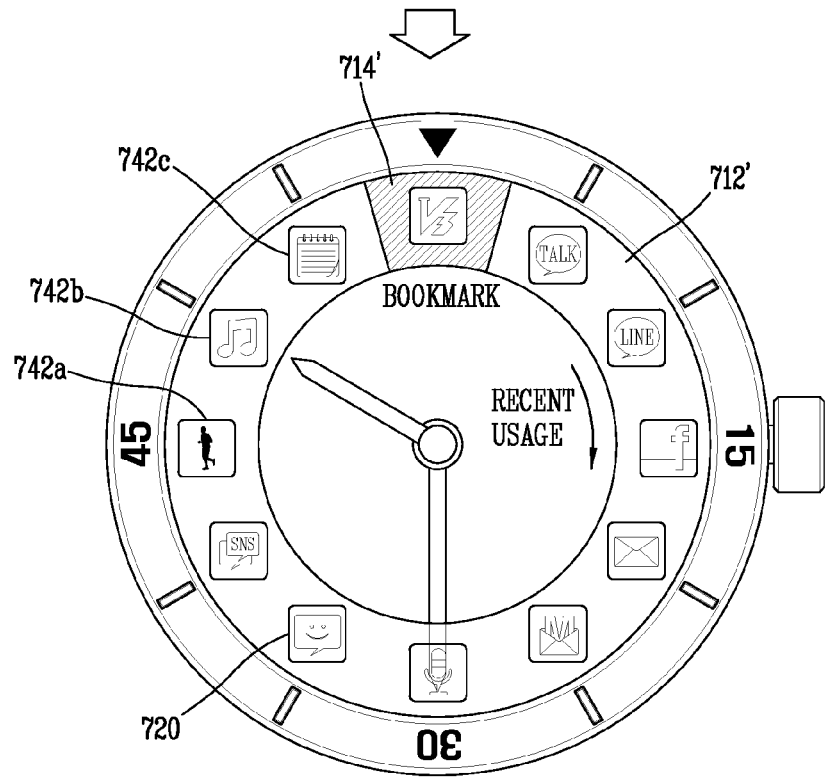

FIGS. 7A and 7B are views illustrating a method of outputting a list of recently-executed applications in a mobile terminal in accordance with the present invention.

There is a user's need to simply re-execute a recently-executed application. To solve this, the controller 180 stores a list of applications executed by the user in the order of execution. In response to a preset user input, the controller 810 outputs a graphic object associated with an application, starting from the most recently-executed application.

Information output by the preset user input is referred to as 'recently-executed application list.' The recently-executed application list includes at least one graphic object, and the graphic object is associated with one of a plurality of applications, such that an execution screen of the one application can be output.

The user input for outputting the recently-executed application list may change in various manners according to embodiments. For example, when the stem 323 is pressed a plurality of times, or when a predetermined region of the touch screen 351 is tapped plural times within a reference time, the controller 180 may determine that a user input for outputting the recently-executed application list has been applied.

The user input for outputting the recently-executed application list, as illustrated in FIG. 7A, may be applied in an inactive or active state of the touch screen 351.

The touch screen 351 may be configured to receive the preset user input even in the inactive state. The touch screen 351 may sense a touch applied to the touch screen 351 at a different activation period, according to whether a light source is in an ON state or an OFF state. For example, when the light source is on, the touch screen 351 may be activated at a first activation period so as to sense a touch. On the other hand, when the light source is off, the touch screen 351 may be activated at a second activation period which is slower than the first activation period, so as to sense a touch. In this manner, the touch screen 351 can efficiently consume power.

When the user input for outputting the recently-executed application list is applied to the touch screen 351 in the inactive state of the touch screen 351, the controller 180 converts the touch screen 351 from the inactive state into the active state, and outputs the recently-executed application list on the touch screen 351 converted into the active state.

Meanwhile, when the recently-executed application list is output, the controller 180 converts at least one of the plurality of indexes into a graphic object included in the recently-executed application list. In more detail, one of the plurality of indexes is set to a reference index, and a graphic object corresponding to the most recently-executed application is output on the set reference index. The other graphic objects included in the recently-executed application list are output in replacement of the other indexes in the order that the applications have been executed. The other graphic objects are sequentially output in the clockwise direction based on the reference index.

Here, the controller 180 may output a list of applications (or bookmarks), which have been registered as favorites, along with the recently-executed application list (or recent usage). When there is not the list of favorite applications, the controller 180 may also output only the recently-executed application list.

For example, as illustrated in FIG. 7A, in response to the user input for outputting the recently-executed application list, the controller 180 may convert some of the plurality of indexes into graphic objects included in the favorite application list, and convert the others of the plurality of indexes into graphic objects included in the recently-executed application list.

When four graphic objects are included in the favorite application list, the controller 180 selects four regions among the virtual regions (see FIG. 5D), and converts indexes included in the selected regions into graphic objects included in the favorite application list, respectively. And, the indexes included in the other virtual regions are converted into graphic objects included in the recently-executed application list. Here, the controller 180 selects a virtual region having the smallest number among the other virtual regions, and sets the smallest number to a reference index. For example, when the favorite application list is output over the $12^{th}$ virtual region and the first to third virtual regions, the smallest number among the other virtual regions is 4.

Since the graphic objects are sequentially output in the clockwise direction based on the region with the number 12 of the touch screen 351 (or the $12^{th}$ virtual region), the user may intuitively recognize the most recently-executed application, and the executed order of the applications.

Meanwhile, when the recently-executed application list and the favorite application list are output simultaneously, the controller 180 distinguishes a first region 712 for outputting the recently-executed application list from a second region 714 for outputting the favorite application list, and processes the first and second regions 712 and 714 in different highlighting manners.

In this instance, the hour hand and the minute hand are kept output on the touch screen 351, which may allow the user to check both the current time and the recently-executed application list at the same time.

Meanwhile, due to the limitation of the total number of a plurality of indexes, some of the graphic objects included in the recently-executed application list may be output on the touch screen 351, and the others of the graphic objects may not be output. In this instance, the user may apply a drag input to the first region 712 to output the others of the graphic objects which have not been output.

In more detail, the controller 180 changes types and positions of the graphic objects output on the touch screen 351 according to direction and moving distance of a drag input. For example, when a drag input which moves a first graphic object 720 currently output on the $11^{th}$ virtual region to the $7^{th}$ virtual region located in a counterclockwise direction, the other graphic objects move counterclockwise. Since each graphic object is displayed on one of the virtual regions, the graphic objects are moved counterclockwise, respectively, by three steps, in response to the applied drag input. As the graphic objects are moved, graphic objects 732a to 732c which move over the $12^{th}$ virtual region in the counterclockwise direction disappear from the touch screen 351 and new graphic objects 742a to 742c appear on the touch screen 351. Also, as the output graphic objects change, the first and second regions also change (712→712' and 714→714').

In general, a scroll function is configured to scroll a screen up and down or to right or left. However, since the wearable device 300 according to the present invention has the circular touch screen 351, there is a requirement for providing a new type of scroll function.

To this end, the controller 180 may construct graphic objects to be output into a linear structure, namely, a shape that the graphic objects are continuously connected to one another. In more detail, graphic objects have orders, and operate in a first in first out (FIFO) manner that an earlier-output graphic object disappears first upon performing the scroll function.

In this instance, the controller 180 sets one of the virtual regions to a reference region, and sequentially outputs graphic objects in a clockwise direction based on the reference region. In an embodiment of outputting 12 graphic objects, when the $12^{th}$ virtual region with the number 12 output thereon is set to the reference region, the first graphic object among the graphic objects is output on the $12^{th}$ virtual region, and the $12^{th}$ graphic object is output on the $11^{th}$ virtual region with the number 11 output thereon.

While the first graphic object is output on the reference region, when the scroll function is executed in a counterclockwise direction, the first graphic object disappears according to the FIFO and the $2^{nd}$ to $12^{th}$ graphic objects are moved by one step in the counterclockwise direction. As the $12^{th}$ graphic object is moved from the $11^{th}$ virtual region to the $10^{th}$ virtual region by the scroll function, a $13^{th}$ graphic object which has not been output is newly output on the $11^{th}$ virtual region. Here, an amount of information scrolled may differ depending on a degree that the scroll function is executed, namely, depending on a moving distance of the drag input.

Meanwhile, while the first graphic object is output on the reference region, when the scroll function is executed in a clockwise direction, the controller 180 provides a bouncing feedback because there is no graphic object located ahead of the first graphic object. That is, when there is no more graphic object to be output by the scroll function, this fact is guided to the user through the bouncing feedback. In response to the execution of the bouncing function, the first graphic object may be stretched out in shape or size in the clockwise direction and then return to the original shape or size. Specifically, the shape of the first graphic object changes according to the direction and moving distance of a drag input. When the drag input is released, the first graphic object returns to its original state. Here, the controller 180 may additionally provide a vibration effect, thereby enhancing the bouncing effect.

FIGS. 8A and 8B and FIGS. 9A to 9C are views each illustrating an operation when a home screen includes a plurality of pages in a mobile terminal in accordance with the present invention.

The screen information including the hour hand and the minute hand have been defined as 'home screen' before. The home screen may be output on the touch screen 351 when the wearable device 300 is in an idle state. Also, when a user input is applied to a home button, the home screen may refer to a main screen (or a background screen) output on the touch screen 351. The home button may be formed as a physical button, such as the stem 323, on the main body of the wearable device 300, or output in the form of an icon on the touch screen 351.

The home screen will now be described in more detail. The home screen may include at least one object, and the object may be an icon of an application installed in the wearable device 300 or a widget. Also, the object may be an icon of an application, which is installed in an external terminal paired with the wearable device 300, or a widget.

Meanwhile, the home screen may include a plurality of pages according to a user selection or the number of applications, and at least one of the plurality of pages may be output on the touch screen 351 according to a user selection. The user may also perform at least one of page addition, page deletion and page edition on the home screen 351. Also, the user may add, delete and edit icons arranged on each page.

Information related to the home screen may be stored in the memory 160, and the controller 180 may output the home screen on the touch screen 351 using the information stored in the memory 160.

In the wearable device 300 according to the present invention, the plurality of indexes included in the home screen may operate as an information provider informing to which page the currently-output page on the touch screen 351 corresponds among the plurality of pages, and also an input device for receiving an output command of one of the plurality of pages.

First, description will be given in detail of a method in which the plurality of indexes operate as an input device for receiving the output command of one of the plurality of pages.

The home screen includes a main page that includes all of the hour hand, the minute hand and the plurality of indexes, and subpages on which an output of at least one of the plurality of indexes is restricted and that includes a graphic object associated with an application in replacement of the at least one index. When the home screen has to be output, the controller 180 may output the main page. However, the controller 180 may also output one of the subpages, instead of the main page, according to a user request.

Figure 8A:
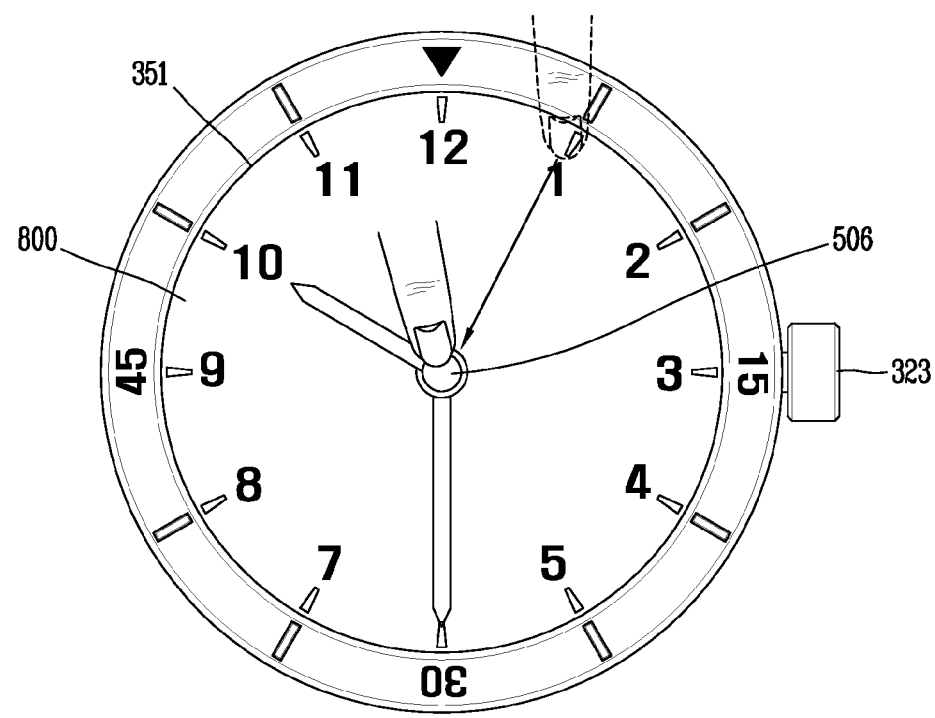
FIGS. 8A, 8B, 9A, 9B, 9C, 9D and 9E are views each illustrating an operation when a home screen includes a plurality of pages in a mobile terminal in accordance with the present invention.
Figure 8A:
Figure 8A:
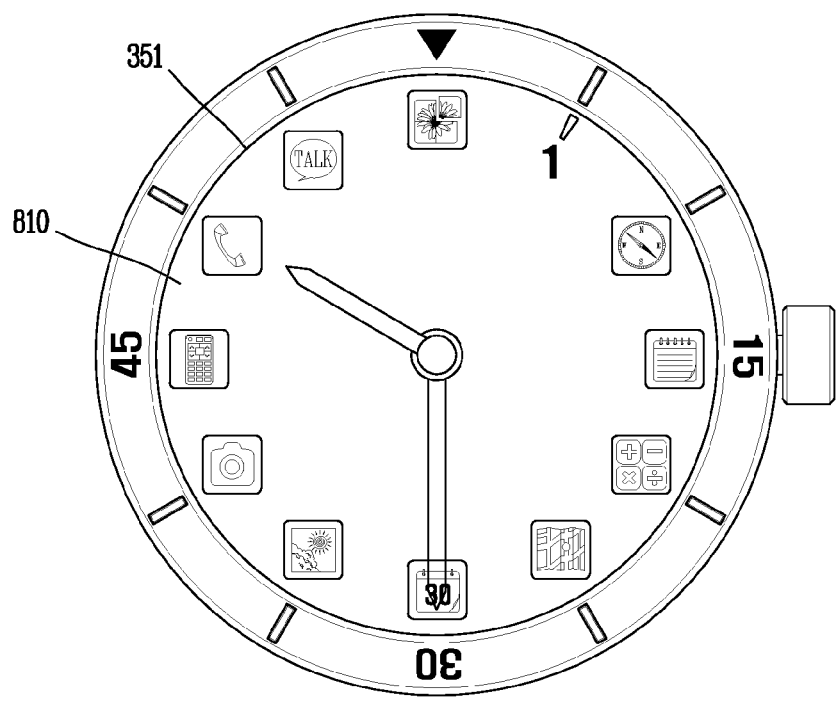

In more detail, as illustrated in FIG. 8A, when a touch input is applied to one of the plurality of indexes while a main page 800 of the home screen 351 is output, the controller 180 converts the main page 800 into one subpage 810 of the subpages. In this instance, the controller 180 may output a different subpage on the touch screen 351 according to a type of the touch input.

The touch input may be an input that a touch applied to a region, on which one of the plurality of indexes is output, continuously moves up to the control point 506 for connecting the hour hand and the minute hand. For example, as illustrated in FIG. 8A, when a touch applied to the number 1 continuously moves up to the control point 506, the controller 180 outputs the first subpage among the subpages on the touch screen 351. Although not illustrated, when a touch applied to the number 2 continuously moves up to the control point 506, the controller 180 may output the second subpage of the subpages on the touch screen 351.

On the other hand, the touch input may be a short touch which is applied to a region on which one of the plurality of indexes is output. In response to the short touch applied to the one of the plurality of indexes, the controller 180 may also output a subpage corresponding to the one index, among the plural subpages, on the touch screen 351. Here, the present invention exemplarily describes the example in which the touch input is a drag input, in order to prevent the wearable device 300 from being malfunctioned due to a user's unexpected touch.

Figure 8B:
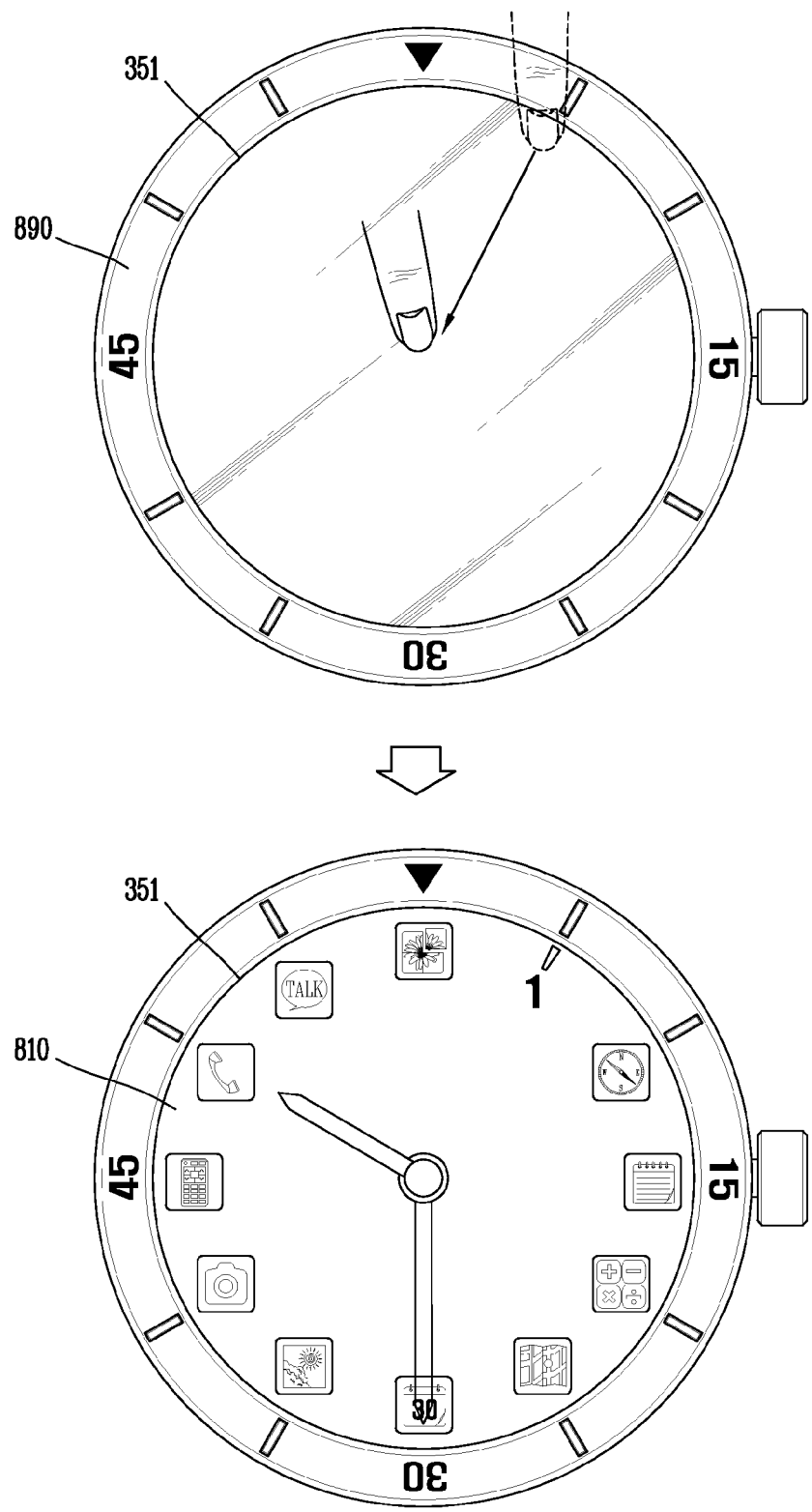

Meanwhile, as illustrated in FIG. 8B, in the inactive state of the touch screen 351, when a touch applied to one point of an edge of the touch screen 351 moves toward a center of the touch screen 351, the controller 180 may convert the touch screen 351 from the inactive state into an active state, and output a different subpage on the touch screen 351 converted into the active state according to the touch.

A bezel of the wearable device 300 has graduations, which may allow the user to accurately input a user input corresponding to a subpage, which the user desires to check, even in the inactive state of the touch screen 351. For example, when the user desires to check the first subpage, the user may apply a touch input, which starts in a direction of one o'clock on the edge of the touch screen 351 and moves toward the center of the touch screen 351. That is, the user can apply a touch input from the first virtual region toward the center of the touch screen 351, so as to convert the touch screen 351 into the active state and output the first subpage.

Figure 9A:
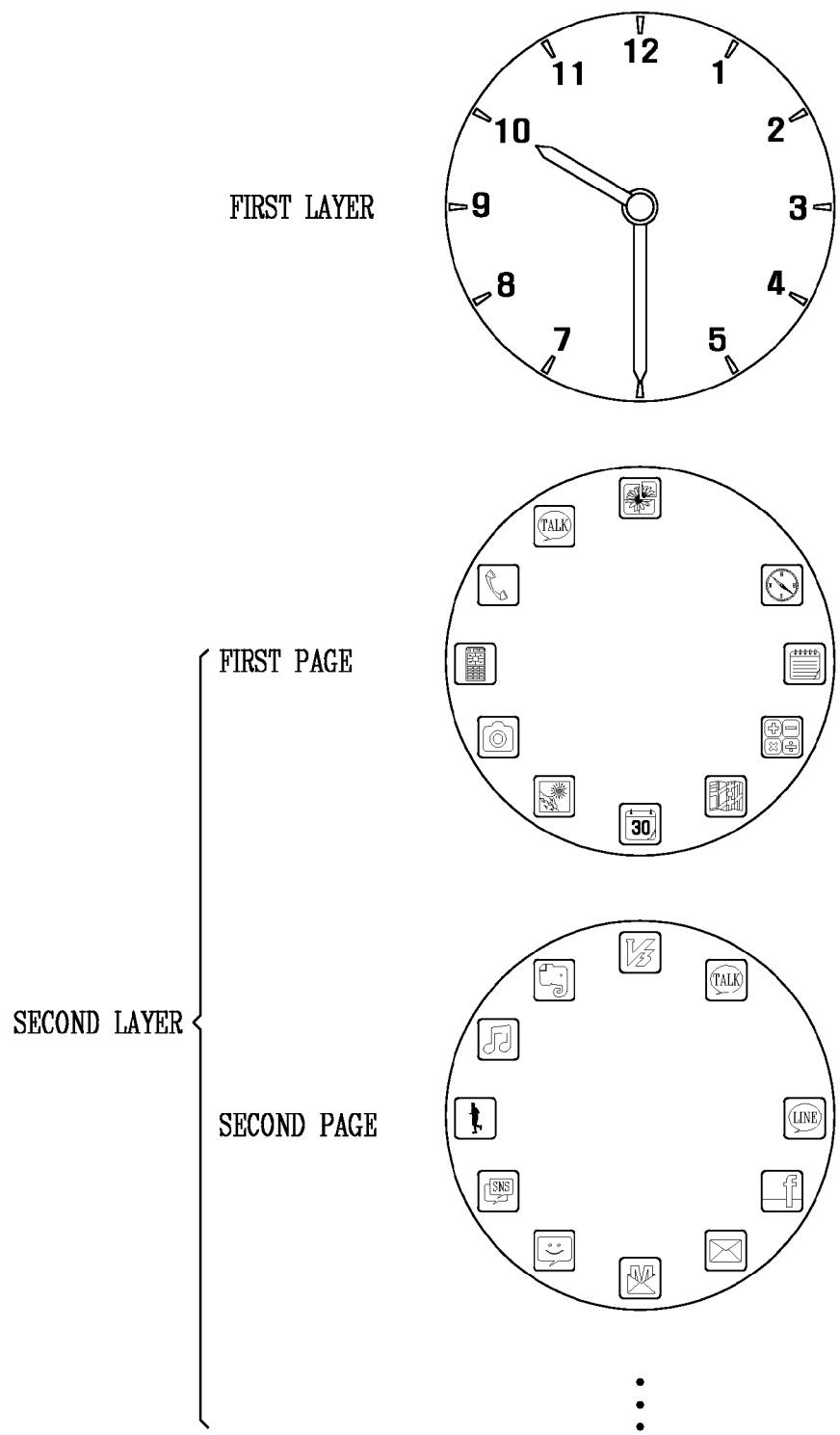

As illustrated in FIG. 9A, the wearable device 300 may control the touch screen 351 to output a first layer corresponding to the main page and a second layer corresponding to one of the subpages in an overlapping manner.

The main page is a screen which includes the plurality of indexes, the hour hand and the minute hand moving according to a lapse of time, and the control point connecting the hour hand and the minute hand. Each of the subpages includes one or more graphic objects, and the one or more graphic objects are arranged in a preset order.

Type and number of the graphic objects included in each subpage may differ according to embodiments.

Meanwhile, a graphic object is not arranged on an index corresponding to a subpage. For example, the first subpage corresponds to the number 1, and a graphic object is not arranged on the first virtual region corresponding to the number 1. As another example, the second subpage corresponds to the number 2, and a graphic object is not arranged on the second virtual region corresponding to the number 2.

When an output command for one subpage is applied, the controller 180 selects the one subpage as a second layer, and controls the touch screen 351 to output the selected second layer to be output in a manner of overlapping the first layer. Here, the second layer is overlaid on the first layer for output. The second layer may be formed transparent or semitransparent such that the first layer can be viewed therethrough. That is, even if the second layer is output, the hour hand and the minute hand included in the first layer can be identified. Here, at least one of the plurality of indexes included in the first layer may be obscured by the graphic objects included in the second layer. In this manner, while the first layer is output, when the second layer is additionally output on the first layer in the overlapping manner, it seems like at least one index is converted into a graphic object.

Meanwhile, since any graphic object is not arranged on an index corresponding to a subpage, even though the first layer and the second layer are output in the overlapping manner, the index corresponding to the subpage is not obscured by the second layer. For example, when the first subpage is output as the second layer, the other indexes except for the number 1 among the plurality of indexes are obscured by the graphic objects. The number 1 is not obscured by a graphic object, whereby the user can intuitively recognize that the currently output page on the touch screen 351 is the first page.

Meanwhile, the controller 180 may convert one of the plurality of subpages into another in response to a user input. In more detail, when a preset user input is received while the one subpage is output as the second layer, the controller 180 terminates the output of the one subpage and outputs the another subpage as the second layer, in response to the user input.

Figure 9B:
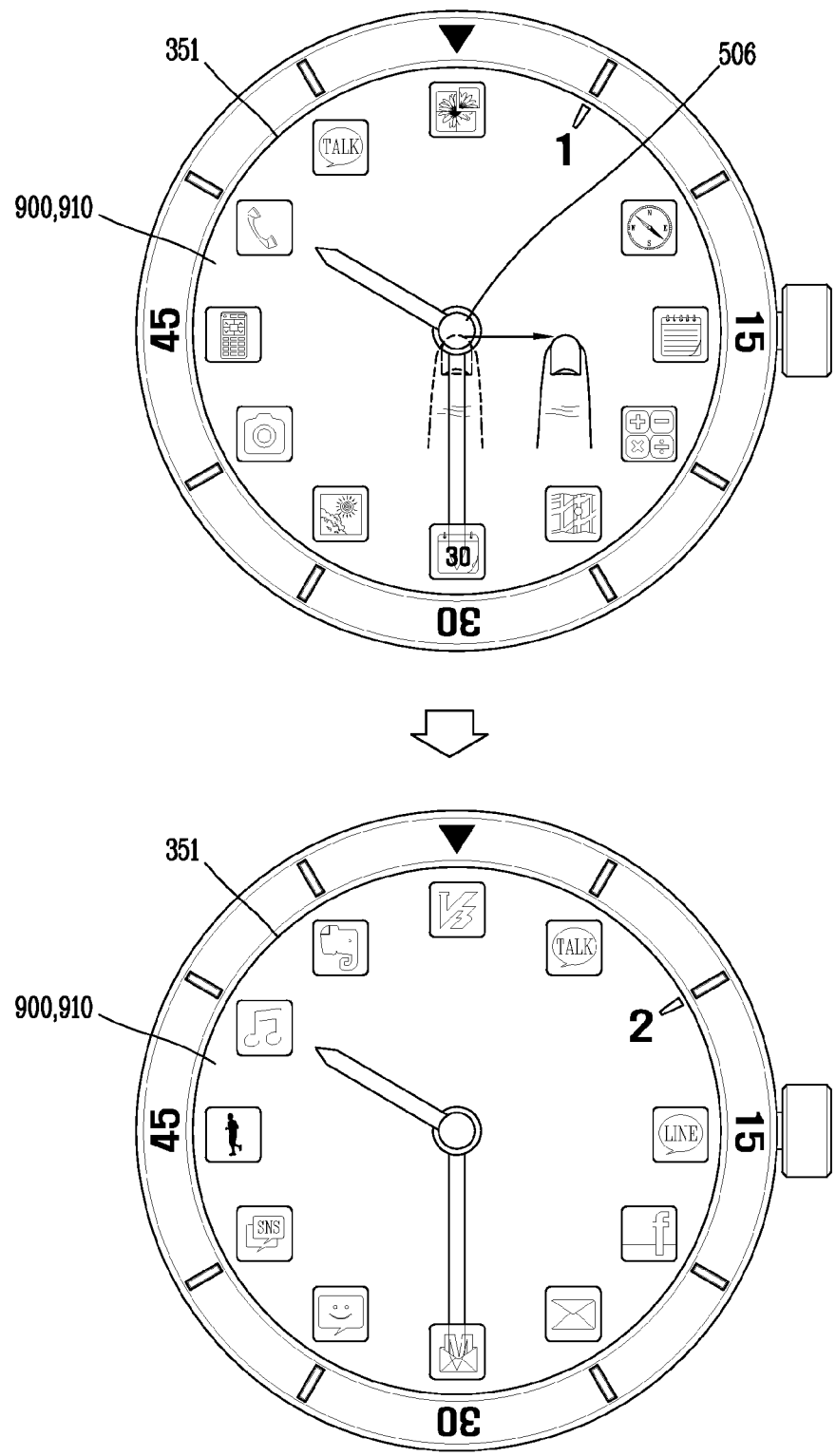
Figure 9C:
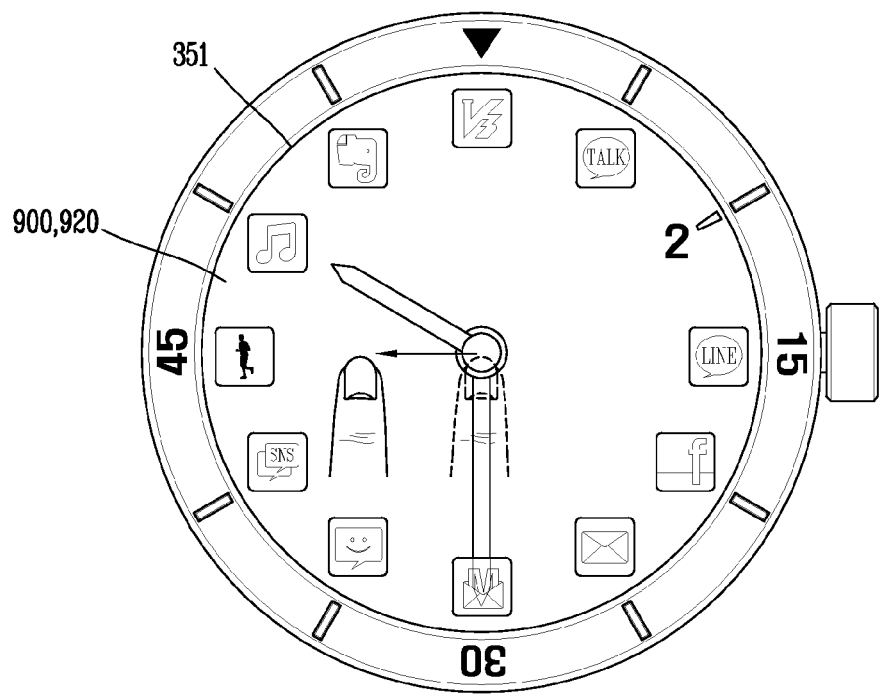
Figure 9C:
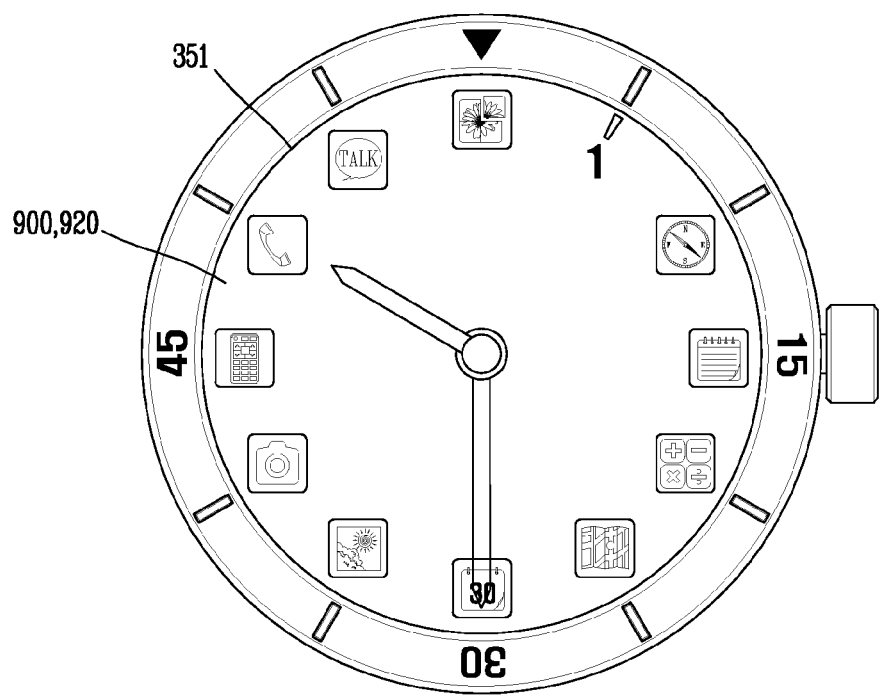

When a touch applied to the control point connecting the hour hand and the minute hand is moved to a certain point on the touch screen 351, the controller 180 may output a previous subpage or the next subpage based on the moving direction of the touch. For example, as illustrated in FIG. 9B, when a touch applied to the control point 506 moves to right while a first subpage 910 is output, the controller 180 outputs a second subpage 920 in replacement of the first subpage 910. As another example, referring to FIG. 9C, when a touch applied to the control point 506 moves to right while the second subpage 920 is output, the controller 180 outputs the first page 910 in replacement of the second subpage 920.

Figure 9D:
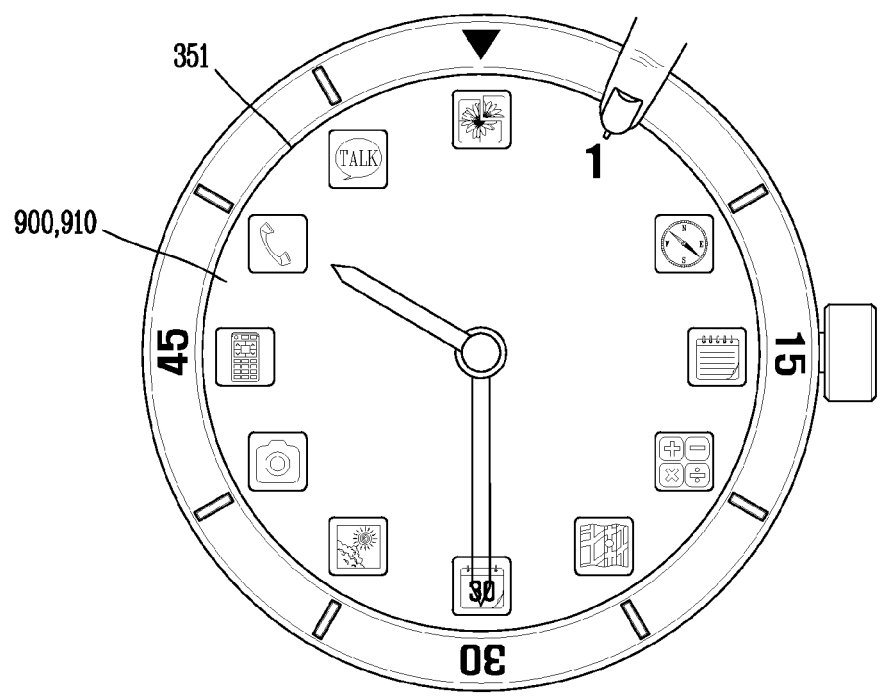
Figure 9D:
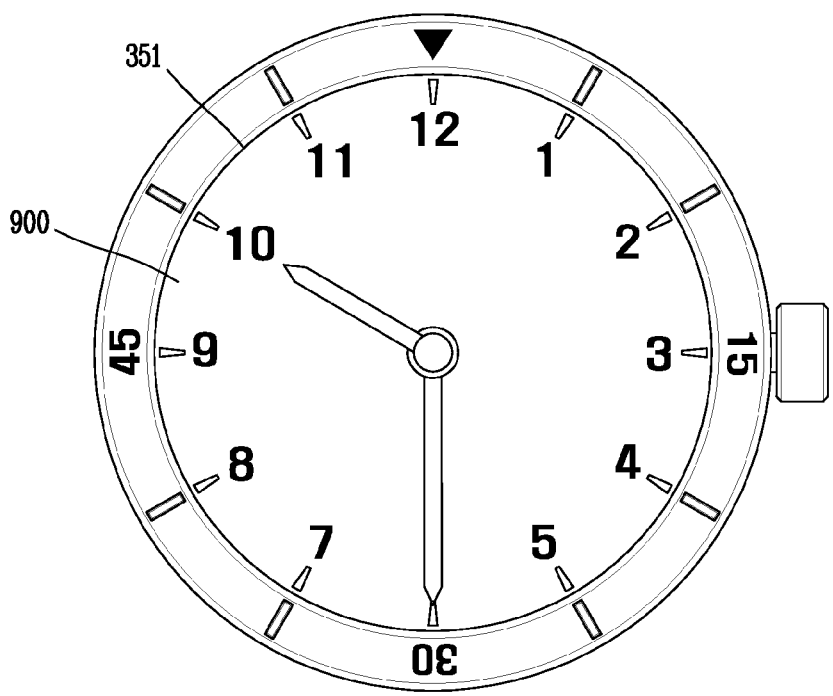

Also, the controller 180 may terminate the output of the second layer based on a user input which is applied while the second layer is output in the manner of overlapping the first layer. More specifically, when a touch is applied to an index which has not been obscured by a graphic object, the controller 180 merely outputs the first layer with terminating the output of the second layer. For example, as illustrated in FIG. 9D, the number 1 is output without being obscured by a graphic object while the first subpage 910 is output. Here, when a touch is applied to the number 1, the output of the first subpage 910 is terminated and the main page 900 is output.

Meanwhile, when a drag input moving clockwise or counterclockwise is applied while the first and second layers are output, the controller 180 rotates the second layer along the direction of the drag input with the first layer fixed. For example, a touch may be applied to a region on which one of the plurality of indexes is output and then continuously move in a clockwise direction or a counterclockwise direction. In this instance, the controller 180 rotates the second layer based on the moving direction of the touch while the first layer is fixed. That is, the second layer is rotated in the clockwise or counterclockwise direction based on the moving direction of the touch. In response to the rotation of the second layer, some indexes obscured by the second layer are output again.

Figure 9E:
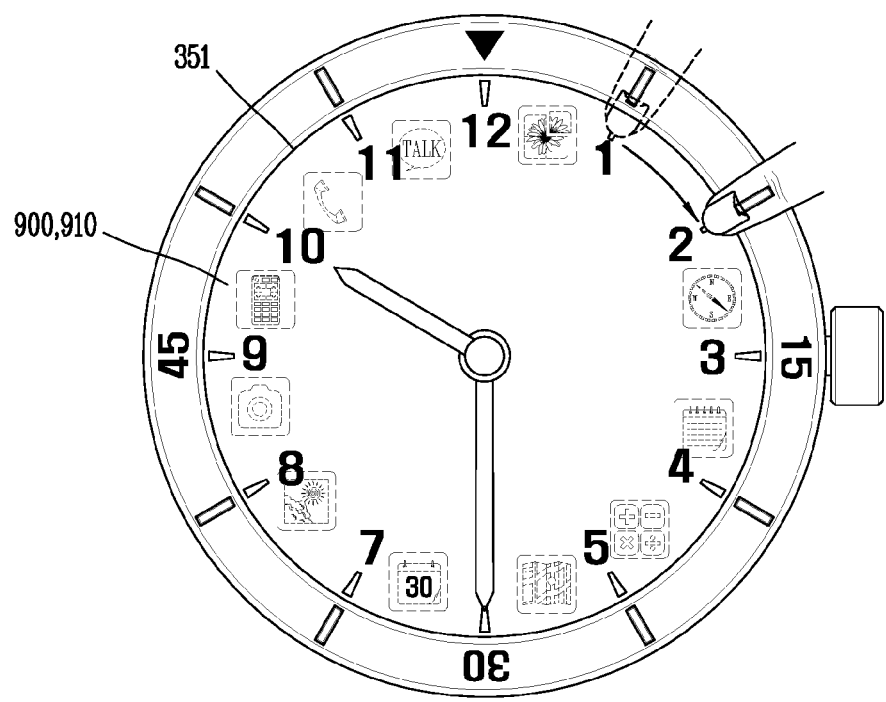
Figure 9E:
Figure 9E:
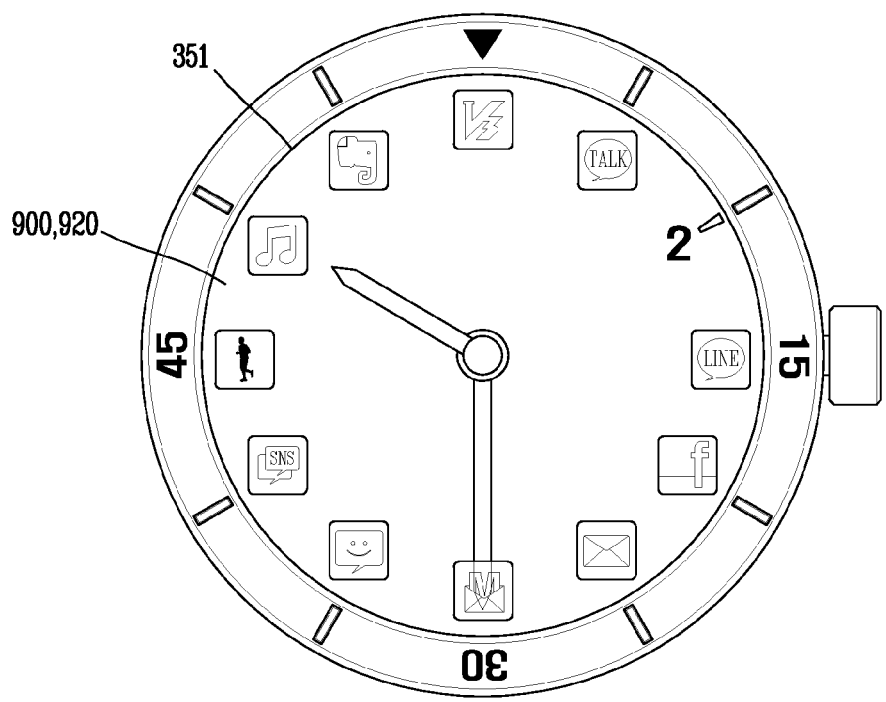

On the other hand, when a touch applied to one of the plurality of indexes moves up to another index located adjacent to the one index, the controller 180 which is rotating the second layer converts the second layer from a subpage corresponding to the one index into a subpage corresponding to the another index. For example, as illustrated in FIG. 9E, while the first subpage 910 is output as the second layer, a touch input moving from the number 1 to the number 2 may be sensed. In this instance, while the controller 180 rotates the first subpage 910 in the clockwise direction in response to the movement of the touch input, when the touch input reaches a region where the number 2 is output, the controller 180 converts the first subpage 910 into the second subpage 920. Continuously, when the touch input continuously moves toward the number 3 without being released from the number 2, if the touch input reaches a region where the number 3 is output while the controller 180 rotates the second subpage 920, the controller 180 converts the second subpage 920 into a third subpage. That is, the user may output a desired subpage by applying a single touch input.

When the touch input is released, the rotation of the second layer is ended.

Meanwhile, one subpage may include more graphic objects than the indexes included in the main page. For example, a case may be generated in which totally 12 indexes are present and more than 12 graphic objects are included in a subpage. Since the graphic objects are output on the virtual regions, respectively, if the graphic objects more than the virtual regions are included in a subpage, the output of some of the graphic objects may be restricted.

FIGS. 10A to 10F are views each illustrating an operation of a mobile terminal when one page includes more graphic objects than indexes.

The number of graphic objects included in a specific subpage, and an output position and order of each graphic object is preset and may be edited by a user. That is, the method of outputting graphic objects may differently vary according to embodiments. Hereinafter, for the sake of explanation, description will be given of an example in which totally 12 indexes are included in a main page and totally 15 graphic objects (English Alphabets A to O) are included in a third subpage.

When the third subpage is output in a manner of overlapping the main page, the controller 180 outputs only 11 graphic objects of the 15 graphic objects included in the third subpage. This results from that any graphic object is not output on the number 3 (or the third virtual region) which indicates a page number of the third subpage.

As aforementioned in relation to the scroll function, the controller 180 may construct graphic objects to be output into a linear structure, namely, a shape that the graphic objects are continuously connected to one another. In more detail, the graphic objects have output orders, and when an output of one graphic object is limited, another graphic object is added. For example, in a state that graphic objects A to K are output, when the graphic object A is excluded from the output graphic objects, a graphic object L is added, namely, the graphic objects operate in the first in first out (FIFO) manner that the earlier-output graphic object disappears first.

The graphic objects included in the subpage are sequentially output as like frames included in a film sequentially coming out when the film rolled in a film case is pulled out.

Figure 10A:
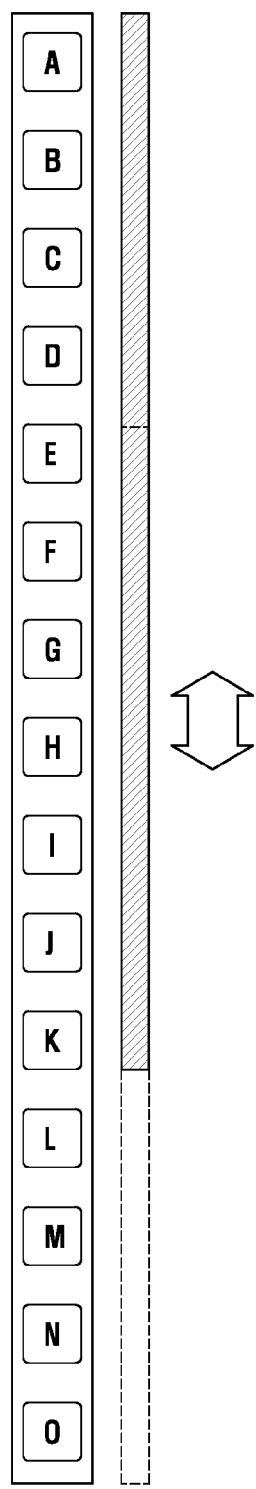
FIGS. 10A, 10B, 10C, 10D, 10E and 10F are views each illustrating an operation of a mobile terminal when one page includes more graphic objects than indexes.
Figure 10B:
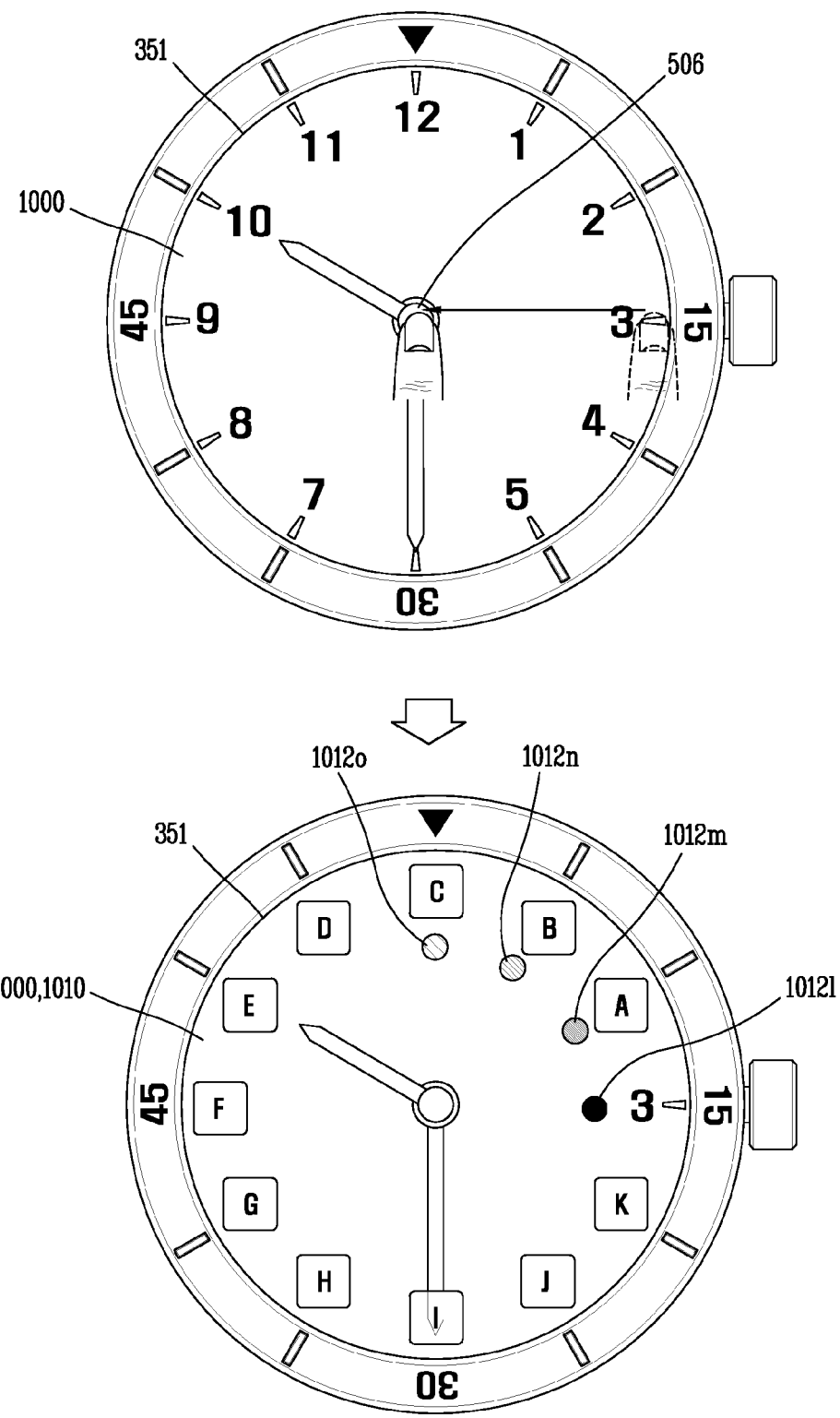

In more detail, as illustrated in FIG. 10B, when a touch applied to a third virtual region continuously moves to the control point 506 while a main page 1000 (or a first layer) is output, a third subpage 1010 (or a second layer) corresponding to the third virtual region is output along with the main page 1000.

Here, the number 3 indicating a page number of the third subpage 1010 is still displayed, and the other indexes (every number except for the number 3 from numbers 1 to 12) are converted into graphic objects included in the third subpage 1010.

Meanwhile, the controller 180 outputs graphic objects included in a subpage in a preset order. In more detail, the controller 180 sets a reference index based on a page number of the subpage, and sequentially outputs the graphic objects in a counterclockwise direction based on the reference index. For example, as illustrated in FIG. 10B, when the third subpage 1010 is output, since the page number of the subpage is 3, the reference index may be the number 3. Accordingly, the graphic objects are sequentially output in the counterclockwise direction based on the number 3.

When there are graphic objects which are included in the third subpage 1010 but has been restricted from being output, the controller 180 may output at least one indicator 1012*l* to 1012*o* for guiding the output-restricted graphic objects. The indicators are output as many as the number of output-restricted graphic objects and guide a dragging direction that a drag input should be applied.

For example, when graphic objects A to K are output, the output of the graphic objects L to O which follow the graphic object K are restricted. Since the four graphic objects L to O have not been output, the controller 180 outputs four indicators 1012*l* to 1012*o* in the counterclockwise direction based on the reference index. Accordingly, the user can recognize that the four graphic objects are hidden after the graphic object K.

Meanwhile, the controller 180 may control the touch screen 351 to output at least one of the output-restricted graphic objects based on a user input. In more detail, the controller 180 may change types and positions of the graphic objects output on the touch screen 351 based on the user input.

Here, the user input may be a touch input which starts from the reference index and continuously moves in a clockwise or counterclockwise direction.

Figure 10C:
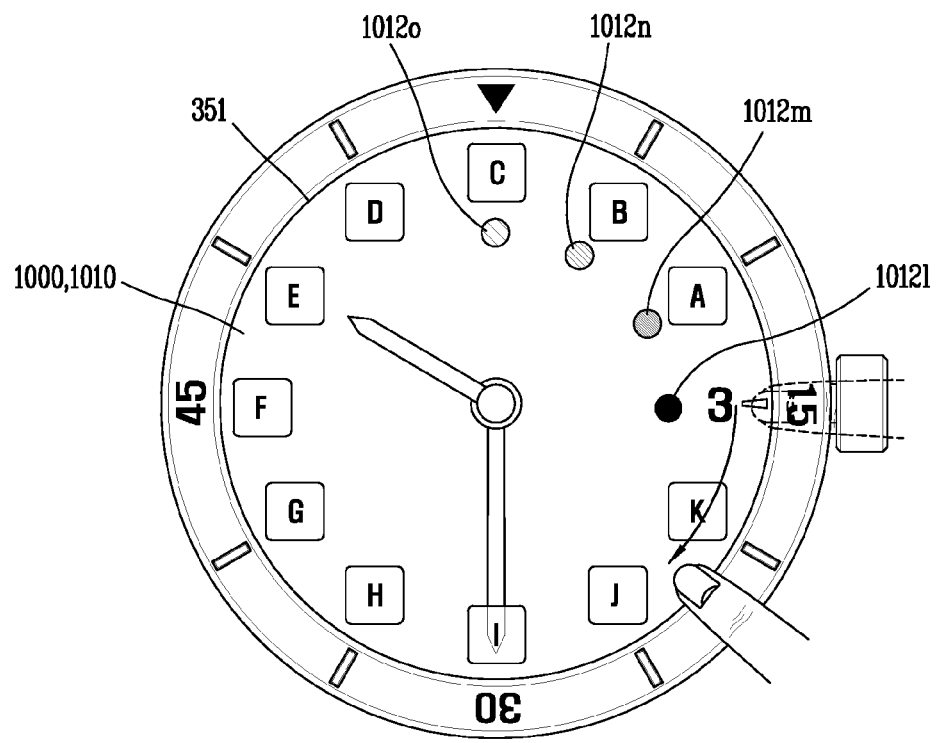
Figure 10C:
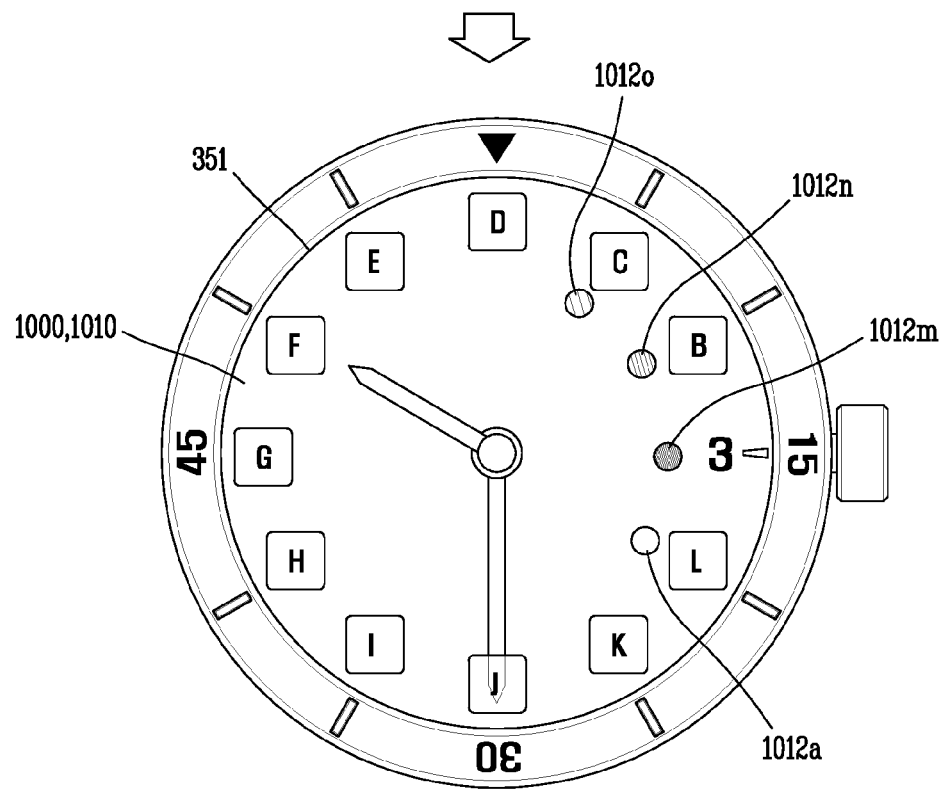

As illustrated in FIG. 10C, when a touch starting from a third virtual region (or the number 3) continuously moves up to a fourth virtual region, the controller 180 may move the graphic objects each by one step in the counterclockwise direction. In response to the counterclockwise movement, the graphic object A output on the left of the reference index disappears and the graphic object L appears on the right of the reference index. In this instance, an indicator 1012*a* guiding the disappeared graphic object A may newly appear on the right of the reference index. And, indicators 1012*m* to 1012*o* guiding the graphic objects M to O which have not been output yet may be output on the left of the reference index.

Figure 10D:
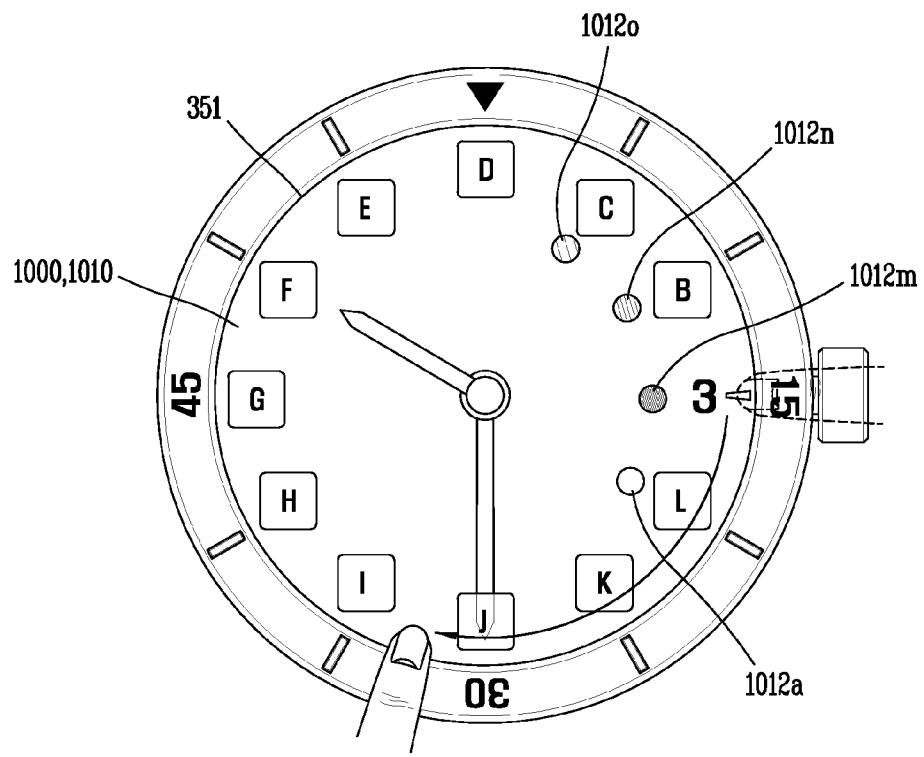
Figure 10D:
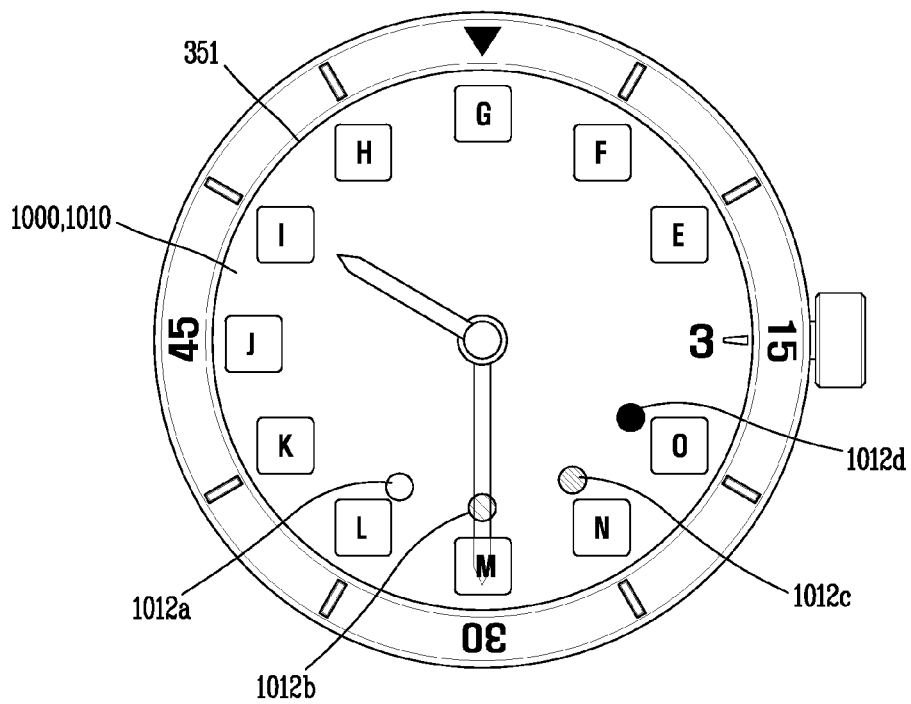

As illustrated in FIG. 10D, in a state that the graphic objects B to L are output, when a touch starting from the third virtual region (or the number 3) continuously moves up to a fifth virtual region, the controller 180 may move the graphic objects each by one step in the counterclockwise direction. Accordingly, the graphic objects E to O are output in the counterclockwise direction based on the reference index. The indicators 1012*a* to 1012*d* guiding the disappeared graphic objects A to D may be output on the right of the reference index.

As aforementioned, a scroll function is executed in response to a drag input. An amount of information scrolled may differ depending on a moving distance of the drag input. In response to the scrolling, output positions of indicators guiding hidden graphic objects differ based on the reference index.

The user may identify the number of non-output graphic objects using the indicators, and intuitively recognize a dragging direction of the drag input for outputting the hidden graphic objects.

Figure 10E:
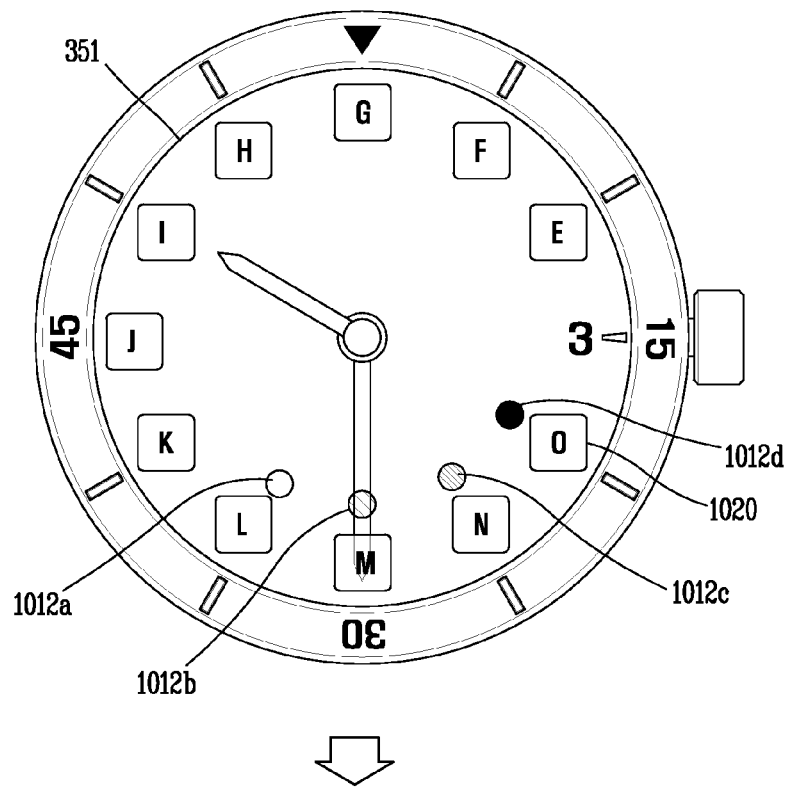
Figure 10E:
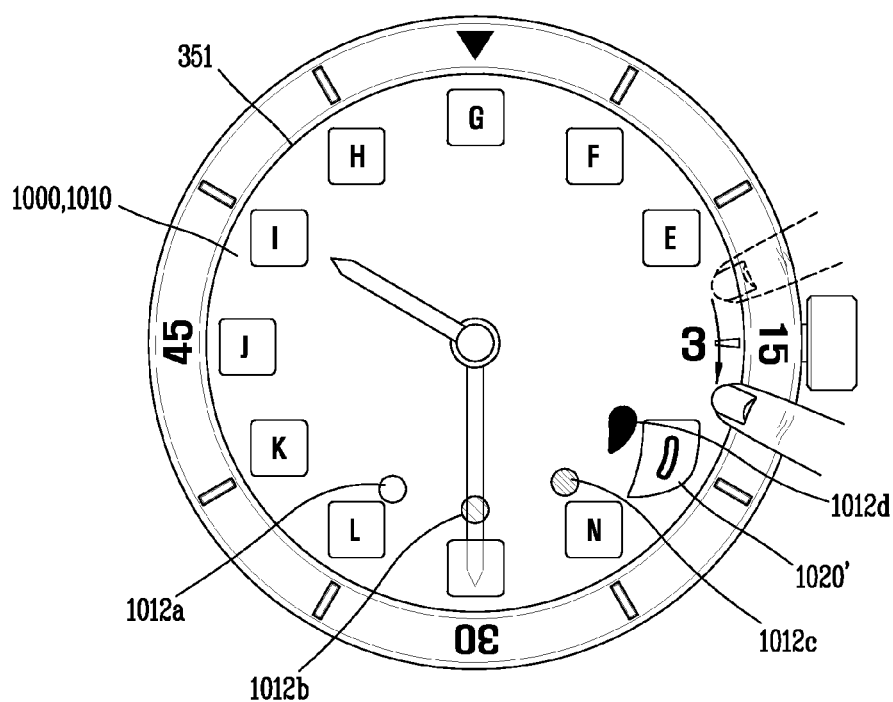

Meanwhile, while the last graphic object is output on the touch screen 351 by the drag input in the counterclockwise direction, the counterclockwise drag input may be applied continuously or additionally. For example, as illustrated in FIG. 10E, while the graphic object O 1020 as the last graphic object is output, a touch may be applied to the reference index and continuously move in the counterclockwise direction.

In this instance, the controller 180 may provide the user with a bouncing feedback for guiding no more graphic object to be output. In more detail, the controller 180 may change the shape of the last graphic object based on the drag input. For instance, as illustrated in FIG. 10E, the controller 180 may control the touch screen 351 to output the last graphic object in a manner that one end of the last graphic object is fixed and the other end of the graphic object is stretched along the drag input (1020→1020'). The degree that the last graphic object 1020 is stretched varies according to the moving distance of the drag input.

Although not illustrated, when the drag input is released, the last graphic object comes back to its original state. When a rubber band is pulled out and let it go, the rubber band returns to its original state. After it returns to the original state, the shape of the rubber band is changed for a predetermined time due to elasticity. In this manner, the controller 180 may change the shape of the last graphic object 7020 for a predetermined time from a time point that the drag input is released.

Figure 10F:
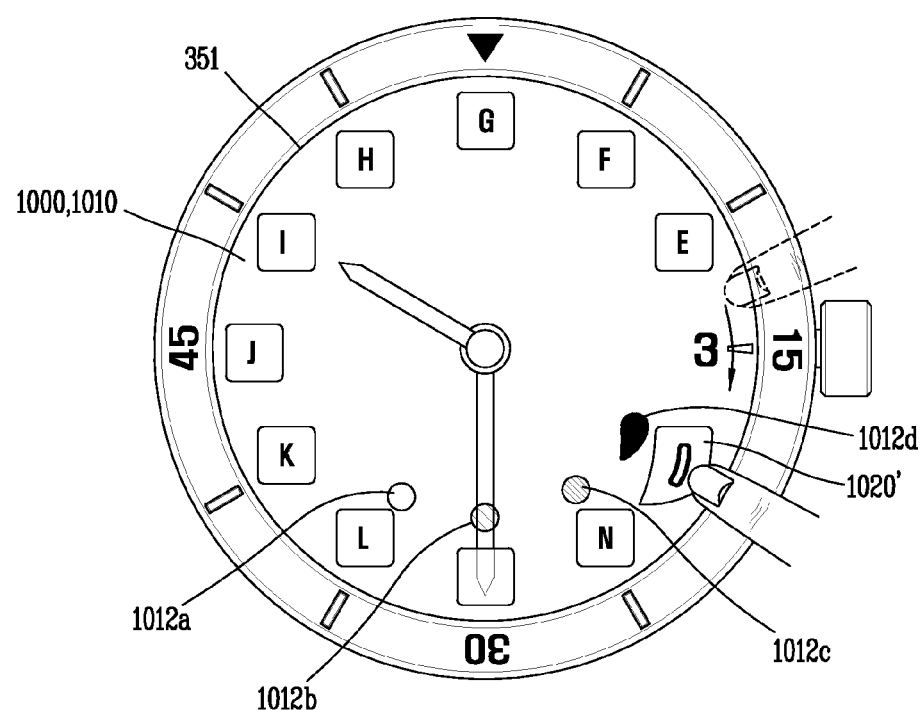
Figure 10F:
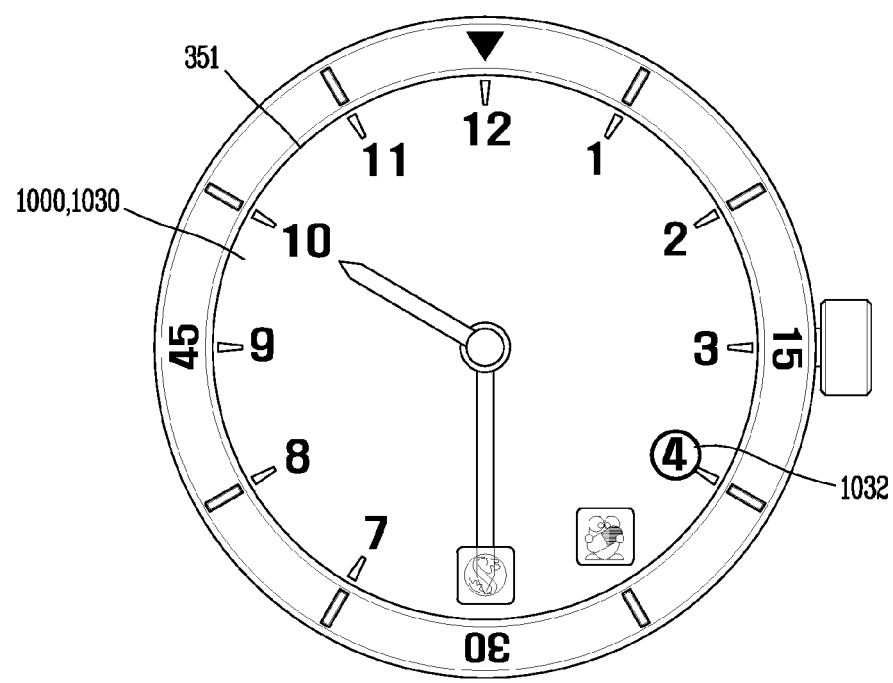

Meanwhile, when the drag input moves longer than a reference distance while the last graphic object is displayed, the controller 180 converts the currently-output subpage into the next subpage. For example, as illustrated in FIG. 10F, when the drag input moves longer than the reference distance in spite of providing the bouncing feedback, the controller 180 converts the currently-output third subpage 1010 into a fourth subpage 1030. Accordingly, the main page 1000 and the fourth subpage 1030 are output in an overlapping manner.

On the other hand, when the number of graphic objects included in a subpage is smaller than a reference number, the controller 180 may highlight an index corresponding to a page number of the subpage. For example, an image or the like may be output such that the index corresponding to the page number of the subpage can be distinguished from the other indexes or a visual effect of flickering, highlighting, color-changing or the like can be provided to the index.

Here, the reference number may be a number smaller by one than the total number of the plurality of indexes. For example, when there are 12 indexes, the reference number may be 11.

For example, as illustrated in FIG. 10F, when a page number of a fourth subpage is 4 and the number of graphic objects included in the fourth subpage is smaller than the reference number, an image 1032 which is distinctive over the other indexes may be output on a region where the number 4 is output. When there are a less number of graphic objects, the plurality of indexes are output. Here, the user may identify the page number of the currently-output subpage using the image 1032.

The foregoing embodiment has illustrated that a previously-output graphic object disappears and hidden graphic objects appear in response to a drag input applied in a counterclockwise direction. Although not illustrated, a late-output graphic object may disappear and a disappeared graphic object may reappear, in response to a drag input applied in a clockwise direction. That is, a direction of scrolling graphic objects may differ according to the direction of the drag input.

Meanwhile, the mobile terminal according to the present invention may perform a different processing operation according to a type of a touch input applied to a graphic object. FIGS. 11A to 12B are views each illustrating an operation of a mobile terminal in response to a touch input applied to a graphic object.

According to the present invention, the controller 180 executes an application associated with a graphic object, in response to a touch input applied to the graphic object. In addition, the controller 180 may execute a different function of the application according to the type of the touch input. For example, when a touch is applied to the graphic object, a first execution screen of the application is output. When the touch applied to the graphic object moves up to the control point connecting the hour hand and the minute hand without being released, a second execution screen of the application is output.

Figure 11A:
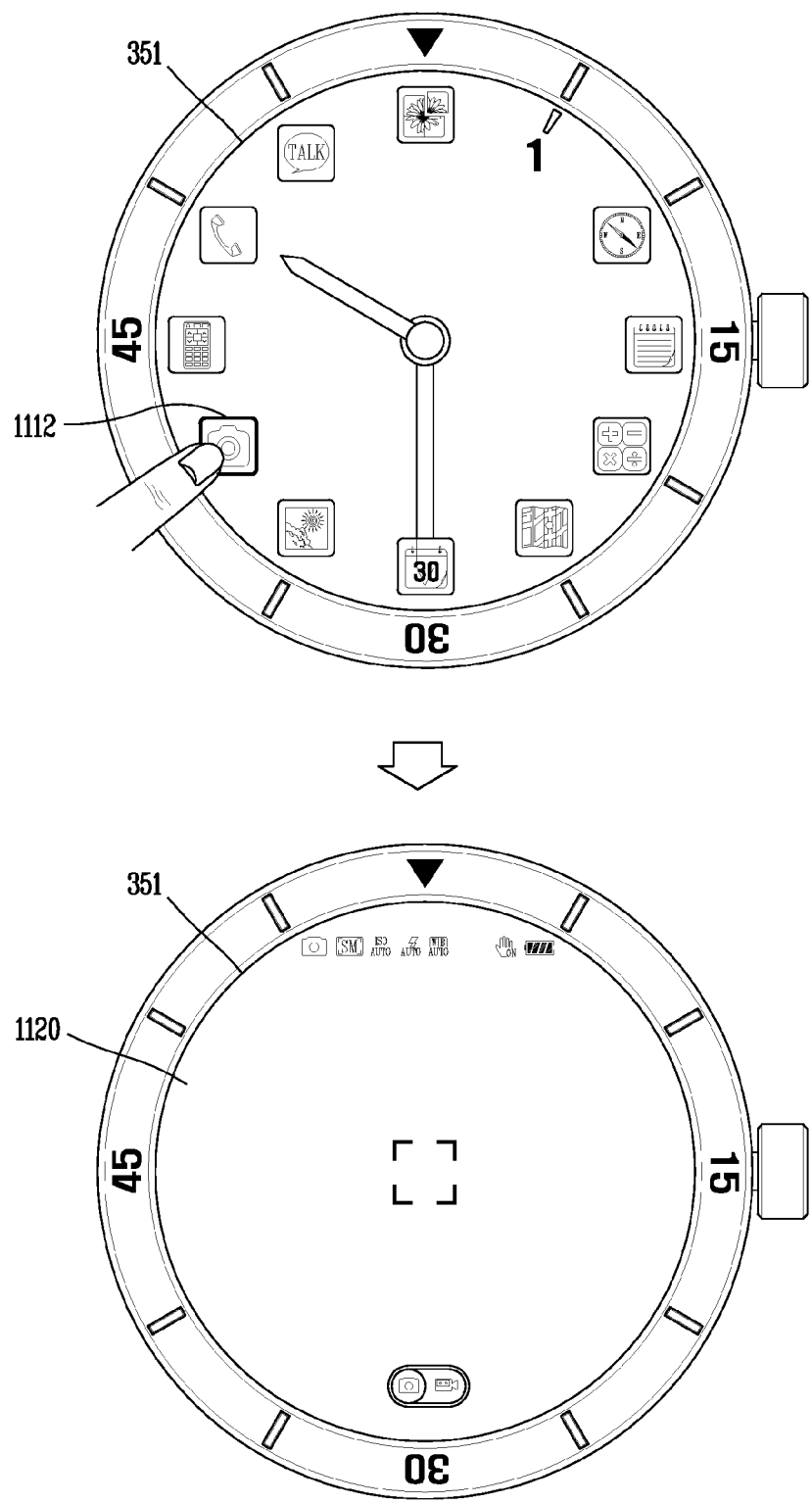
FIGS. 11A, 11B, 12A and 12B are views each illustrating an operation of a mobile terminal in response to a touch input applied to a graphic object.
Figure 11B:
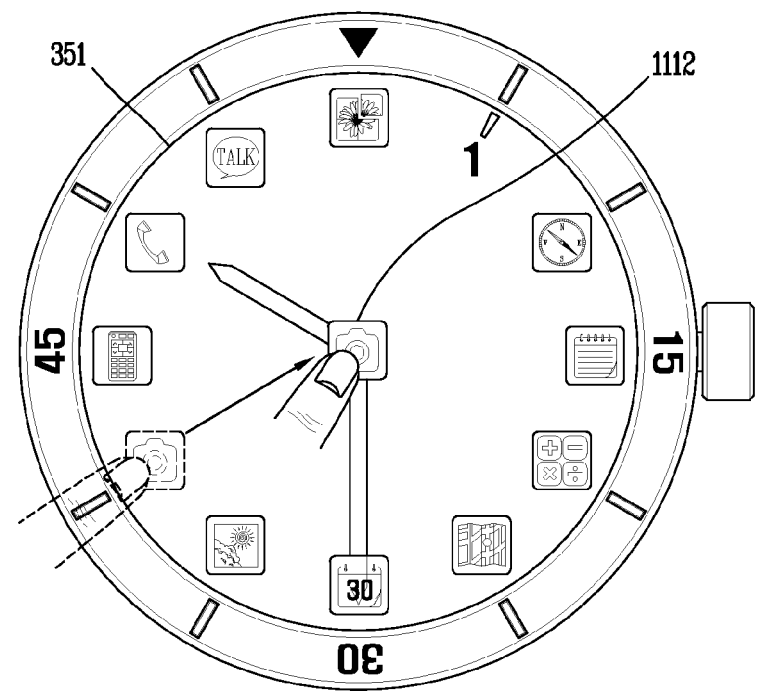
Figure 11B:
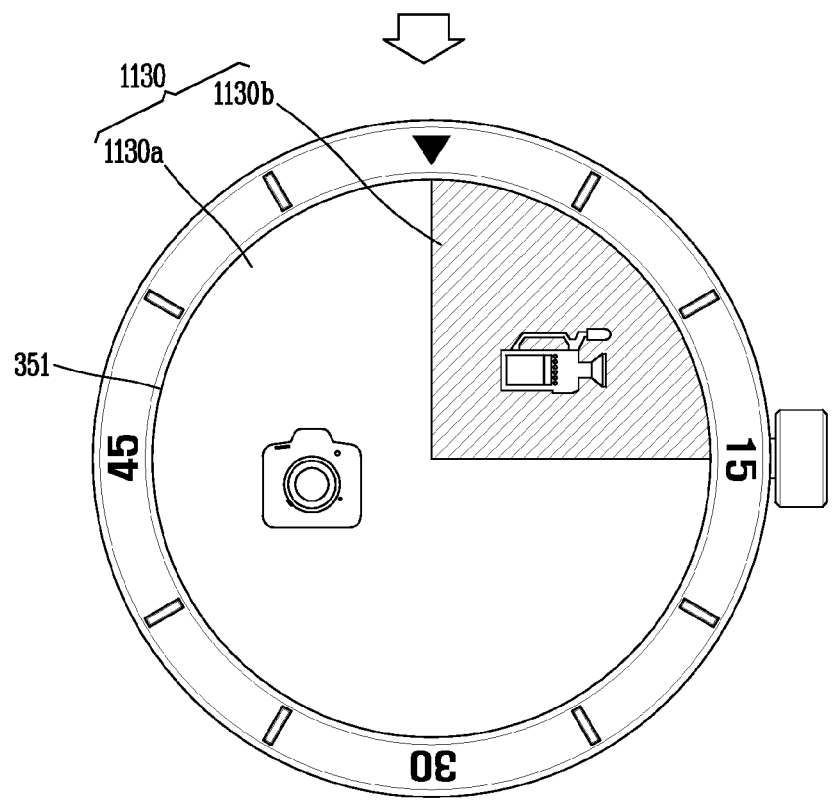

For example, as illustrated in FIG. 11A, when a touch is applied to a graphic object 1112 associated with a camera application, the controller 180 ends the output of a home screen, and outputs a first execution screen 1120 of the camera application. On the other hand, as illustrated in FIG. 11B, when the touch continuously moves up to the control point connecting the hour hand and the minute hand, the controller 180 ends the output of the home screen and outputs a second execution screen 1130 of the camera application.

Here, the first execution screen may be the most recently-output execution screen of the application. For example, the camera application may include a still image capturing function and a video capturing function. If the still image capturing function is the recently-executed function, the first execution screen corresponds to screen information relevant to the execution of the still image capturing function.

On the other hand, the second execution screen may be a menu screen which is configured for a user to select one of a plurality of sub functions which are executable on an application. For example, when the camera application includes the still image capturing function and the video capturing function, a first image 1130a associated with the still image capturing function and a second image 1130b associated with the video capturing function may be included in the second execution screen 1130. That is, the second execution screen 1130 allows the user to select one of the plurality of sub functions accessible on the application, and includes a plurality of images corresponding to the sub functions.

Here, sizes of the plurality of images may vary according to frequencies of executing the sub functions. More specifically, in the camera application, the controller 180 measures frequencies of executing the still image capturing function and the video capturing function and decides sizes of the first and second images 1130a and 1130b based on the measured execution frequencies. When an execution rate of the picture capturing function is 75% and the execution rate of the video capturing function is 25%, the first image 1130a may occupy 75% area of an entire region of the touch screen 351 and the second image 1130b may occupy 25% area. On the other hand, when the picture capturing function and the video capturing function exhibit the same execution rate, the first and second images 1130a and 1130b occupy the entire region by 50% each. In this manner, the sub functions are differently output according to their execution rates, and thus the user can recognize his or her usage pattern.

Figure 12A:
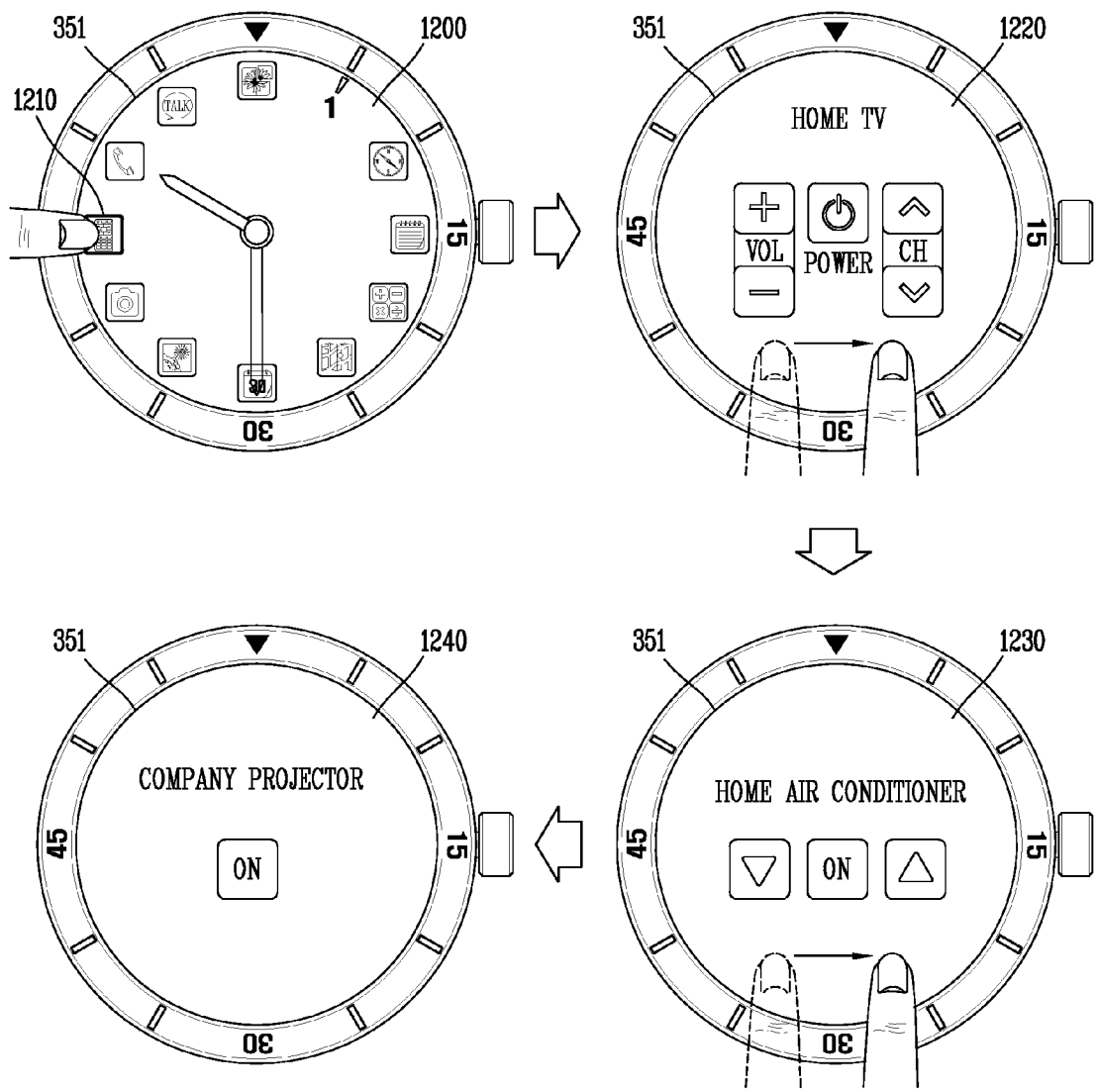
Figure 12B:
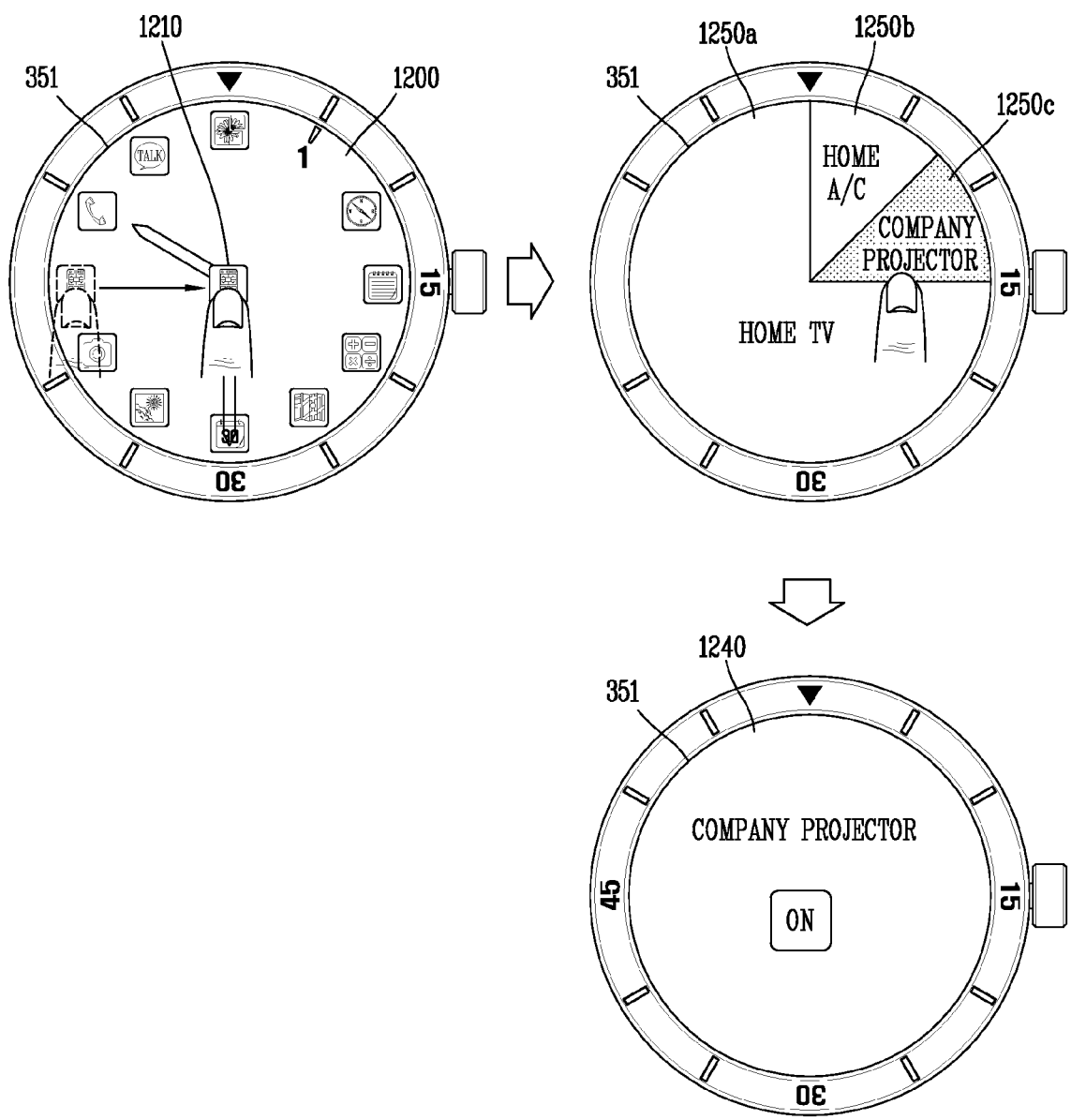

As another example, as illustrated in FIG. 12A, when a touch is applied to a graphic object 1210 associated with a remote controller application, the controller 180 ends the output of the home screen and outputs a first execution screen 1220 of the remote controller application. On the other hand, as illustrated in FIG. 12B, when the touch continuously moves up to the control point connecting the hour hand and the minute hand, the controller 180 ends the output of the home screen and outputs a second execution screen 1250 of the remote controller application.

The remote controller application may include a 'HOME TV' remote control function 1220, a 'HOME AIR CONDITIONER' remote control function 1230 and a 'COMPANY PROJECTOR' remote control function 1240. According to embodiments, the remote controller application may include more sub functions or different sub functions from the aforementioned example.

The first execution screen of the remote controller application may be screen information corresponding to one of those sub functions.

Meanwhile, since the touch screen 351 of the wearable device 300 has the spatial limitation, the user has to apply several inputs to search for one sub function desiring to use from those functions.

However, according to the present invention, the second execution screen 1250 of the remote controller application includes a first image 1250a associated with the 'HOME TV' remote control function, a second image 1250b associated with the 'HOME AIR CONDITIONER' remote control function, and a third image 1250c associated with the 'COMPANY PROJECTOR' remote control function. This may facilitate the user to execute one sub function.

The user may intuitively recognize the execution rates of the sub functions based on the areas (or sizes) of the images included in the second execution screen, and also execute a sub function desiring to execute in a simple manner.

FIGS. 13A to 14E are views each illustrating an operation of a mobile terminal in relation to an application relevant to a graphic object. FIGS. 13A to 13G illustrate embodiments related to a call application, and FIGS. 14A to 14E illustrates embodiments related to a photo application.

Figure 13A:
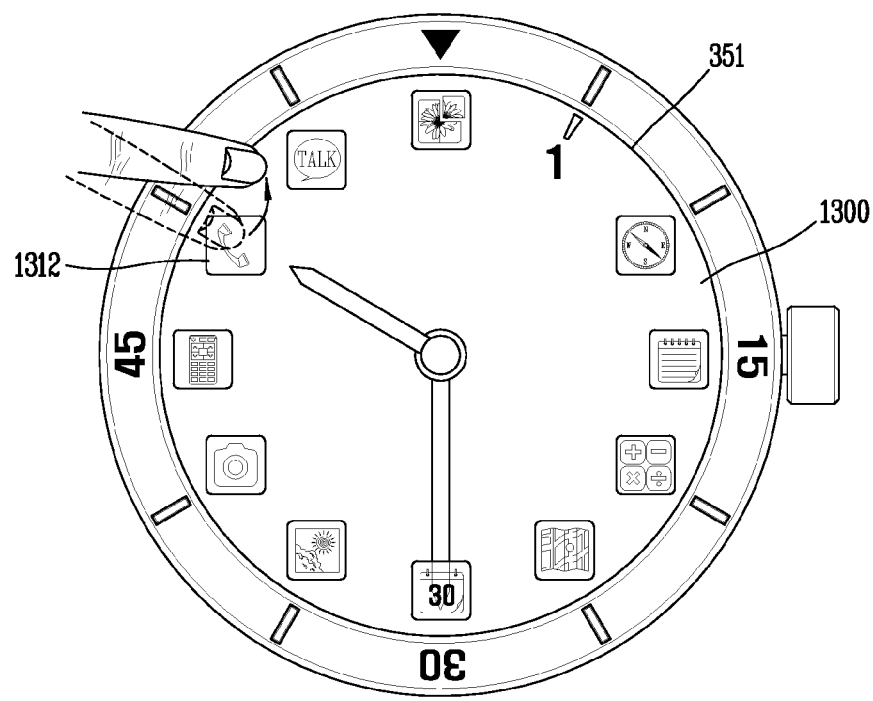
FIGS. 13A, 13B, 13C, 13D, 13E, 13F, 13G, 14A, 14B, 14C, 14D and 14E are views each illustrating an operation of a mobile terminal in relation to an application associated with a graphic object.
Figure 13A:
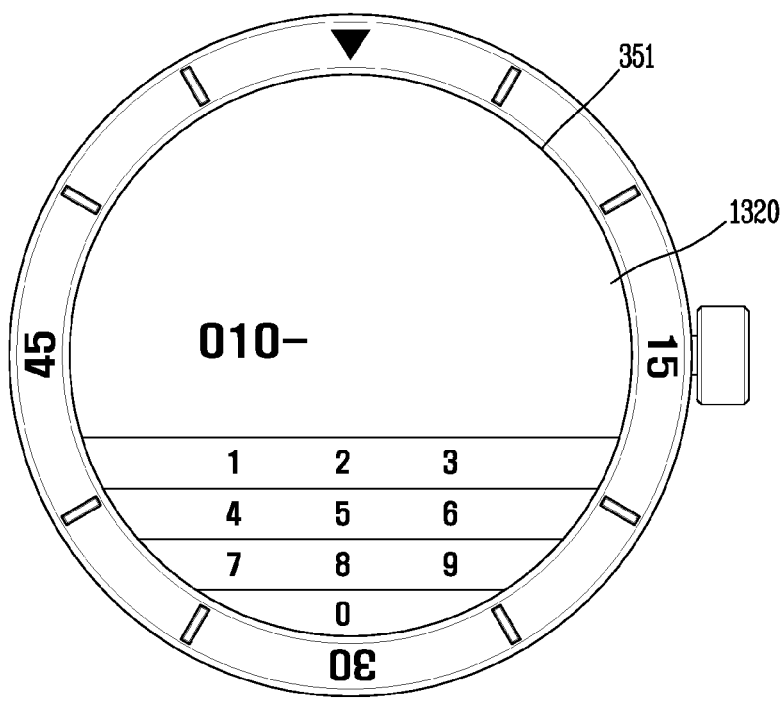

According to the present invention, when a preset event is generated, at least one of indexes included in a home screen is converted into a graphic object associated with an application. In addition, when a touch input is applied to the graphic object which has been output in replacement of the index, the application associated with the graphic object is executed. For example, as illustrated in FIG. 13A, when a touch input is applied to a graphic object 1312 associated with a call application while a first subpage 1310 is output, an execution screen 1320 of the call application is output.

The indexes and/or the graphic objects may be converted into contents included in a specific application.

Here, the contents refer to every object which may be output on the touch screen 351. For example, the contents may be icons for selecting functions executable in the wearable device 300, multimedia icons for reproducing video data or music data reproducible in the wearable device 300, images or thumbnail images displayed on the wearable devices 300, data names set for each of various data, and the like. The contents may be expressed by use of images or characters.

For example, for a call application, the contents of the call application may be contact information or phone numbers registered as favorites, recently-connected phone numbers, missed calls and the like. In another example, for a music playback application, the contents of the music playback application may be every type of music to be played back.

Figure 13B:
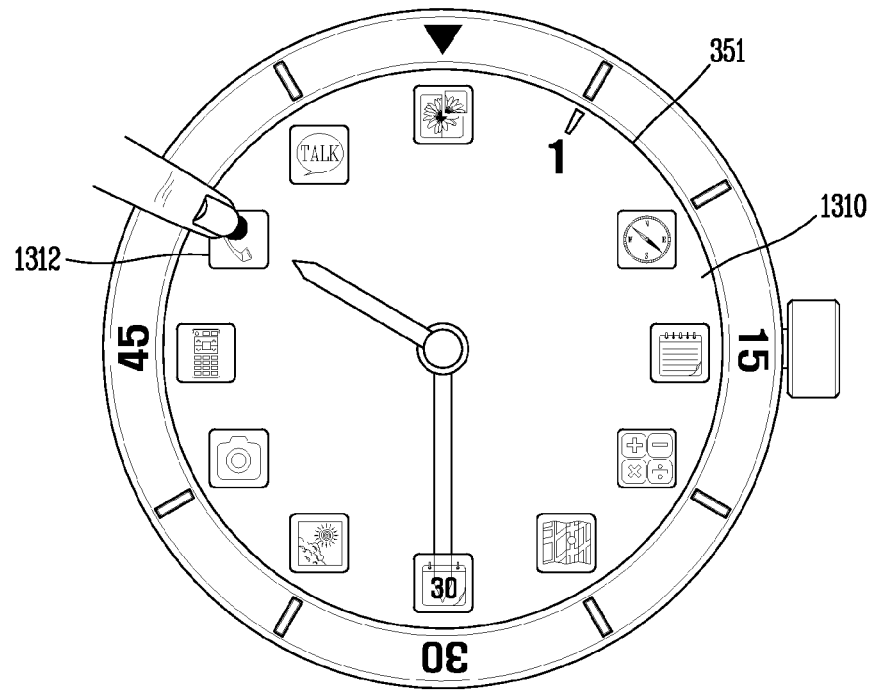
Figure 13B:
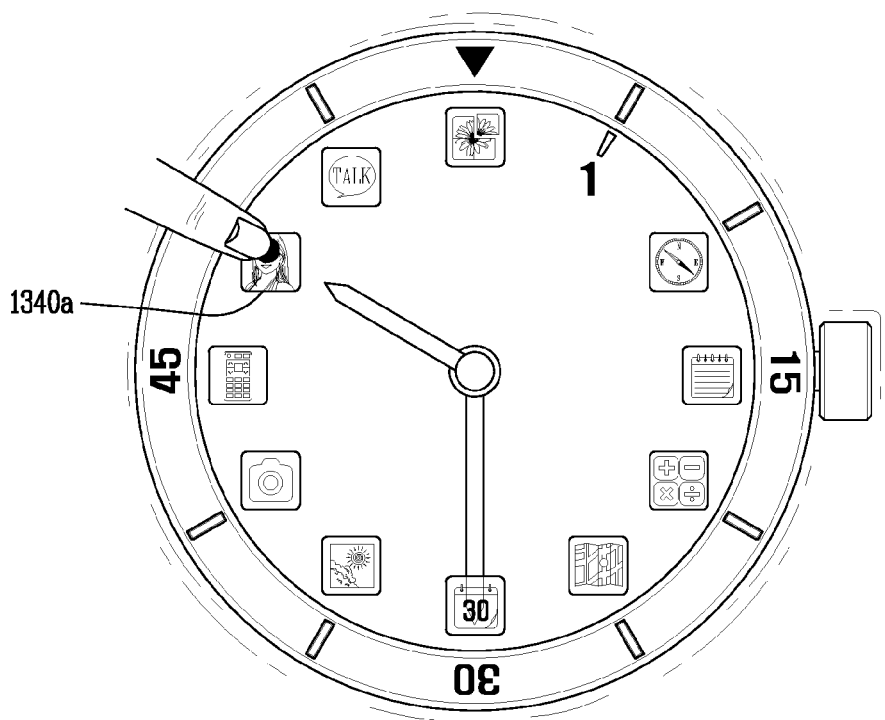

Meanwhile, the controller 180 executes a content output mode when a long touch is applied to a graphic object. The content output mode refers to a function of outputting contents of a specific application on the virtual regions described with reference to FIG. 5D. As illustrated in FIG. 13B, when a long touch is applied to the graphic object 1312 associated with the call application, the controller 180 executes the content output mode for the call application.

When the content output mode is executed, the controller 180 may output guidance information for guiding the execution of the content output mode in at least one of visible, audible and tactile manners. Also, the controller 180 may convert the graphic object 1312 associated with the call application into one content 1340a included in the call application.

Figure 13C:
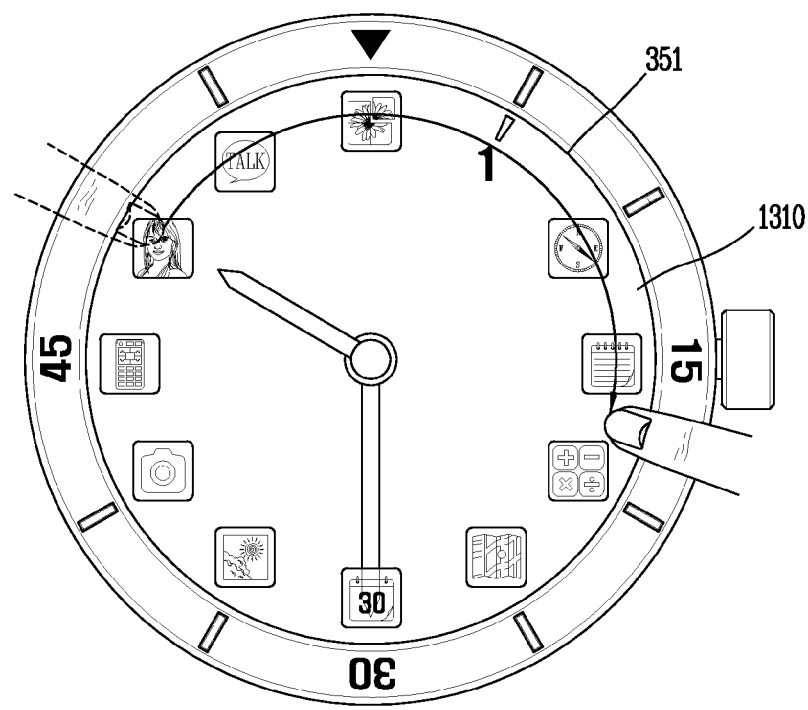
Figure 13C:
Figure 13C:
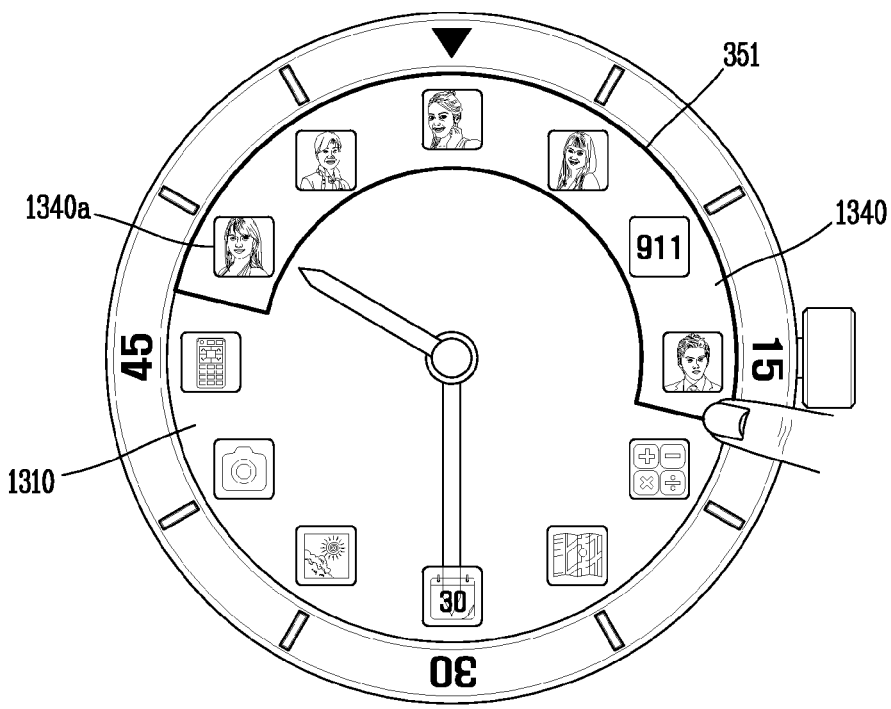
Figure 13D:
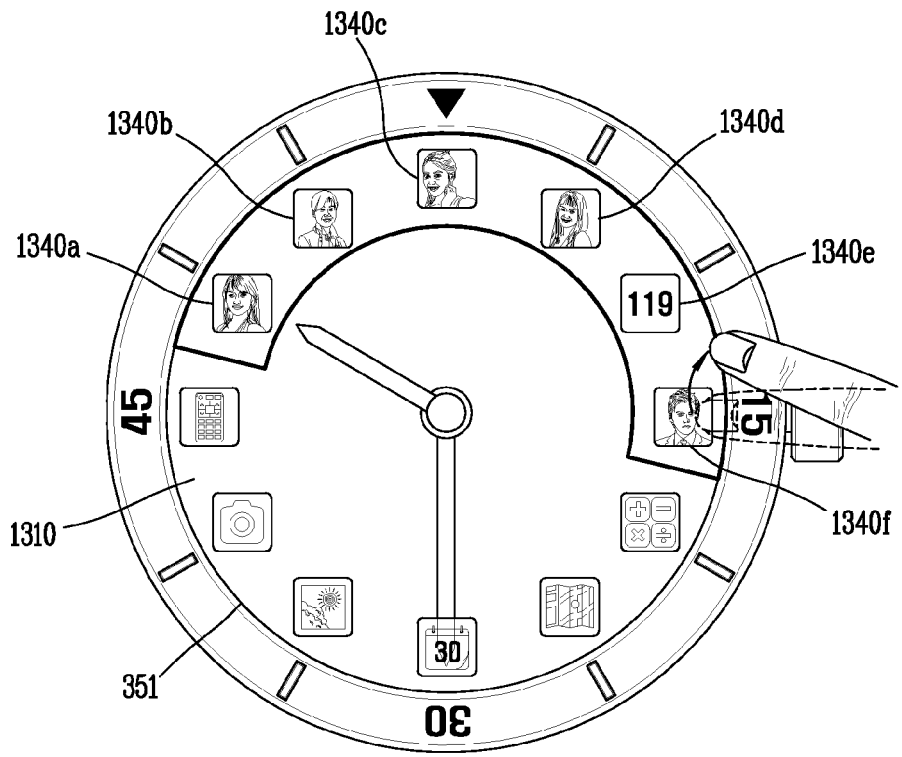
Figure 13D:
Figure 13D:
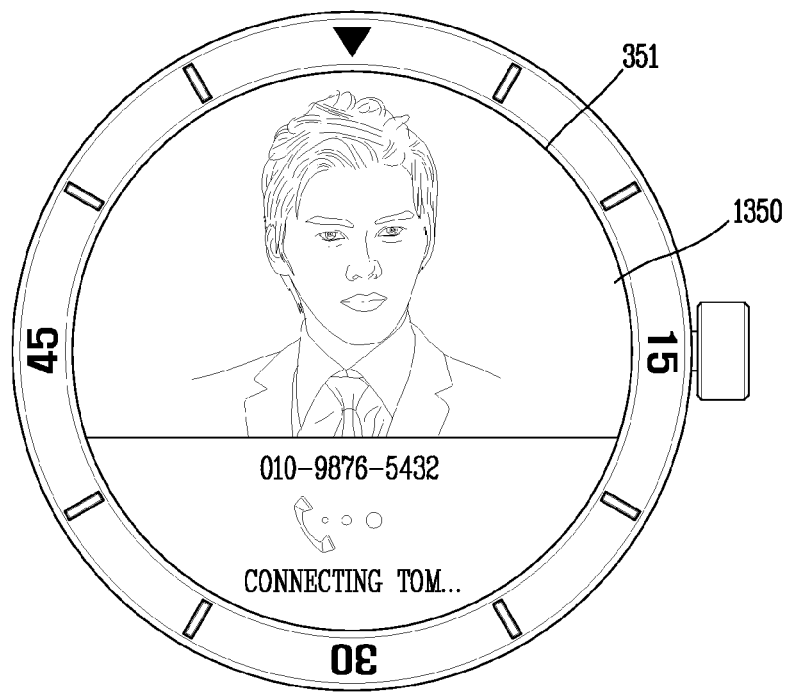
Figure 13E:
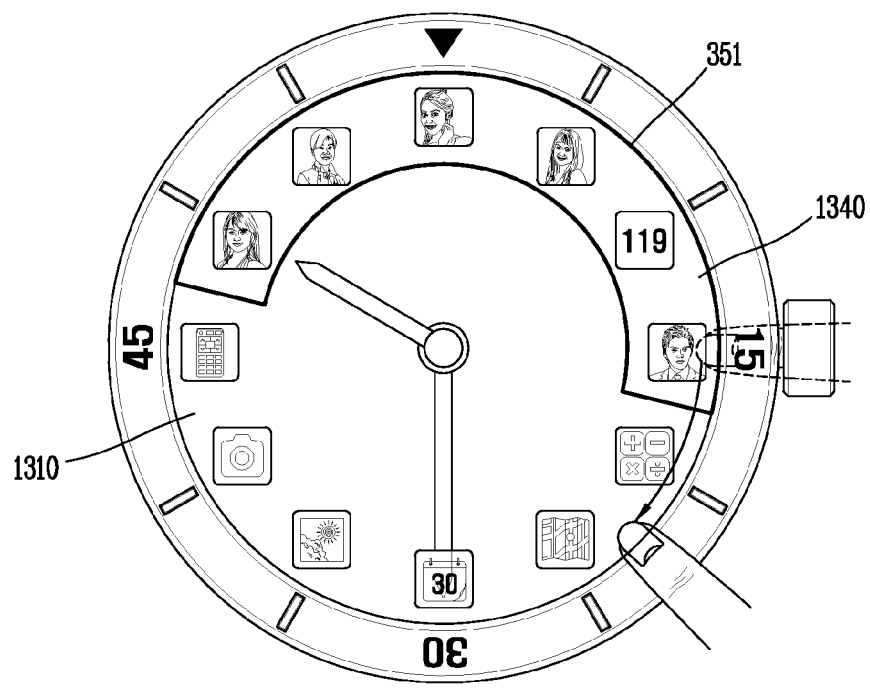
Figure 13E:
Figure 13E:
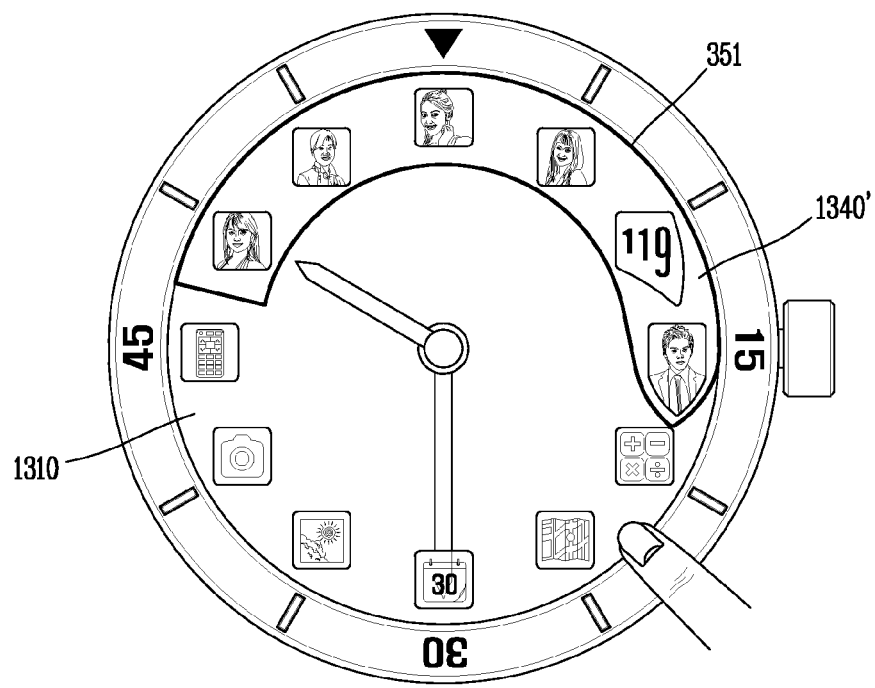
Figure 13F:
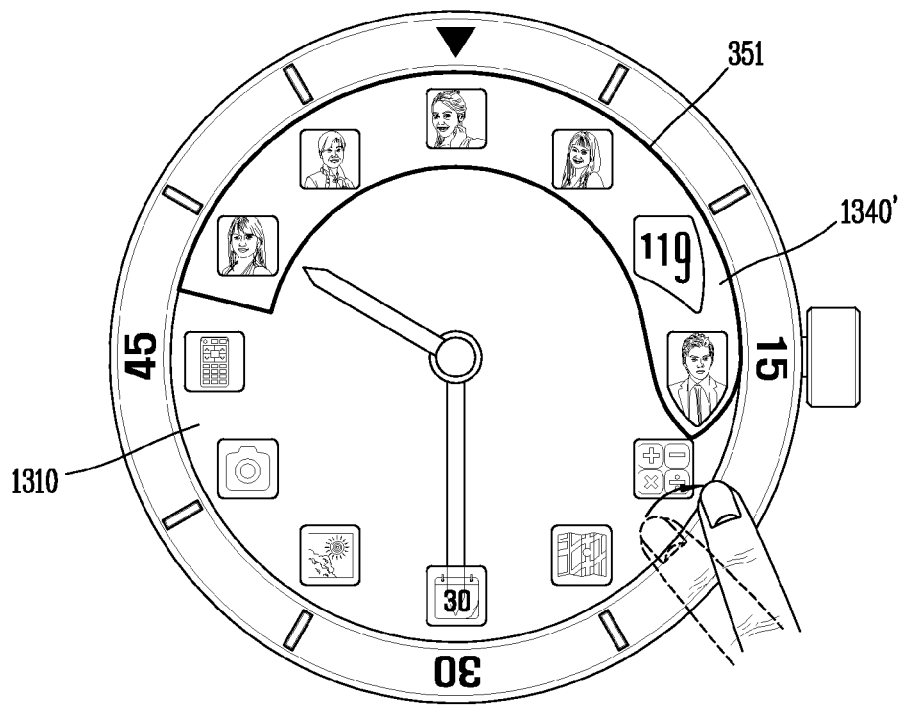
Figure 13F:
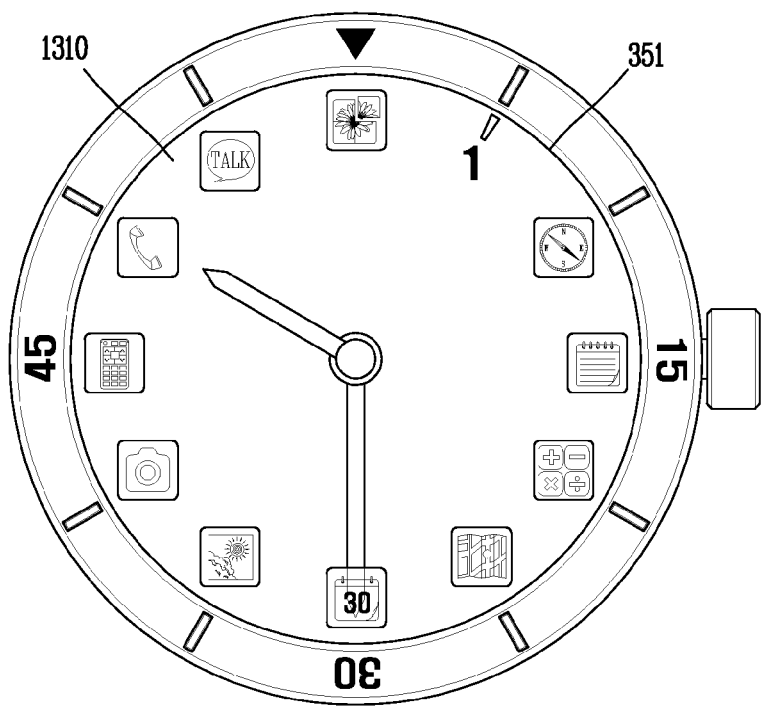
Figure 13G:
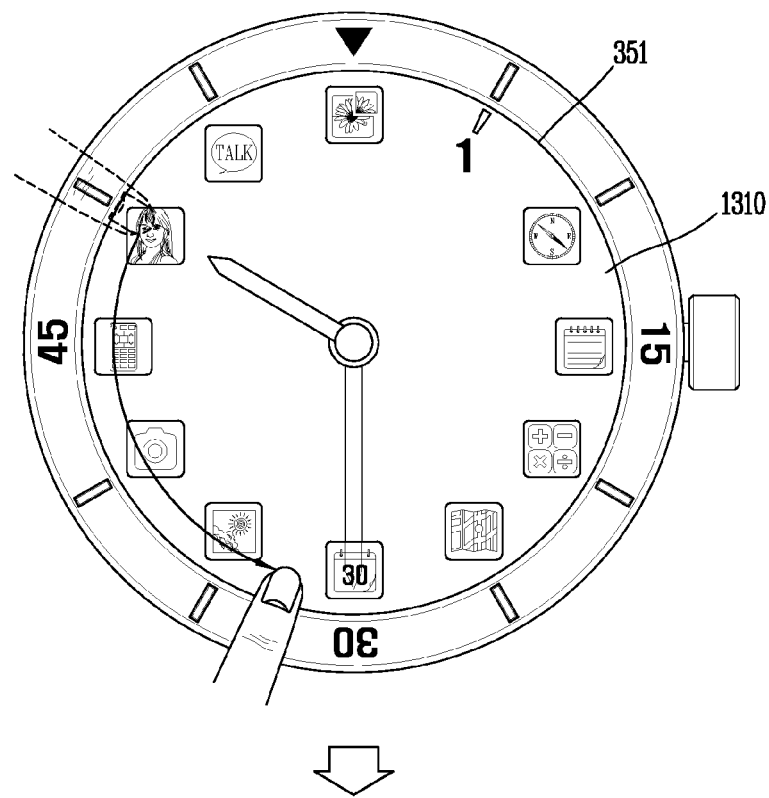
Figure 13G:
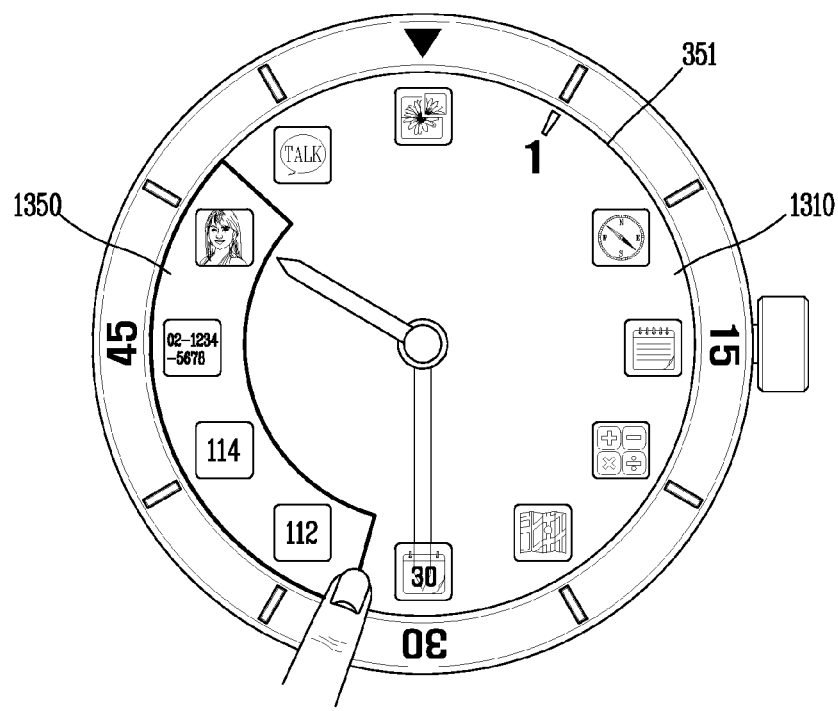

When the content output mode is executed, the controller 180 waits for a drag input, which starts from the long touch. When the drag input is received, the controller 180 outputs different types of contents on the virtual regions along the direction of the drag input. For example, as illustrated in FIG. 13C, when a drag input moving in a clockwise direction is sensed, the controller 180 may output contacts registered as favorites in the call application on the virtual regions. On the other hand, as illustrated in FIG. 13G, when a drag input moving in the counterclockwise direction is sensed, the controller 180 may output recently-connected contacts in the call application on the virtual regions (1350).

A region for outputting a content thereon in the content output mode is decided by the drag input, and the number of contents output is also decided based on a moving distance of the drag input. More specifically, the controller 180 may set a partial region of the entire region of the touch screen 351 to a content output region 1340 to output contents on the basis of the drag input, and output contents only on virtual regions which are included in the content output region.

That is, information may be provided in a manner of unrolling an image in response to a drag input, and accordingly the number of contents output gradually increases. In more detail, the image may be provided with an effect of unrolling a rolled paper in response to a drag input.

For example, as illustrated in FIG. 13C, when a drag input gradually moves from the $10^{th}$ virtual region to the $3^{rd}$ virtual region in a clockwise direction while the content output mode is executed, the $10^{th}$ to $12^{th}$ and $1^{st}$ to $3^{rd}$ virtual regions may be sequentially included in the content output region 1340. Accordingly, contacts registered as the favorites are output on the virtual regions included in the content output region 1340.

Afterwards, when the touch input is released, a function related to a content which is output on a position where the touch input is released is executed. For example, as illustrated in FIG. 13D, while the $1^{st}$ to $6^{th}$ contents 1340a to 1340f are output, the touch input may be released on a region where the $6^{th}$ content 1340f is output. In this instance, the controller 180 attempts to place a call to a phone number corresponding to the $6^{th}$ content 1340f, and controls the touch screen 351 to output a call-placing screen 1350.

Meanwhile, when the last content has been output by the touch input but the touch input continuously moves without being released, the controller 180 may provide the bouncing feedback for the last content. That is, the controller 180 may provide hardware or software feedback to the user to notify that the last content has been output. For example, the controller 180 may generate a vibration feedback or fix one end of the last content and move the other end in the moving direction of the touch input. In other words, the shape of the last content can change.

When the touch input has been released but a content is not output on the released position of the touch input, the controller 180 terminates the content output mode and restricts the output of contents. For example, as illustrated in FIG. 13F, when the touch input is released on a region where a content is not output, the content output region disappears and the first subpage 1310 is fully output again.

Figure 14A:
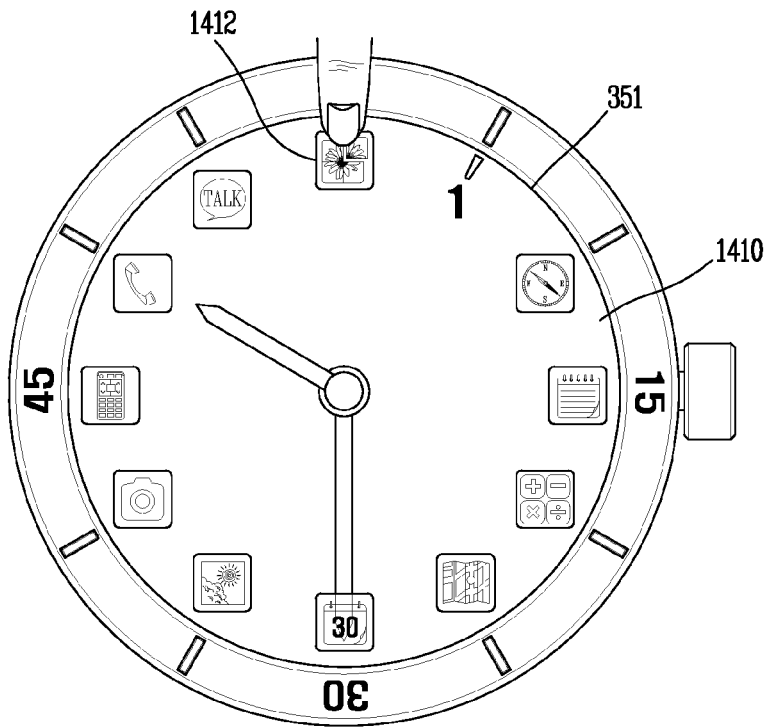
Figure 14A:
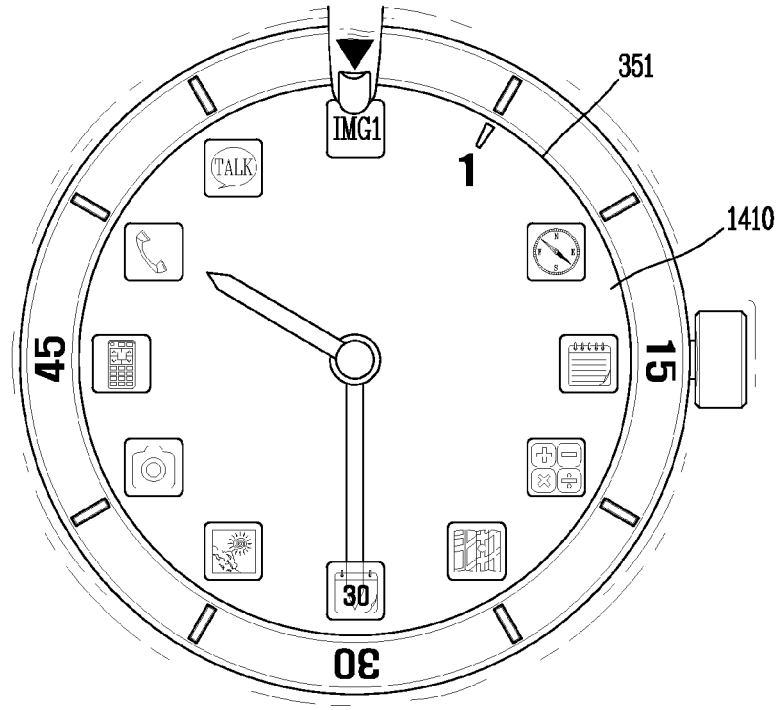

In the same manner, the content output mode may also be executed in a photo application. For example, as illustrated in FIG. 14A, while a first subpage 1410 is output, when a touch input is applied to a graphic object 1412 associated with the photo application, the content output mode for the photo application is executed.

Figure 14B:
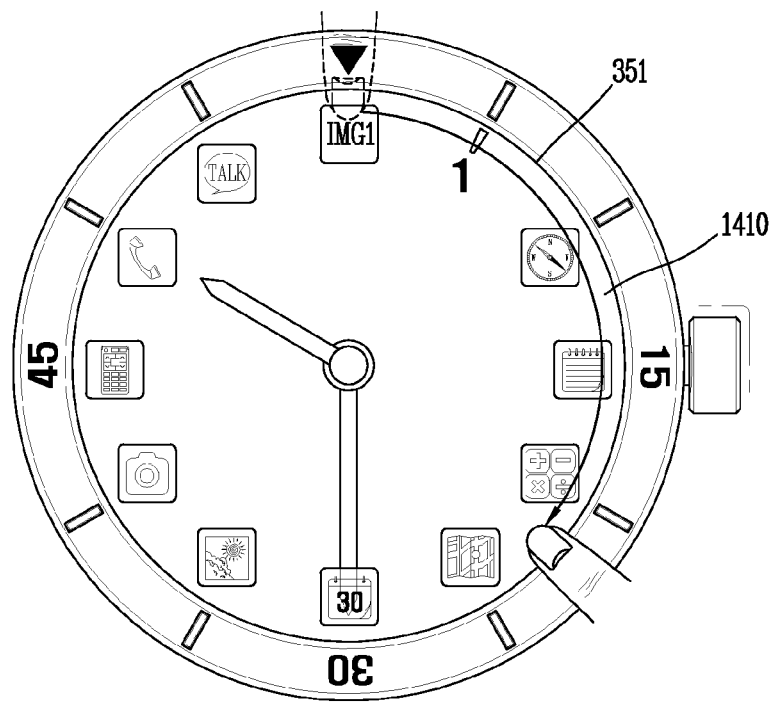
Figure 14B:
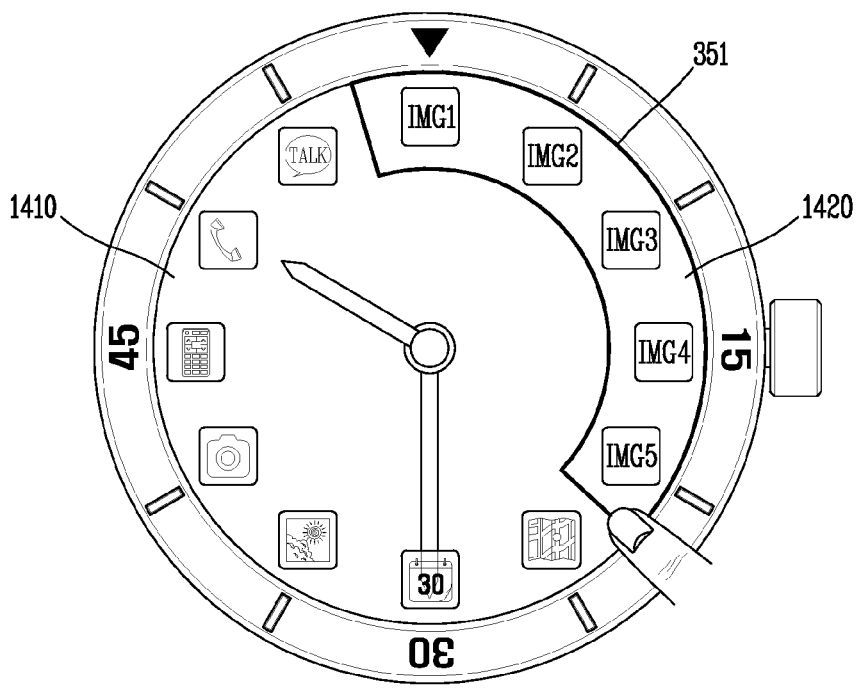
Figure 14C:
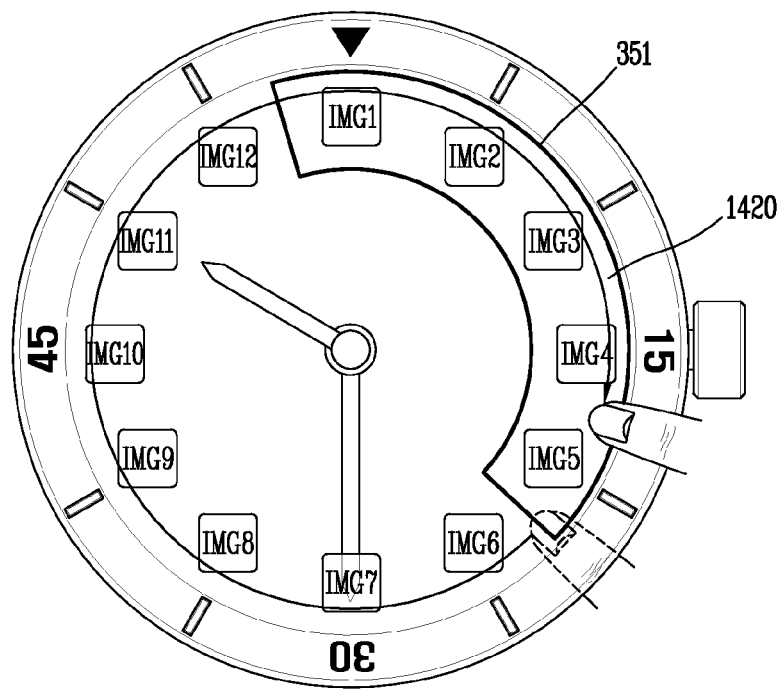
Figure 14C:
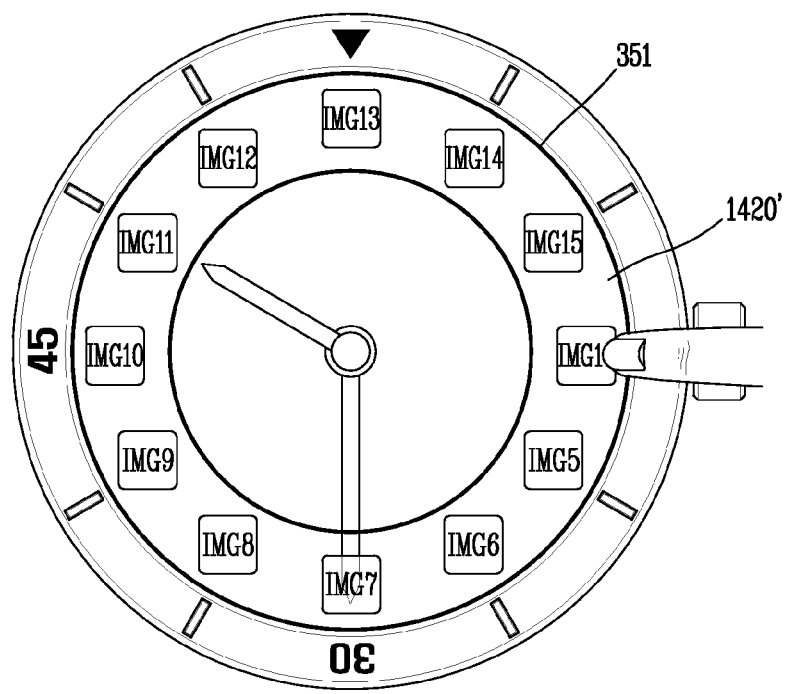
Figure 14D:
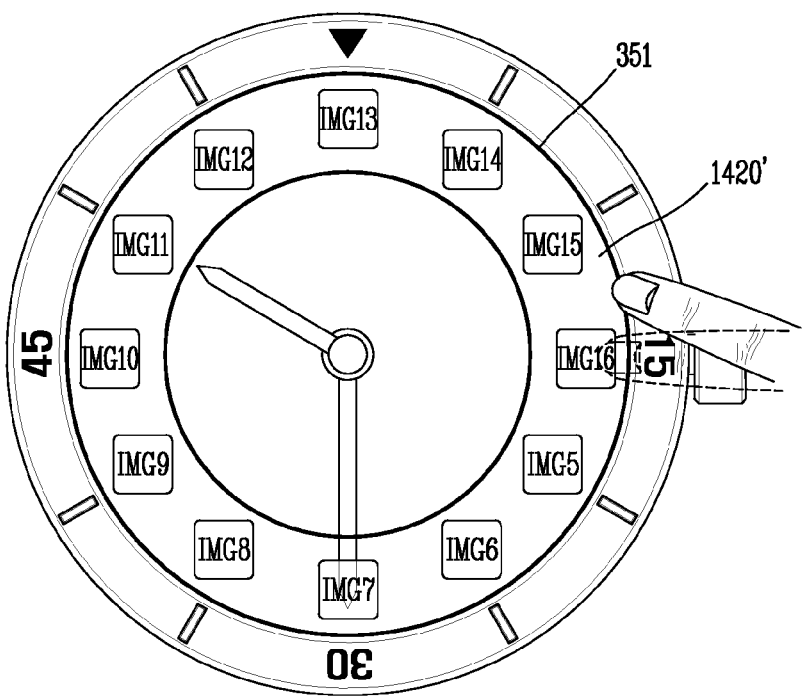
Figure 14D:
Figure 14D:
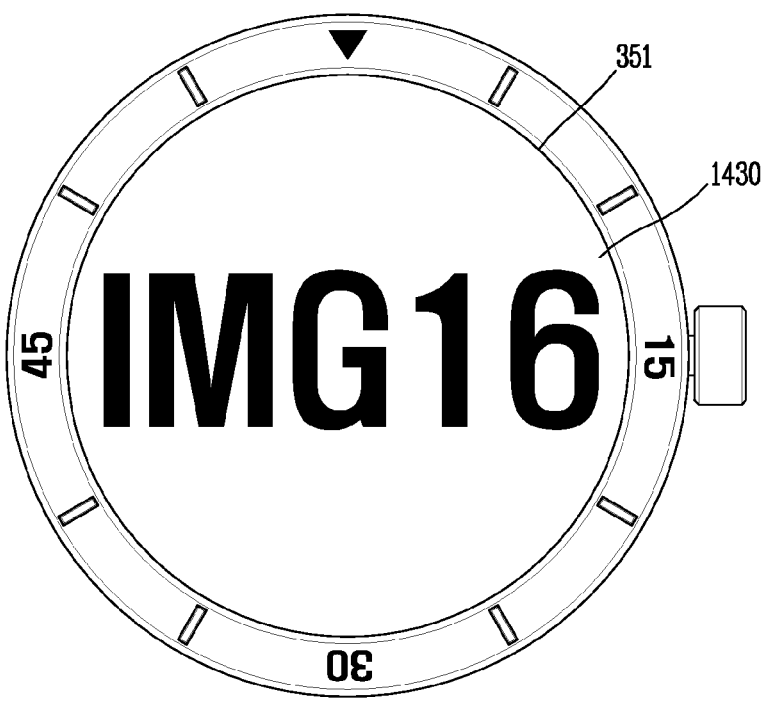
Figure 14E:
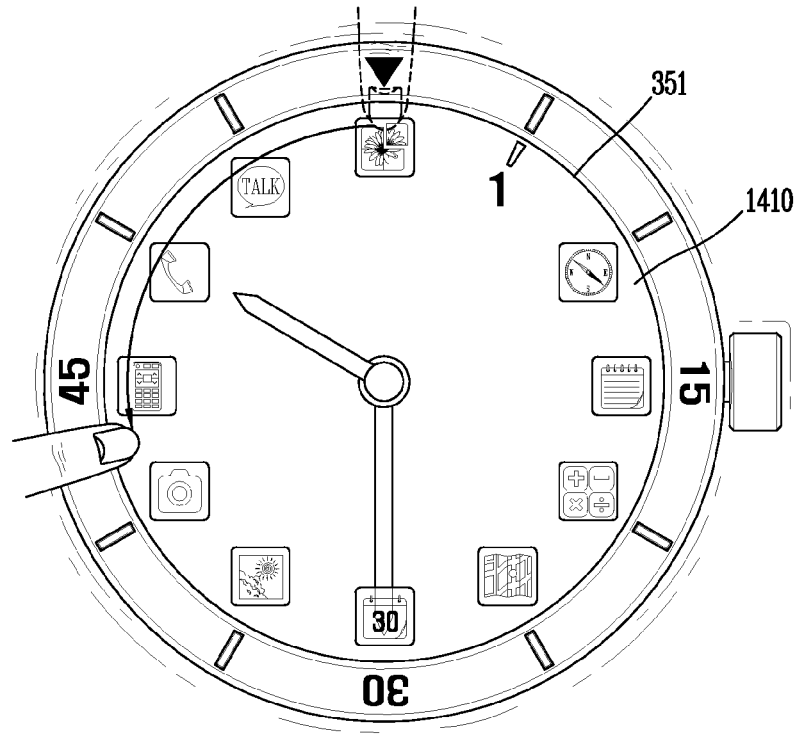
Figure 14E:
Figure 14E:
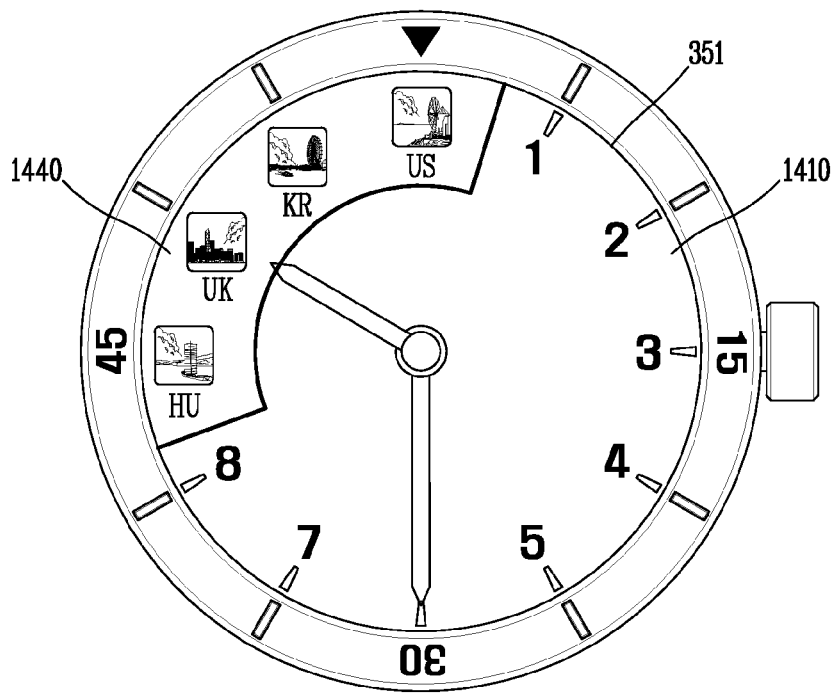

Afterwards, different types of contents are included in the content output region according to a moving direction of the touch input. For example, as illustrated in FIG. 14B, when a drag input moving in a clockwise direction is sensed, the controller 180 may output on the virtual regions the most recently-generated images from the photo application. On the other hand, as illustrated in FIG. 14E, when a drag input moving in a counterclockwise direction is sensed, the controller 180 may output on the virtual regions the most recently-generated images by each photo folder. When there are totally four image folders named US, KR, UK and HK in the photo application, the most recently-generated images in each image folder are output on the virtual regions (1440).

Meanwhile, as the touch input moves, an edge region of the touch screen 351 may be set to the content output region (1420'). The controller 180 updates different contents on the content output region in response to the movement of the touch input until the last content is output. When the last content is output, the controller 180 provides the bouncing feedback in response to the movement of the touch input.

Figure 15A:
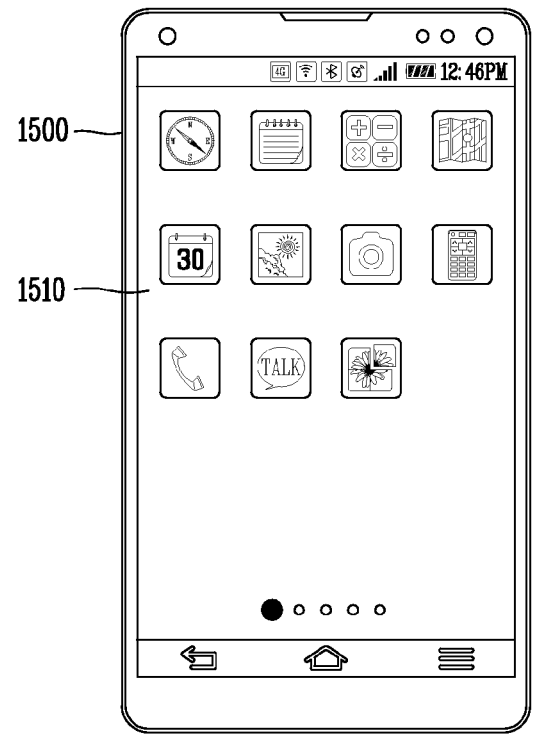
FIGS. 15A and 15B are conceptual views each illustrating an operation of a mobile terminal outputting graphic objects of applications installed in an external terminal.
Figure 15A:
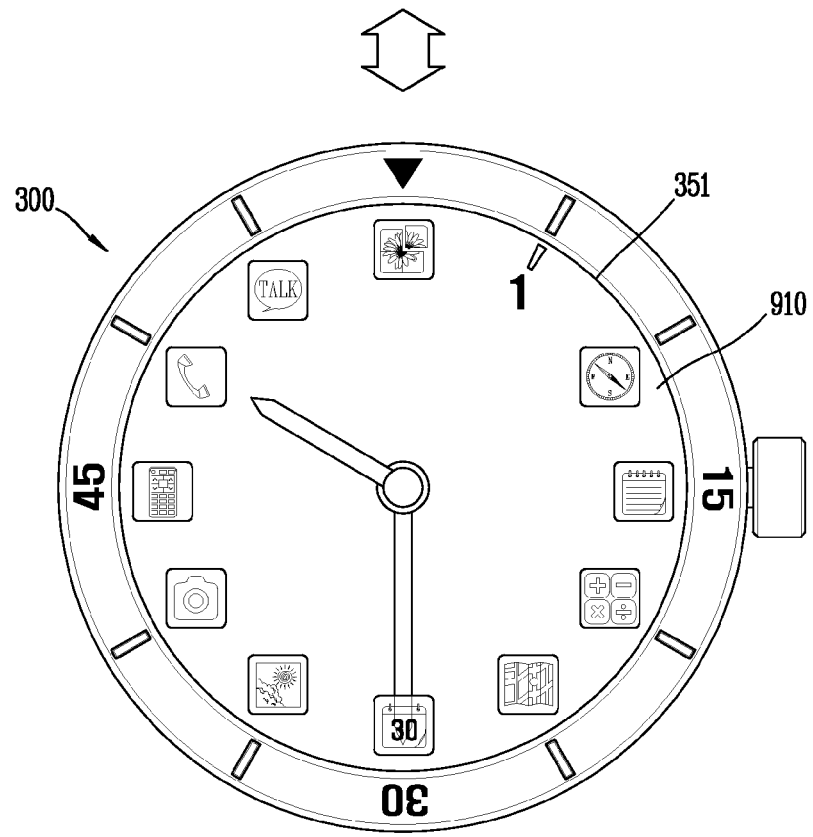
Figure 15B:
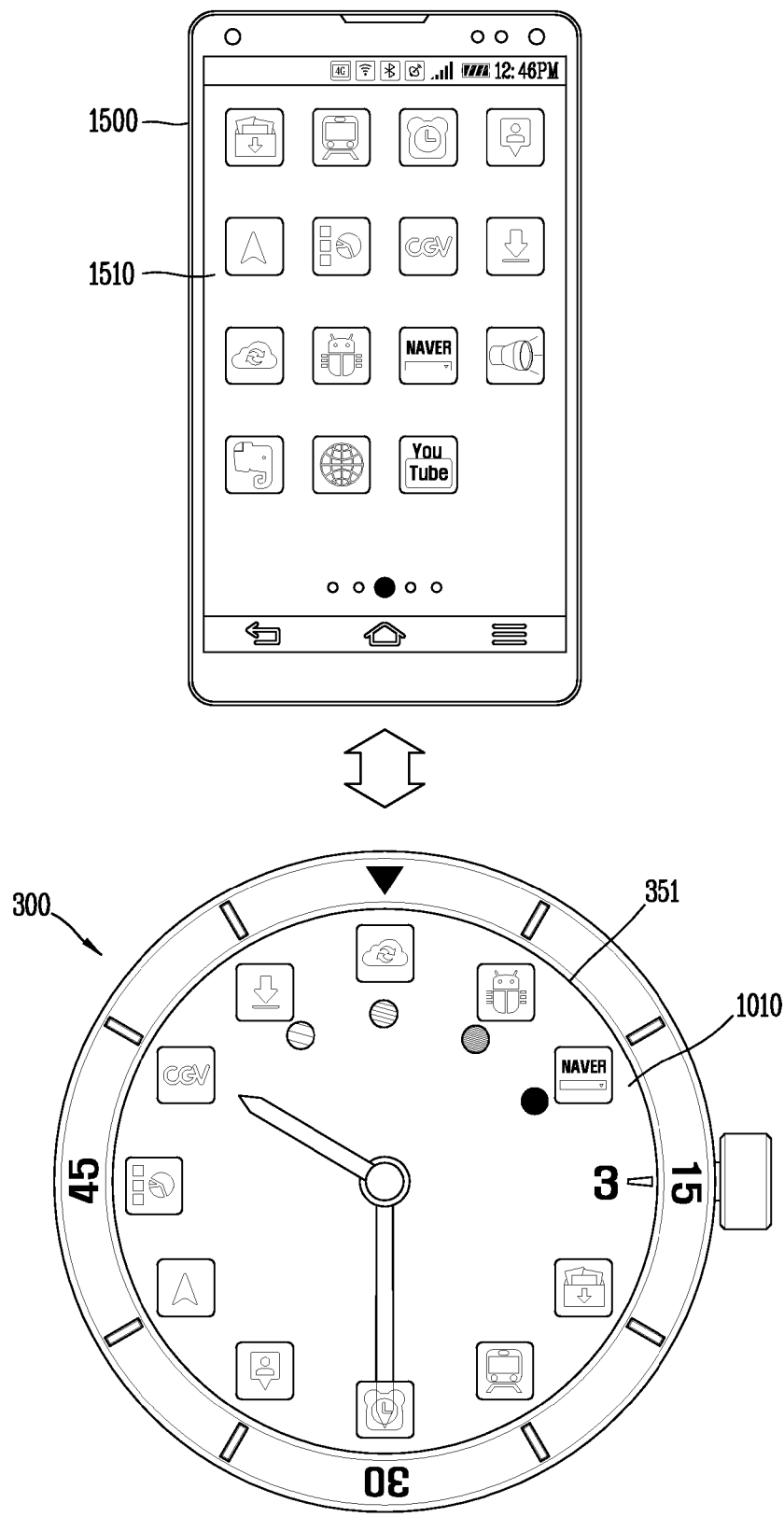

FIGS. 15A and 15B are conceptual views each illustrating an operation of a mobile terminal outputting graphic objects of applications installed in an external terminal.

According to the present invention, the wearable device 300 and an external terminal 1500 may cooperate with each other. The wearable device 300 may perform communications with various types of external devices, and perform pairing with at least one of those external devices.

The pairing refers to a connection for data transmission and reception between the wearable device 300 and the external terminal 1500. When the pairing is performed, the wearable device 300 and the external terminal 1500 may perform communication for bidirectional data transmission and reception. Here, the pairing may be carried out through the wireless communication unit 110 (see FIG. 1), such as Bluetooth, NFC or the like.

The wearable device 300 needs to prevent the mobile terminal from being paired with a user-unexpected external terminal. To this end, the external device 1500 and the wearable device 300 may perform paring only when a code or password set by the user is input to at least one of the external device 1500 and the wearable device 300. The code or password may be replaced with a fingerprint which has been registered in the external terminal 1500 or a cloud server. The communication between the external terminal 1500 and the wearable device 300 to be explained hereinafter is carried out only when the pairing is successfully performed.

Meanwhile, when the communication access is performed, the wearable device 300 may perform data transmission and reception with the external terminal 1500 in a session-open state. Therefore, the wearable device 300 may detect an event generated from the external terminal 1500 and/or the wearable device 300, and share event-generated information with the external terminal 1500.

In addition, the wearable device 300 may remotely execute an application installed in the external terminal 1500, and output an execution screen of the application on the touch screen 351. In order to remotely execute the application installed in the external terminal 1500, the wearable device 300 may output graphic objects of applications installed in the external terminal 1500 on the touch screen 351.

For example, the first subpage 910 illustrated in FIG. 9B includes graphic objects included in a first page 1510 among those home screens of the external terminal 1500 and the third subpage 1010 illustrated in FIG. 10B includes graphic objects included in a third page 1520 among those home screens of the external terminal 1500.

That is, the graphic objects of the applications installed in the external terminal 1500, other than applications installed in the wearable device 300, may be output on the home screen of the wearable device 300 in cooperation with the home screen of the external terminal 1500. Accordingly, the user can use the applications installed in the external terminal 1500 using the wearable device 300.

Figure 16:
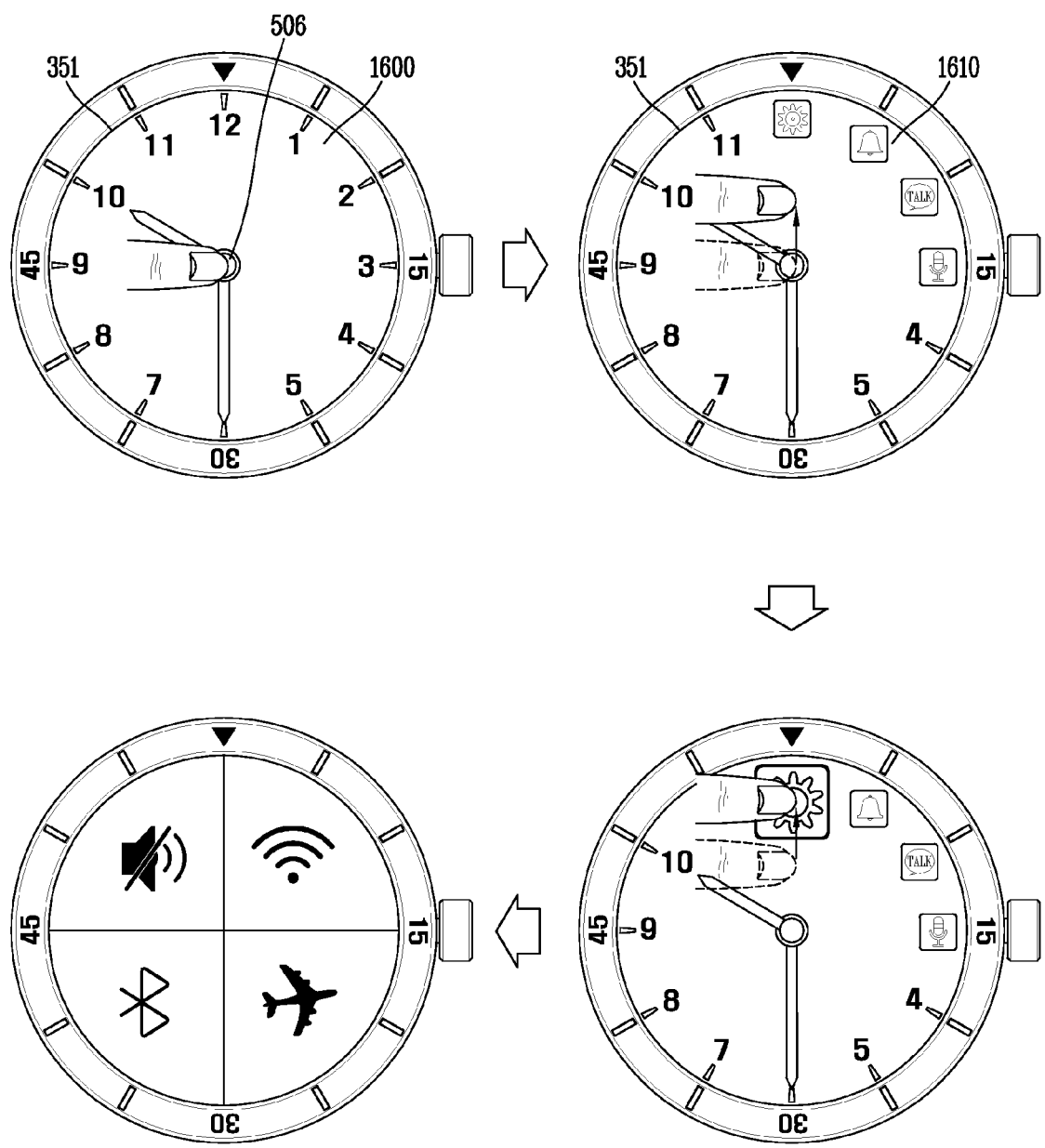
FIG. 16 is a view illustrating a method of entering a preset screen using a control point connecting the hour hand and the minute hand.

FIG. 16 is a view illustrating a method of entering a preset screen using the control point for connecting the hour hand and the minute hand.

The preset screen refers to a screen on which icons corresponding to specific applications and a widget, which are preset by a user selection or the controller 180, are displayed in a fixed state.

As illustrated in FIG. 16, the controller 180 may output the preset screen based on a touch input applied to the control point 506. In more detail, when a long touch which is applied for a reference time or more is applied to the control point 506 while a main page 1600 is output, the controller 180 may convert the main page 1600 into a preset screen 1610. That is, the controller 180 converts a plurality of indexes into graphic objects of different applications.

The touch screen 351 outputs icons of applications, which are selected based on a preset reference, in replacement of each number. For example, icons to output may be extracted based on execution frequencies of applications, and arranged to correspond to each number according to the execution frequencies. That is, an icon of the most frequently-used application may be output on a region where the number 12 is output. Or, icons to output may be extracted according to execution time points of the applications and an icon of the most frequently-used application may be output on the region where the number 12 is output. Here, the reference is not limited to this. The icon corresponding to each number may be designated by a user setting, the icon may be extracted by a certain method, or an icon of an application corresponding to an event may be extracted for output when the event is received.

The controller 180 may execute an application, in response to a touch input applied to the touch screen 351 while at least one graphic object is output in replacement of the index. In more detail, when a touch applied to the control point 506 moves to the graphic object output in replacement of the index, an application associated with the graphic object is executed.

In this instance, the controller 180 may change a shape and/or size of the graphic object which is arranged in the moving direction of the touch, in response to the movement of the touch applied to the control point 506. Accordingly, the user can recognize which graphic object is to be selected among the graphic objects output.

Although not illustrated, when the touch applied to the control point 506 is released without movement, the controller 180 ends the output of the preset screen 1610 and controls the touch screen 351 to output the main page 1600.

Or, when a touch input is applied to the control point 506 again while the graphic objects are output on the touch screen 351, the controller 180 may control the touch screen 351 to convert the graphic objects back into the numbers of the indexes.

Meanwhile, the controller 180 may control the touch screen 351 to change a position of each graphic object or edit the graphic object based on a touch input applied directly onto the graphic object.

This may allow the user to fast execute a desired application simply by applying a touch input.

Further, the present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like.

Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a main body;
a band coupled to the main body and configured to be secured to a wrist of a user;
a touch screen disposed on a front side of the main body and configured to sense a touch; and
a controller configured to cause the touch screen to display:
a plurality of time markers;
an hour hand and a minute hand moving according to a lapse of time; and
one or more notification icons in response to a first touch input,
wherein each of the one or more notification icons is displayed to replace one or more corresponding time markers of the plurality of time markers, and
the first touch input is dragged over the one or more corresponding time markers and each of the one or more notification icons is displayed and a corresponding time marker is removed from display as the first touch input is dragged over the corresponding time marker of the one or more corresponding time markers and
wherein the controller is further configured to cause the touch screen to:
change a shape of the first ordered notification icon or the last ordered notification icon to indicate that no new notification icons are available for display in response to the first touch input; and
display the first ordered notification icon or the last ordered notification icon in an original shape when the first touch input is released.

2. The mobile terminal of claim 1, wherein:
a first display group comprises the plurality of time markers, the hour hand, and the minute hand; and
a second display group comprises
the one or more notification icons.

3. The mobile terminal of claim 2, wherein the controller is further configured to cause the touch screen to display a third display group and terminate display of the second display group in response to another touch input comprising a drag.

4. The mobile terminal of claim 2, wherein the controller is further configured to cause the touch screen to display the plurality of graphic objects to rotate in a first direction in response to another touch input in the first direction.

5. The mobile terminal of claim 1, wherein each of the one or more notification icons corresponds to an application executable at the mobile terminal and is displayed with an event indicator indicating a number of events associated with the corresponding application.

6. The mobile terminal of claim 5, wherein the controller is further configured to cause the display to display a notification summary icon at a location of a first time marker of the plurality of time markers, wherein the notification summary icon is displayed with an event summary indicator indicating a total number of events associated with the applications corresponding to the one or more notification icons.

7. The mobile terminal of claim 6, wherein:
the touch input comprises a drag from the displayed notification summary icon to a particular point displayed on the touch screen.

8. The mobile terminal of claim 1, wherein the controller is further configured to cause the touch screen to re-display a particular time marker and to remove from display a displayed corresponding notification icon when the first touch input is dragged over the displayed corresponding notification icon in a reverse direction.

9. The mobile terminal of claim 1, wherein each of the one or more notification icons corresponds to an application executable at the mobile terminal and the one or more notification icons are displayed in an order according to an order in which events of each application were received at the mobile terminal.

10. The mobile terminal of claim 1, wherein each of the one or more notification icons corresponds to an application executable at the mobile terminal and the one or more notification icons are displayed based on a preset order of the application.

11. The mobile terminal of claim 10, wherein the one or more notification icons are displayed in the preset order along a perimeter of the touch screen in a clockwise or counterclockwise direction from a location of a first time marker.

12. The mobile terminal of claim 11, wherein the controller is further configured to cause the touch screen to:
display the one or more notification icons to rotate in a first direction according to another touch input in the first direction; and
terminate displaying a first ordered notification icon of the displayed one or more notification icons and display a new notification icon as a last ordered notification icon of the displayed one or more notification icons when the one or more notification icons are rotated.

13. The mobile terminal of claim 12, wherein:
the displayed one or more notification icons is a subset of an ordered number of notification icons; and
a number of the ordered number of notification icons is larger than a number of the plurality of time markers.

14. The mobile terminal of claim 13, wherein the controller is further configured to cause the touch screen to display at least one indicator indicating one or more of the ordered number of notification icons that are not displayed on the touch screen.

15. The mobile terminal of claim 1, wherein each of the one or more notification icons corresponds to an application executable at the mobile terminal and the controller is further configured to cause the touch screen to display a first execution screen of a corresponding application in response to a second touch input to a selected notification icon of the one more notification icons.

16. The mobile terminal of claim 15, wherein the second touch input comprises a drag from a location of the selected notification icon to a particular point displayed on the touch screen.

17. The mobile terminal of claim 1, wherein each of the one or more notification icons corresponds to an application executable at the mobile terminal and the controller is further configured to:
cause the touch screen to display a plurality of regions in response to a second touch input comprising a drag from a selected notification icon to a particular point displayed on the touch screen, wherein each of the plurality of regions is associated with a corresponding function of an application corresponding to the selected notification icon; and
execute a corresponding function in response to a selection touch input to one of the plurality of regions.

18. The mobile terminal of claim 17, wherein a size of a display area of each of the plurality of regions is based on an execution frequency of the associated corresponding function.

19. A mobile terminal comprising:
a main body;
a band coupled to the main body and configured to be secured to a wrist of a user;
a touch screen disposed on a front side of the main body and configured to sense a touch; and
a controller configured to cause the touch screen to display:
a plurality of time markers;
an hour hand and a minute hand moving according to a lapse of time;
a summary notification icon at a location of at least one time marker of the plurality of time markers wherein the summary notification icon comprises an event indicator indicating a total number of events; and
one or more notification icons to replace a corresponding one or more of the plurality of time markers in response to a touch input to the displayed summary notification icon,
wherein each of the notification icons corresponds to an application executable at the mobile terminal, and
wherein the touch input comprises a touch and drag along a path over the corresponding one or more of the plurality of time markers and
wherein the controller is further configured to cause the touch screen to:
change a shape of the first ordered notification icon or the last ordered notification icon to indicate that no new notification icons are available for display in response to the first touch input; and
display the first ordered notification icon or the last ordered notification icon in an original shape when the first touch input is released.

* * * * *